(12) United States Patent
Ben-Shaul et al.

(10) Patent No.: US 10,298,670 B2
(45) Date of Patent: *May 21, 2019

(54) REAL TIME CLOUD WORKLOAD STREAMING

(71) Applicant: Google LLC, Mountain View, CA (US)

(72) Inventors: Israel Ben-Shaul, Ramat Hasharon (IL); Ady Degany, Haifa (IL); Leonid Vasetsky, Zikhron Yaakov (IL); Shahar Glixman, Kiryat Tivon (IL); Yaniv Ben-Ari, Kochav Yair (IL)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/695,455

(22) Filed: Sep. 5, 2017

(65) Prior Publication Data

US 2017/0366606 A1 Dec. 21, 2017

Related U.S. Application Data

(63) Continuation-in-part of application No. 14/554,837, filed on Nov. 26, 2014, now Pat. No. 9,753,669.

(Continued)

(51) Int. Cl.
*G06F 3/06* (2006.01)
*G06F 12/08* (2016.01)
(Continued)

(52) U.S. Cl.
CPC .......... *H04L 67/1008* (2013.01); *G06F 3/061* (2013.01); *G06F 3/064* (2013.01);
(Continued)

(58) Field of Classification Search
CPC .......... G06F 17/30017; G06F 12/0851; G06F 12/0868; G06F 3/0635; G06F 3/064; H04L 67/125
(Continued)

(56) References Cited

U.S. PATENT DOCUMENTS 9,753,669 B2 * 9/2017 Ben-Shaul ............ G06F 9/5061
2004/0123026 A1 * 6/2004 Kaneko ................. G06F 3/0607
711/112

(Continued)

FOREIGN PATENT DOCUMENTS

EP 2 945 065 A2 5/2015

OTHER PUBLICATIONS

Zhang, et al., "Intelligent Workload Factoring for a Hybrid Cloud Computing Model", IEEE, dated 2009, 8 pages.

(Continued)

*Primary Examiner* — Michael J Brown
(74) *Attorney, Agent, or Firm* — Lerner, David, Littenberg, Krumholz & Mentlik, LLP

(57) ABSTRACT

A method and system for real-time cloud bursting is provided. The method and system are directed to extending a data center with cloud computing resources by decoupling computing resources and storage devices in a virtualized data center, and booting the decoupled computing resources in a staged process while storage devices are divided and prioritized into components. Data and boot instructions are re-routed and cached as needed through a proxy system.

20 Claims, 28 Drawing Sheets

Related U.S. Application Data

(60) Provisional application No. 61/992,560, filed on May 13, 2014.

(51) Int. Cl.
*H04L 29/08* (2006.01)
*G06F 9/455* (2018.01)
*G06F 9/50* (2006.01)
*H04L 12/24* (2006.01)
*G06F 9/48* (2006.01)
*G06F 12/0868* (2016.01)

(52) U.S. Cl.
CPC ............... *G06F 3/065* (2013.01); *G06F 3/067* (2013.01); *G06F 3/0619* (2013.01); *G06F 3/0635* (2013.01); *G06F 3/0647* (2013.01); *G06F 3/0683* (2013.01); *G06F 9/45558* (2013.01); *G06F 9/4856* (2013.01); *G06F 9/5061* (2013.01); *G06F 9/5072* (2013.01); *G06F 9/5083* (2013.01); *H04L 41/0806* (2013.01); *H04L 67/1097* (2013.01); *H04L 67/2847* (2013.01); *H04L 67/2852* (2013.01); *H04L 67/2876* (2013.01); *G06F 12/0868* (2013.01); *G06F 2009/4557* (2013.01); *H04L 67/1095* (2013.01)

(58) Field of Classification Search
USPC .......................................... 713/1, 2, 100, 300
See application file for complete search history.

(56) References Cited

U.S. PATENT DOCUMENTS

| | | |
|---|---|---|
| 2013/0036213 A1 | 2/2013 | Hasan |
| 2015/0331635 A1 | 11/2015 | Ben-Shaul |

OTHER PUBLICATIONS

Seo et al., "HPRMR: Prefectching and Pre-Shuffling in Shared MapReduce Computation Environment", dated Aug. 31, 2009, IEEE, 8 pages.

Reich et al., "WMTorrent: Scalable P2P Virtual Machine Streaming", CoNext, dated Jan. 1, 2012, ACM, 12 pages.

Reich et al., "VMTorrent: Scalable P2P Virual Machine Streaming", dated Dec. 10, 2012, 64 pages.

Harris, Derrick, "Gigaom Amazon Fuses Your Storage System with its Cloud", dated Jan. 25, 2012, 6 pages.gigaom.com/2012/01/25/aws-fuses-your-storage-system-with-its cloud/.

Guo et al., "Cost-Aware Cloud Bursting for Enterprise Applications", ACM Transactions on Internet Technology, dated May 1, 2014, 24 pages.

European Patent Office, "Search Report" in application No. 15167252.4-1957, dated May 24, 2016, 11 pages.

European Claims in application No. 15167252.4-1957, dated May 2016, 4 pages.

Ben-Shaul, U.S. Appl. No. 14/554,837, filed Nov. 26, 2014, Office Action, dated Dec. 30, 2016.

Ben-Shaul, U.S. Appl. No. 14/554,837, filed Nov. 26, 2014, Notice of Allowance, dated Jun. 14, 2017.

European Patent Office, "Search Report" in application No. 15 167 252.4-1221, dated May 7, 2018, 9 pages.

European Claims in application No. 5 167 252.4-1221, dated May 2018, 3 pages.

\* cited by examiner

REAL TIME CLOUD WORKLOAD STREAMING

BENEFIT CLAIM

This application claims the benefit under 35 U.S.C. § 120 as a continuation in part of application Ser. No. 14/554,837, filed Nov. 26, 2014, which claims the benefit under 35 U.S.C. § 119(e) of provisional application 61/992,560, filed May 13, 2014. The entire contents of each of the above-mentioned applications are hereby incorporated by reference for all purposes as if fully set forth herein.

FIELD OF THE DISCLOSURE

The present disclosure generally relates to data processing in the field of networked data centers or cloud computing. The disclosure relates more specifically to computer-implemented techniques for effectively extending a data center with cloud resources.

BACKGROUND

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section.

The use of large data centers to provide a computing infrastructure has become widespread. These data centers may experience "peak load" periods where the demand on the infrastructure drastically increases for short periods of time.

The average data center infrastructure is designed to handle an average computational load, but it is under provisioned for peak loads. When a peak occurs, workloads take more time to complete. Mildly over provisioning the infrastructure of a data center above its average computational load does not solve the problem of noticeably slower application performance during peak loads. For example, if a data center with a 10% over provision for average computational load has a peak load that requires 50% additional capacity, a task that should finish in two weeks would take ten weeks to complete. In many cases, such delays cannot be tolerated by a business because tasks occurring during peak loads are typically time sensitive (e.g., end of quarter calculations, holiday on-line shopping, or a tape-out activity associated with releasing a new chip). As a result, other mainline activities are pushed out or delayed, leading to overall business disruption.

Additional computing resources are also typically needed to account for hardware failure and unforeseen new workloads. To minimize a service disruption after server failure, a data center may use an additional standby server to take over the workloads of the faulty server and continue to serve client requests. Similar high availability systems are needed when an administrator of a data center has unforeseen new workloads, even if they are not characterized as peak loads. Examples of unforeseen new workloads include new projects and testing new tools for which extra computing capacity is needed.

The main approach to handling these difficulties is to over provision a data center's infrastructure by maintaining substantially more hardware than is needed. This over provisioning of the infrastructure of the data center causes performance to never noticeably be affected by peak loads because the hardware is rarely fully utilized. For example, if a data center with a 50% over provision for an average computational load has a peak load that requires the additional capacity, but only for 20% of the time, then 40% of the infrastructure is wasted on average, since 80% of the time, 50% of capacity is not utilized. Over provisioning in this manner decreases profit margins significantly by increasing base costs of the infrastructure, and recurring costs of power, cooling, maintenance, hardware refresh, software licenses and human resources.

The prior examples also assume peak loads and average computational load are semi-predictable when in fact they are not. Peak loads can be longer in time, higher in computing needs, and at time completely unexpected. For instance, a "trading storm" due to an unforeseen event that creates turmoil in the stock market leads to unpredictable peak load. The difference between average loads and peak loads can become convoluted as a data center experiences new projects, changes in business, growth or decline in headcount, and additional capacity requirements of existing projects. The inability to forecast computational needs of a data center regularly leads to higher costs, slower performance, excessive downtime, or even underutilization of available resources.

DETAILED DESCRIPTION

Figure 1:
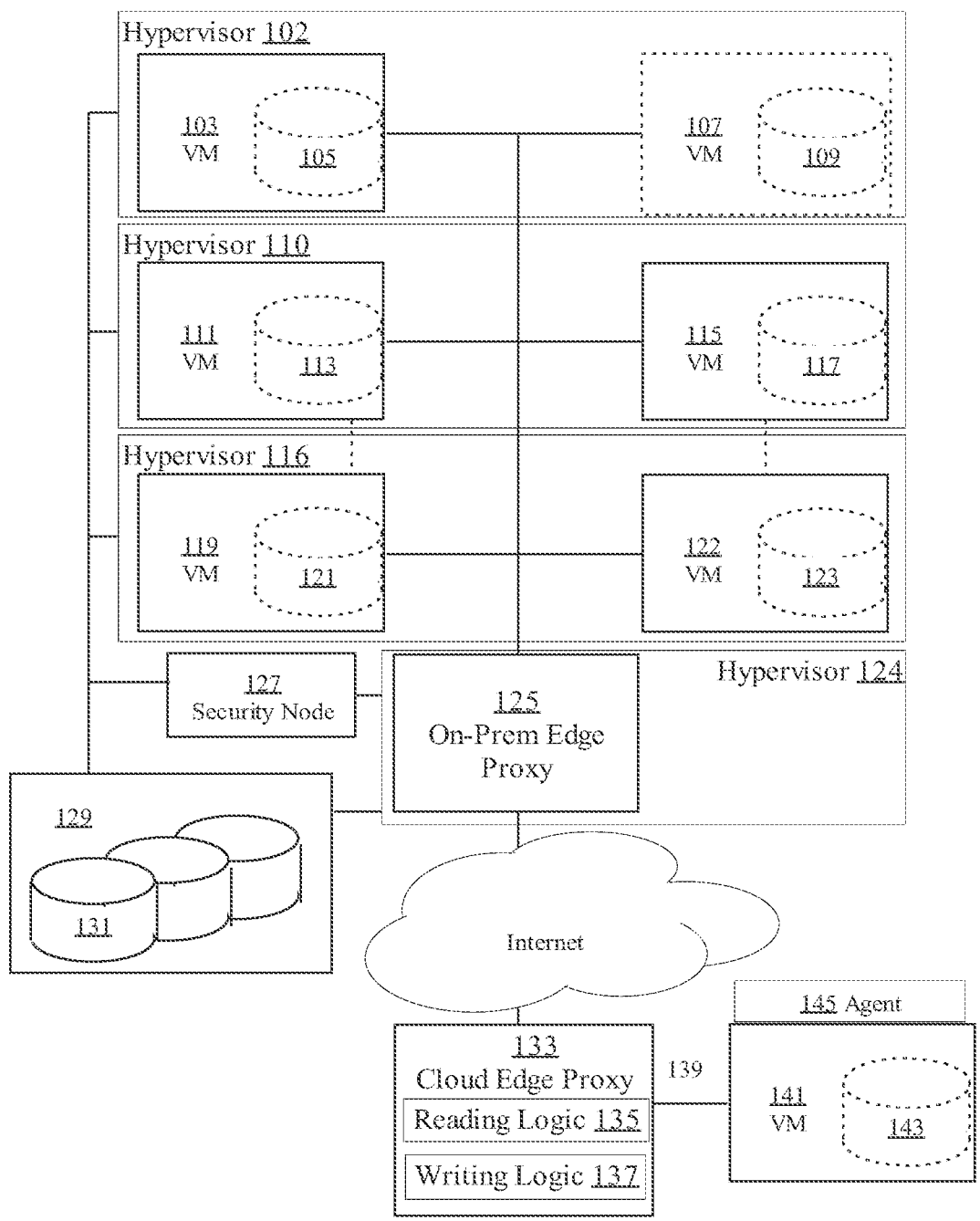
FIG. 1 is a block diagram illustrating a system architecture of a hybridized data center after transferring a computing instance.

In some embodiments, a method and system for extending a data center with cloud computing resources by cloud bursting and streaming is described herein. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 System Architecture
3.0 Cloud-On-Demand Functionality
4.0 Hybridized Functionality
5.0 Determining What Workloads to Cloud Burst
6.0 Determining a Preferable Cloud Host for Cloud Bursting
7.0 Seamless Migration of Workloads
7.0 Hardware Overview
1.0 General Overview The needs identified in the foregoing Background, and other needs and objects that will become apparent from the following description, are achieved in the present invention, which comprises, in one aspect, a method for extending a data center with cloud computing resources by decoupling computing resources and storage devices in an instance, and having the decoupled instance, hereinafter a computing instance, diskless boot on the cloud while storage devices are divided and prioritized into components with data paths being re-routed as needed through a proxy system.

The system architecture of an embodiment of the real time cloud bursting has two edge proxies connecting a remote "cloud" network to a local network that is typically on the premises of a particular entity and termed an "on-prem" network. The proxies are responsible for manipulating and transferring instances as well as re-routing calls to storage using a network protocol. In some embodiments, a computer program-supported framework is created whereby the cloud edge proxy serves as a block storage device for an instance running in the cloud. The framework comprises creating one or more staging images for one or more cloud hosts to provide a staged boot sequence of any computing instance. The framework also includes setting up data paths based on the write persistence of a computing instance.

The implementations of the cloud bursting mechanisms herein described occur within a spectrum from shutting down and rebooting an instance with proxied storage, to transparently transferring an instance while it is running. As the real time cloud bursting mechanism approaches run-time transfer, more configuration data is needed for instances to be live transferred.

Functionality of the cloud bursting system herein described includes, but is not limited to, providing instance transfer functionality, cloning functionality, reverse storage transfer functionality, scaled migration functionality, and edge proxy resizing. In preferred embodiments, instance transfer and cloning involve having an instance decoupled from its storage. In preferred embodiments, reverse instance transfer and migration involve having an instance re-coupled with its storage.

2.0 System Architecture

In order to provide a thorough understanding of the present invention, embodiments of specific system components are described herein. These embodiments describe a computer system architecture according to a preferred embodiment and are delineated for instructive purposes only. One or more components may not be necessary to implement different functionalities of the invention. Additional components may be added or removed for network management or network performance as understood in the art.

As seen in FIG. 1, the system architecture of a hybridized network 101 comprises computing instances 103, 111, 115, 119, 122, and 141, a cloud edge proxy 133, and on-prem edge proxy 125, and one or more storage devices 105, 109, 113, 117, 121, 123, 143 (depicted as 131) in a network storage node 129. In this embodiment, the computing instance 141 is a virtual machine moved from position 107 and monitored with a monitoring agent 145. The computing instance 141 is modified to enable storage requests route to and from a cloud edge proxy 133 by mounting the edge proxy 133 as the primary storage for computing instance 141 using an iSCSI protocol through a network connection 139. The cloud edge proxy 133 re-routes data to and from an on-prem edge proxy 125 AND to and from a computing instance 141 with reading logic 135 and writing logic 137. The on-prem edge proxy 125 re-routes data to and from on-prem storage disks 131 as needed AND to and from the cloud edge proxy 133.

In some embodiments, the local computing instances 103, 111, 115, 119, 122 have access to their respective local storage resources 105, 113, 117, 121, 123 in network storage node 129 through their underlying hypervisors 102, 110, 116.

There are various methods by which storage may be accessed. In some embodiments, access to a local storage resource 131 in storage node 129 through the on-prem edge proxy 125 is done through the hypervisor 124 as the storage provider. In this case the local storage resource 109 of the remote instance 141 is formatted for a structured data storage scheme (e.g., vmdk) and placed in a network storage node 129, or the storage node 129 is mapped through the hypervisor 124 as a raw-device and then accessed by on-prem edge proxy 125. In other embodiments, methods are used to directly access local storage resource 109 located in storage node 129, without going through the hypervisor 124, including but not limited to—VDDK (Virtual Disk Development Kit) or direct access to SAN via iSCSI or Fibre Channel, or direct virtual disk file access over networked file system such as NFS or other file server protocols.

In another embodiment, the hybridized data center consists of virtual machines accessing directly attached physical disks. In such an embodiment, the physical disks do not need to be in a centralized repository such as node 129. Instead the physical disks may be accessible directly by the virtual machines.

Figure 20:
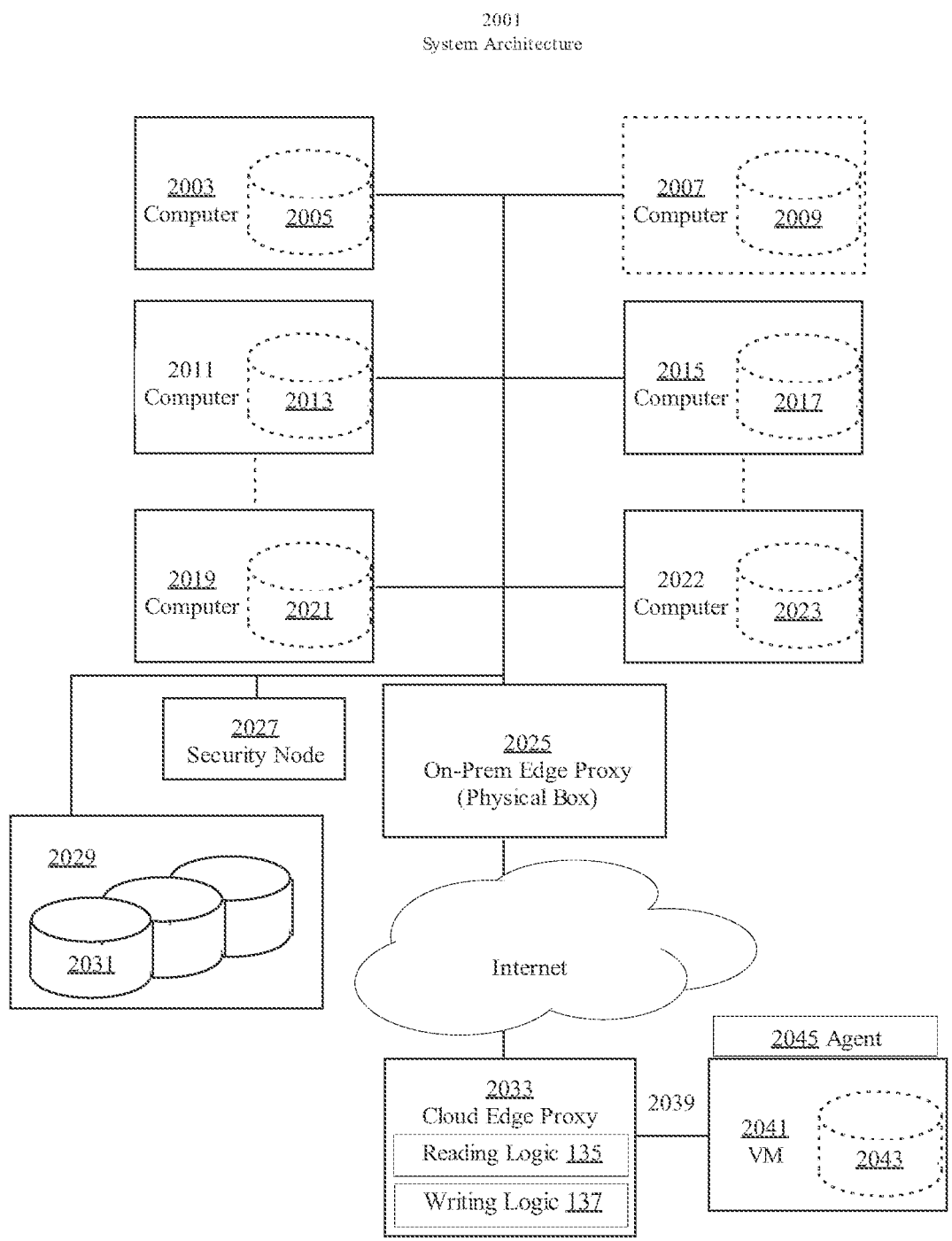
FIG. 20 is a block diagram illustrating a system architecture of an alternative hybridized data center.

In yet another embodiment, the hybridized data center consists of physical machines accessing physical disks. FIG. 20 is a block diagram illustrating a system architecture of an alternative hybridized data center. The system 2001 comprises multiple computers 2003, 2007, 2011, 2015, 2019, and 2022 with a network storage node 2029 containing local storage resources 2005, 2009, 2013, 2017, 2021, and 2023 associated with each respective computer. The system 2001 may also comprise additional network devices such as a security management node 2027. The multiple computers 2003, 2007, 2011, 2015, 2019, and 2022 are networked together and controlled by the on-prem edge proxy 2025 when they need to execute in the cloud.

The system architecture 2001 of an embodiment of the edge proxy system comprises a computing instance 2041, a cloud edge proxy 2033, and on-prem edge proxy 2025, and one or more local storage devices 2029. In this embodiment, the computing instance 2041 is a virtual machine and has a monitoring agent 2045. The computing instance 2041 is modified such that storage requests route to and from a cloud edge proxy 2033 using an iSCSI protocol as needed through a network connection 2039. In one embodiment, the cloud edge proxy 2033 comprises a monitoring service, an orchestrator, a storage target, a data stream, and a secure cache. The cloud edge proxy 2033 re-routes data to and from an on-prem edge proxy 2025 AND to and from a computing instance 2041, as needed.

2.2 Instance

Data centers more efficiently use their physical machines by running multiple instances of virtual machines or application containers on each physical machine. In this manner, more workloads can be utilized on less hardware. An instance is a virtualization of a computer system. An instance comprises computing resources and some form of storage.

A virtual machine instance is an independent software implementation of a machine. Different operating systems can run on each virtual machine without affecting the other virtual machines running on the same host physical machine.

An application container instance involves running a kernel with several different partial operating systems on top of that kernel. The same partial operating system needs to be run in each instance, but as a tradeoff there are performance benefits to running a container based virtualization. Hereinafter, "instances" refers to both virtual machine instances and container based instances.

Figure 2:
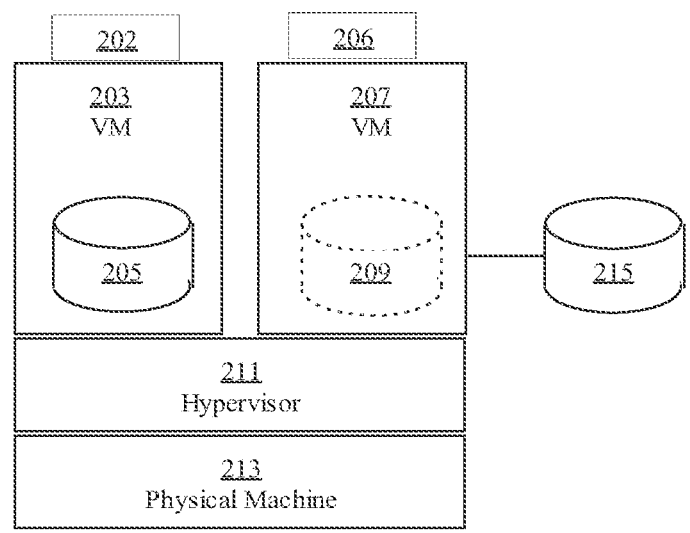
FIG. 2 is a block diagram of a two to one instance architecture on a host machine delineating the difference between an instance and a computing instance.

A two to one instance architecture is shown in FIG. 2. The physical host machine 213 has a hypervisor 211 loaded onto it. The hypervisor 211 acts as a virtualization environment for multiple instances 203, 207. Type 1 Hypervisors run directly on the host hardware, and type 2 hypervisors run within a conventional operating system environment called the host OS (not shown). Examples of type 1 hypervisors include, but are not limited to, Oracle VM Server for SPARC, Oracle VM Server for x86, the Citrix XenServer, VMware ESX/ESXi and Microsoft Hyper-V 2008/2012. Examples of type 2 hypervisors include, but are not limited to, VMware Workstation and VirtualBox. Within a hypervisor 211 an administrator can create multiple instances of a machine. In FIG. 2, two instances 203, 207 were created on a single physical host machine 213. Hereinafter, "underlying virtualization environment" refers to hypervisors (type 1 and type 2), applications, and host OS's used to start and run instances.

Embodiments may rely on networking individual instances and manipulating these instances by modifying the instance 203, by controlling the instance through an underlying virtualization environment 211, or by mounting a monitor or control agent 202 on the instance.

2.3 Computing Instance

Cloud computing resources are more efficiently leveraged by a data center if as little storage as possible is kept on the cloud host. If at least some storage does not need to be transferred to a cloud host, workloads can be transferred to a cloud host quicker and for relatively less cost. An embodiment of a computing instance can be seen in FIG. 2 as computing instance 207, which is a virtualization of a computer system with its storage 215 decoupled from the instance 207.

Some embodiments may rely on transforming an instance 203 into a computing instance 207, and then controlling the computing instance by updating the computing instance 207, by controlling the instance through its underlying virtualization environment 211, or by mounting a monitor or control agent 206 on the computing instance 207.

2.4 On-Prem Edge Proxy

An on-prem edge proxy is a virtual appliance that resides on premises (on-prem). The on-prem edge proxy controls network traffic to and from a cloud edge proxy. The on-prem edge proxy preferably comprises a management service, an on-prem orchestrator, a streaming data path, and a disk management service.

A management service comprises management and monitoring software that connects to one or more instances, their underlying virtualization environments, their mounted agents, or any combination thereof, to monitor and control storage usage, computational loads, hardware statuses of host machines, network usage, and other computing metrics.

In a preferred embodiment, the on-prem edge proxy handles security management, network storage, and the transfer of networked instances. In other embodiments, the on-prem edge proxy handles additional network services, such as a DNS node or a DNS proxy node, and other network devices. However, only a few network devices are explained here for context.

FIG. 1 is a schematic diagram of a hybridized network 101 comprising multiple instances 103, 107, 111, 115, 119, and 122 on one or more hypervisors 102, 110, 116, 124 with a network storage node 129 and a security management node 127. The multiple instances 103, 107, 111, 115, 119, and 122 are networked together and controlled by the on-prem edge proxy 125 in cases where they need to run in cloud. The nodes are added to a directory service with the security management node 127 and additional storage is available to the network via network storage node 129 such as a network attached storage (NAS) or SAN. Access to network storage node 129 is typically mediated through a hypervisor 102, 110, 116, 124. The hypervisor provides the virtual disk abstraction to guest VMs (virtual machines).

A security management node 127 usually comprises software to authenticate and authorize other nodes on a network.

For example, Microsoft Active Directory (AD) is a directory service that authenticates and authorizes users and computers in a Windows domain network. While a preferred embodiment uses AD, other embodiments may use Mac OS X Server Open Directory or other Lightweight Directory Access Protocol (LDAP) directories.

A network storage node 129 comprises file and block level data storage that connects to the network. In a preferred embodiment, an NAS node has a slimmed-down operating system, specialized hardware, and a file system that processes I/O requests by supporting the popular network block access protocols such as iSCSI and file server protocols, such as CIFS for Windows and NFS for Unix.

Figure 3:
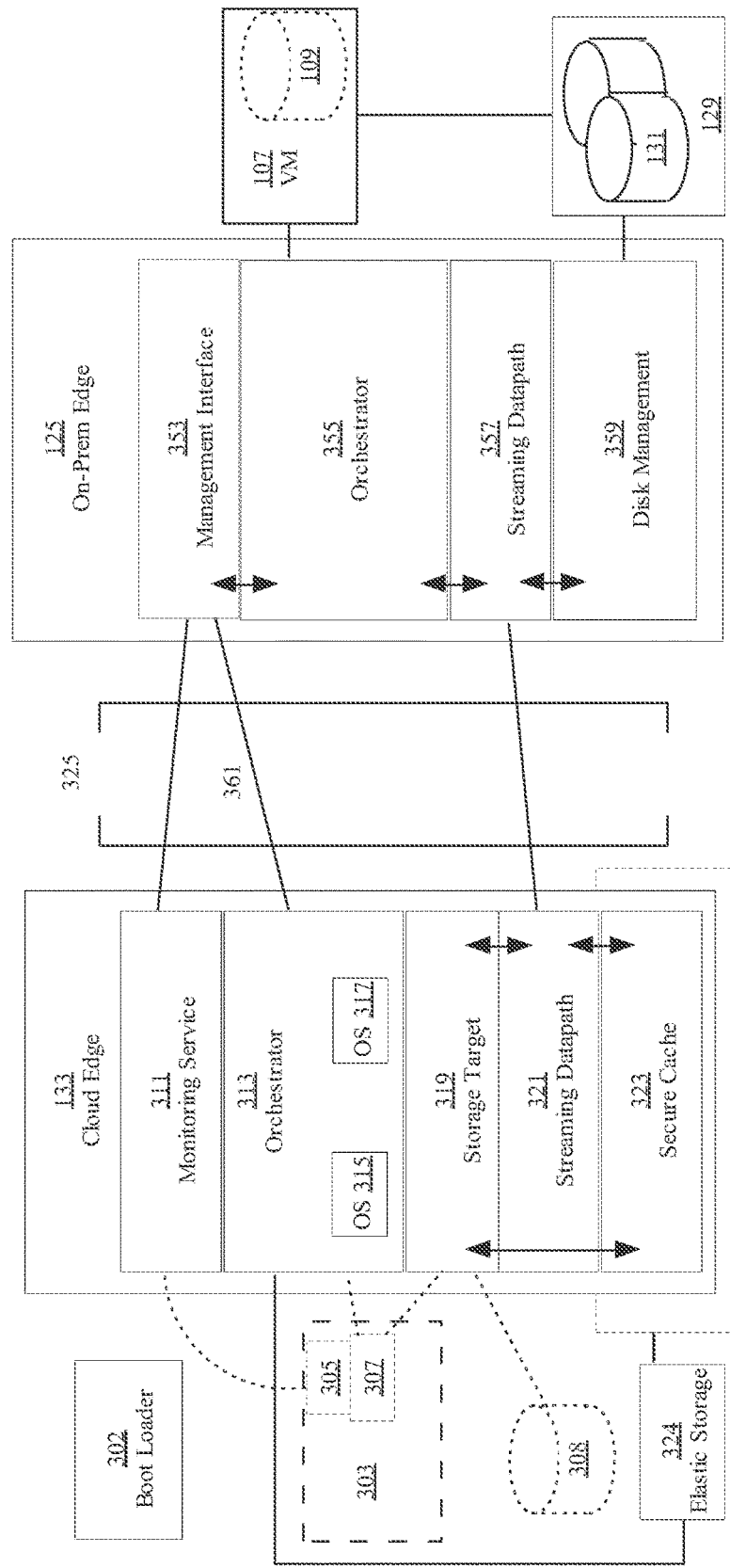
FIG. 3 is a system blueprint illustrating an example edge proxy system.

As seen in FIG. 3, in one embodiment, the on-prem edge proxy 125 comprises a management interface component 353, an orchestrator component 355, a streaming data path component 357, and a disk management component 359. The management interface 353 is a component of the on-prem edge proxy 125 used to control the various nodes and components in FIG. 1. The management interface 353 implements various workflows on nodes on the on-prem side through the on-prem orchestrator 355 and various nodes on the cloud side through the cloud orchestrator 313. The management interface 353 also receives information from one or more monitoring services 311 and on-prem host virtualization environments (not shown).

The on-prem orchestrator 355 is preferably a component to start and modify local devices through workflows and programs that implement processes as further described herein. For example, the virtual machine 107 coupled to the on-prem edge proxy 125 can be started, added to a directory service, decoupled from its virtual disk(s) 365, and then transferred to the cloud edge proxy 133 in one workflow. Additionally, the orchestrator stores configuration information from one or more cloud edge proxies 133, 673 (shown in FIG. 6). This information is used to adapt instances such as 107 taken from on-prem to be transferred to the cloud. Various workflows, hereinafter described, may be implemented partially by the on-prem orchestrator 355 and partially by the cloud orchestrator 313, but started from the management interface 353.

For example, the on-prem edge proxy 125 may use workflows using vSphere Orchestrator 355 to create and modify virtual machines in the local data center. With the addition of a vCenter Plugin, the management interface 353 can leverage vSphere Orchestrator 355 workflows to monitor and control all of the virtual machines running in a data center. In addition, the orchestrator 355 can be used to automatically monitor and control other resources such as an Active Directory (AD) and any Network Attached Storage (NAS).

The streaming data path 357 is preferably a component for streaming data between the cloud-edge proxy and the on-prem edge proxy. The on-prem streaming data path 357 transfers instances 107 according to workflows defined by the on-prem orchestrator 355 and transfers data from disk management 359 as requested.

The disk management service 359 is a component preferably designed to retrieve data from virtual disks 131 or virtual boot disks 131 mounted to the on-prem edge proxy or stored in network storage (not shown) or accessing the network storage directly. The disk management service 359 reroutes I/Os to the necessary virtual disks after locking them in a mutually exclusive manner to prevent other virtual machines access to the disks, and after an instance has been decoupled from its virtual storage device(s).

2.5 Cloud Edge Proxy

The cloud edge proxy is a virtual appliance that resides on the cloud. The cloud edge proxy controls network traffic to and from the on-prem edge proxy.

Initially, setting up the cloud edge proxy requires starting an instance in the cloud and mounting cloud storage to the instance. For example, using AWS EC2 one can create an instance defined as the cloud edge proxy. Then, using AWS EBS (Elastic Block Store) one can create block storage and mount it to the cloud edge proxy. In a preferred embodiment as seen in FIG. 3, once the underlying infrastructure is created, five components are created on the cloud edge proxy 133: a monitoring service 311, a cloud orchestrator 313, a storage target 319, a streaming data path 321, and a secure cache 323.

The monitoring service 311 is preferably a requesting and forwarding mechanism of the monitoring services available through a cloud service provider API and the monitoring information available through the monitoring agent 305 on a running or booting computing instance 303. The monitoring service 311 is responsible for retrieving any relevant monitoring information from instances and mapping the information to the management interface 353 of the on-prem edge proxy 125. Any translation of information can be done by either the on-prem edge proxy 125 or the cloud edge proxy 133, but preferably occurs on the cloud edge proxy 133.

For example Amazon's EC2 web service, has an API that can be leveraged by the monitoring service 311 to feed information to the on-prem edge proxy management interface 353, which triggers workflows created and implemented by the on-prem orchestrator 355 using a VMware vCenter Plug-In API.

The cloud orchestrator 313 is preferably the component to instantiate a partial OS 307 in the cloud by implementing pre-imaged staging images 315 or 317. Additionally, the cloud orchestrator 313 stores configuration information of the cloud host. This information is then used to adapt instances 107 taken from on-prem and transferred to the cloud. Other workflows can be implemented by the cloud orchestrator 313, but initiated by the management interface 353.

In one embodiment, the hybridized network 101 is adapted to send an instance 107 to a cloud edge proxy 133. The cloud edge proxy 133 starts a computing instance 141 on the cloud with a pre-imaged staging image 315 configured for an OS compatible with the on-prem instance 107. Additional pre-imaged staging images 317 may exist for different OS's or different computing instance configurations.

The storage target 319 is a component preferably designed to appear as a virtual data disk(s) or a virtual boot disk to an instance using iSCSI or other network protocol. The storage target 319 retrieves I/Os from the secure cache 323 or the streaming data path 321 as necessary. Additionally, the storage target 319 may reroute I/Os to a virtual disk 308.

The cloud edge proxy 133 additionally has a secure cache component 323 that offers low-latency performance for computing instances 303 that run in the cloud. This secure cache 323 is preferably kept to a small block size using elastic storage 324 provided by the cloud provider. In some embodiments, the elastic storage 324 is automatically replicated to protect from component failure. Examples of elastic storage include, but are not limited to, Amazon Elastic Block Storage (EBS) or S3 for use with Amazon EC2 instances in the AWS cloud and Codero Elastic SSD cloud Block Storage for Codero Cloud Servers.

The cloud edge proxy 133 also encrypts all data at rest, with a key provided from on-premises.

2.6 Transport Layer

Once the cloud edge proxy and the on-premises edge proxy are setup, it is necessary to setup a transport layer between the two proxies. As seen in FIG. 3, the transport layer 325 operates in between the two proxies, but additionally may provide network connections for network devices that do not use the proxy system. The transport layer is preferably WAN optimized. This optimization includes compression, de-duplication (block and file level), latency optimization, on-prem caching, forward error correction, protocol spoofing, traffic shaping, equalizing, connection limits, simple rate limits, TCP optimizations and other optimization solutions known in the art, so as to minimize the traffic over the WAN and reduce response time in completing the transfer. Another optimization that the transport layer performs is read-ahead, a predictive method that increases the size of the blocks being read by the OS for areas where sequential access is anticipated, so as to provide higher throughput, in anticipation that the pre-fetched blocks would be needed by the OS at boot time or for storage access. Such read-ahead activity greatly enhances performance especially on WAN, since it reduces the number of round trips that the OS needs to wait for while waiting for smaller blocks to be fetched. Another latency-killer is the write-behind mechanism, which essentially performs local write operations with no latency penalty, and propagates the changes in the background. The transport layer also preferably is a secure layer transport by forming a virtual private network (VPN) on-demand.

The transport layer sends data through the streaming data path 321, 357 of the proxy system, but additionally provides direct connections between the management interface 353 and other components of the cloud edge proxy 133 such as the monitoring service 311 and the cloud orchestrator 313. The streaming involves indexing and fetching a predicted minimal subset of the boot image that is needed to start the process and provide adequate response time—once control is passed to it, the image fetches the rest of itself.

2.7 Staging Image

As seen in FIG. 3, the staging image(s) 315 and 317 preferably comprise a diskless boot sequence of a small file size that initiates the boot sequence for a computing instance 303. This boot sequence may create a partial OS 307, a monitoring agent 305, and a network connection to the storage target 319.

Creation of the staging image(s) 315 and 317 involves creating a generic or template image that contains the initial stage of the boot loading sequence, such as a special-purpose boot loader and placing it in the cloud provider in a location known and accessible to the management sub-system of the cloud-bursting system. Such a location can be private to an organization, or publicly shared across multiple organization accounts through an access control mechanism implemented by the cloud provider. In other embodiments, such a generic image is stored in a packed file format on the cloud edge proxy 133 itself and copied and instantiated with specific instance configuration into a bootable Elastic Storage 324 volume that is attached to the computing instance 303 to initiate the boot sequence. Upon initiation of a "run-in-cloud" operation, the native API of the cloud provider are used to instantiate the generic image, passing to it configuration information about the actual instance that needs to be transferred from on-prem to the cloud.

The staging image is stored and implemented according to workflows in the cloud orchestrator 313 and the cloud platform's boot loader 302. The boot loader 302 initiates the boot sequence. To accomplish this, the on-prem edge proxy 125 signals the cloud-edge proxy 133 which staging image (315 or 317) to use. The signal is preferably sent through a connection 361 from the management interface 353 to the cloud edge orchestrator 313. The cloud-edge proxy 133 then passes initial connection parameters to the boot loader 302 and initiates the boot sequence. The boot loader then loads blocks belonging to image 315 (or 317), which may be (but does not have to be) partially loaded and cached in 133. When a staging image 315 (or 317) is minimally loaded to the point where it can continue to load itself over the network, it takes control from 302 and continues the bootstrap sequence. One or more additional staging images 317 may be included to provide an initial boot stage for a different OS or guest environments or according to different needs in terms of RAM, CPU, storage performance or special software license requirements.

2.8 I/O and Storage Policies

Once all of the underlying framework is setup, a tiered storage policy is defined. High tiered storage is generally coupled locally to the computing instance 303, to the cloud edge proxy, or as local network storage. Lower tiered storage is generally coupled to the on-prem edge proxy, to another instance, or as on-prem network storage. Tiers of storage can be further divided based on actual or theoretical performance, availability, and recovery requirements. Higher tiered storage generally has faster performance, while lower tiered storage generally has easier recovery capabilities and may offer higher storage capacity at lower cost and smaller footprint.

How an edge proxy directs I/Os depends on the protocol in which it receives information. The cloud edge proxy preferably appears as standard network storage such as SAN accessed through an iSCSI protocol where the cloud edge proxy is the target. In this embodiment, the cloud edge proxy would be considered an apparent network storage device. In other embodiments the proxy can receive information through other software or virtual hardware mechanisms, including but not limited to, traditional parallel SCSI, Fiber Channel Protocol, HyperSCSI, SATA, ATA over Ethernet (AoE), InfiniBand, and DSS. In yet another embodiment, a modification is made by installing a custom driver on the instance 303 to represent a local device through a custom protocol, or through file level protocols such as NFS or CIFS. In yet another embodiment, a modification is made by modifying the cloud hypervisor (not shown) to represent a local device through a custom protocol.

The policy for accessing on premises block storage needs to be arranged on the cloud edge proxy. In an embodiment, computing instances are re-directed to connect to the cloud edge proxy instead of connecting to their typical instantiated virtual disks. In some embodiments, the redirection is done on all attempts to access a virtual disk. In other embodiments, attempts to access a virtual disk are classified to determine how they need to be redirected. Regardless of the manner in which this redirection is setup, the cloud edge proxy uses a policy for determining how to handle read and write I/Os directed to it.

2.8.1 Writes

Writing logic 137 is configured to be cloud-only write persistence or on-prem write persistence. A combination of cloud-only write persistence and on-prem write persistence policy can be applied to a computing instance to differentiate handling of each of its virtual disks. In cloud-only write persistence, all write information for the specified virtual disk of the computing instance is stored locally on the host cloud comprised of one or more public servers. To a certain extent this would be the normal operation of the virtual machine running on the cloud, but in certain embodiments, the cloud edge proxy must determine not to re-route this information or simply to re-route this information back to the virtual machine.

In other embodiments, this information is re-routed through the cloud edge proxy to an associated form of storage such as a virtual disk, but still remains local to the cloud, such that the data is not re-routed to the on-prem edge proxy. Cloud-only write persistence is important for workloads that use and consume storage during operation, but the data is not needed for long term.

In an example of a cloud-only write persistence policy using FIG. 3, a computing instance transferred to 303 is running and the instance 303 directs all read and write calls to the storage target 319. The cloud edge 133 directs all write calls to a virtual disk 308. A special case of local writes relates to areas in the disk that are known to be non-persistent, and hence should not be written-back to the on-premises, thereby saving bandwidth and enhancing the performance for these writes. Examples include the "Swap" file used to handle files that are paged-out of memory and is useless across boots, or the /tmp directory on Linux which is defined to be non-persistent across boots. The system then automatically and transparently maps these files onto a local-only volume. The local only volume may be a virtual volume provided by the cloud edge proxy as a storage target, or an ephemeral virtual or physical disk attached directly to the computing instance, in which case further local network bandwidth savings can be realized. Cloud-only storage can also be configured explicitly through the management console to indicate storage that does not need to persist in on-prem.

An example where cloud-only write persistence is useful occurs when a computing instance has some input data and a workload requires running a multiphase analysis on the data. In this workload, the data may be processed into a local database or transformed into different data that is consumed by another workload, but when the report is complete, there is no need to keep the extra storage. The storage latency must be fast for performance purposes, but all of the information does not need to be reflected back to the on-prem edge proxy, so cloud-only write persistence is used.

For write information determined to be on-premises write persistence, all write information for the computing instance is stored in a deferred write mode where write information is stored locally until it can be sent to the on-prem edge proxy. In particular, writes are first performed locally on the cloud proxy; therefore, they suffer no latency penalty. After a set amount of time—for example, based on specified Restore Point Objective—or a threshold data size is met, these aggregated writes are then transferred over the network to the on-prem edge proxy. Before transferred to the on-prem edge proxy, writes may be aggregated and consolidated to reflect a crash-consistent or application-consistent point in time rather than the total volume of potentially overlapping writes performed, hence further reducing the size of transfer.

In an example of an on-prem write persistence policy using FIG. 3, a computing instance 303 is running and the instance 303 directs all read and write calls to the storage target 319. All write calls are aggregated in the secure cache 323, then streamed to disk management 359 where they are stored in the storage node 129.

An example where on-premises write persistence is useful occurs when one or more computing instances on the cloud platform need access to an on-premises database. Databases are very sensitive to read and write latency. In particular, write latency is an issue because every operation performed in the database is stored in a sequential log or journal. This log is useful for recovery purposes and error reporting if there is a crash or time-stamping the database, so the administrator can effectively roll back the database. However, constant log access for these sequential writes could slow down the overall latency of the network. In order to prevent this issue, these log writes can be aggregated in a "deferred write mode," and then transferred in bulk to the on-premises database through the edge proxies.

Figure 4:
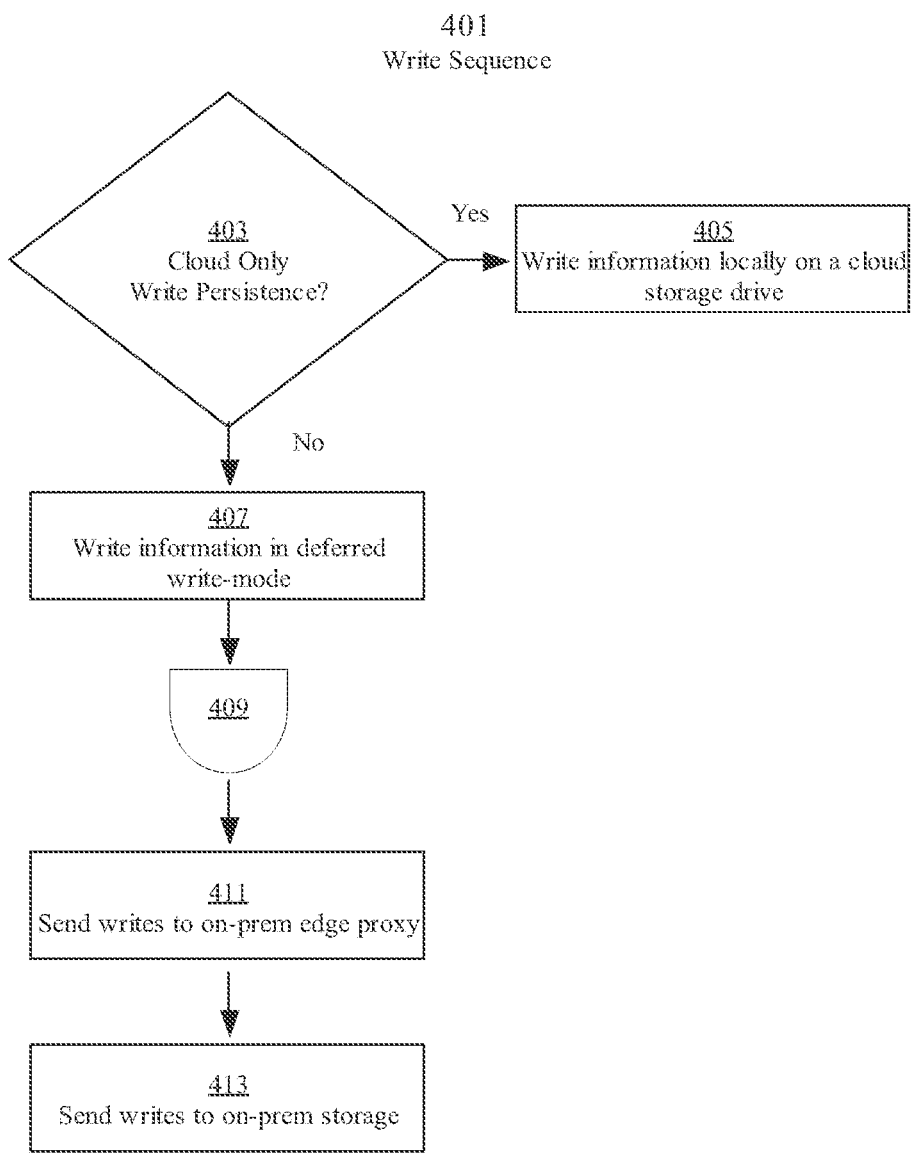
FIG. 4 is a flowchart illustrating a program flow for handling write requests.

FIG. 4 is directed to an embodiment of a process 401 whereby the cloud edge proxy determines how to handle classified write information. The cloud edge proxy first determines if the information is cloud only write persistence 403. This can be done by classifying all writes from a specific computing instance as one type of write persistence or having the instance itself define which calls are cloud only write persistence. If the write is cloud only write persistence, all write information is re-directed to a local storage device on the cloud 405. This can be a secure cache, a local drive on the cloud edge proxy, or a local drive on the instance that made the call depending on how the instance was configured.

As seen in the embodiment in FIG. 4, if the write information is not cloud-only write persistence, then write information is aggregated in a deferred write mode at block 407. After a predetermined amount of delay 409, or the cache is full and a write command arrives, aggregated writes are sent to the on-prem edge proxy at block 411. The on-prem edge proxy can then send the writes to on-prem storage 413. On-prem storage is preferably a virtual disk mounted to the on-prem edge proxy, whereby the disk management component controls this process. However, other embodiments have the on-prem edge proxy sending write calls directly to the physical networked storage or other virtual machines, depending on the needs of the application.

2.8.2 Reads

Reading logic 135 receives read IOs directed to a cloud edge proxy and returns requested information from one of three sources: from the secure cache, from local virtual disks, or from on-prem disks. First, the cloud edge proxy tries to fetch block storage data from the local secure cache. If possible, the cloud edge proxy pulls this data from the cache, and responds with the block storage accordingly. As seen in FIG. 3, an example would be computing instance 303 receiving data from cache 323 after calling storage target 319.

Secondly, when the data is unavailable at the secure cache, the cloud edge proxy will next check other virtual disks on the local system. In some embodiments, virtual disks are connected to the cloud edge proxy. As seen in FIG. 3, an example would be computing instance 303 receiving data from virtual disk 308 after calling storage target 319. In some embodiments, the cloud edge proxy has multiple clones of a single instance, in which case data may also be retrieved from storage belonging to another instance.

Third, when the data is unavailable both from the secure cache and other virtual machines on the local cluster, then the proxy forwards the request to the on-prem edge proxy. In an example embodiment using FIG. 3, an instance 303 makes a call to its target block storage 319, and the cloud edge proxy streams block data from streaming data path 321 from the on-prem edge proxy streaming data path 357. Then the computing instance 303 receives data from disk management 359.

Figure 5:
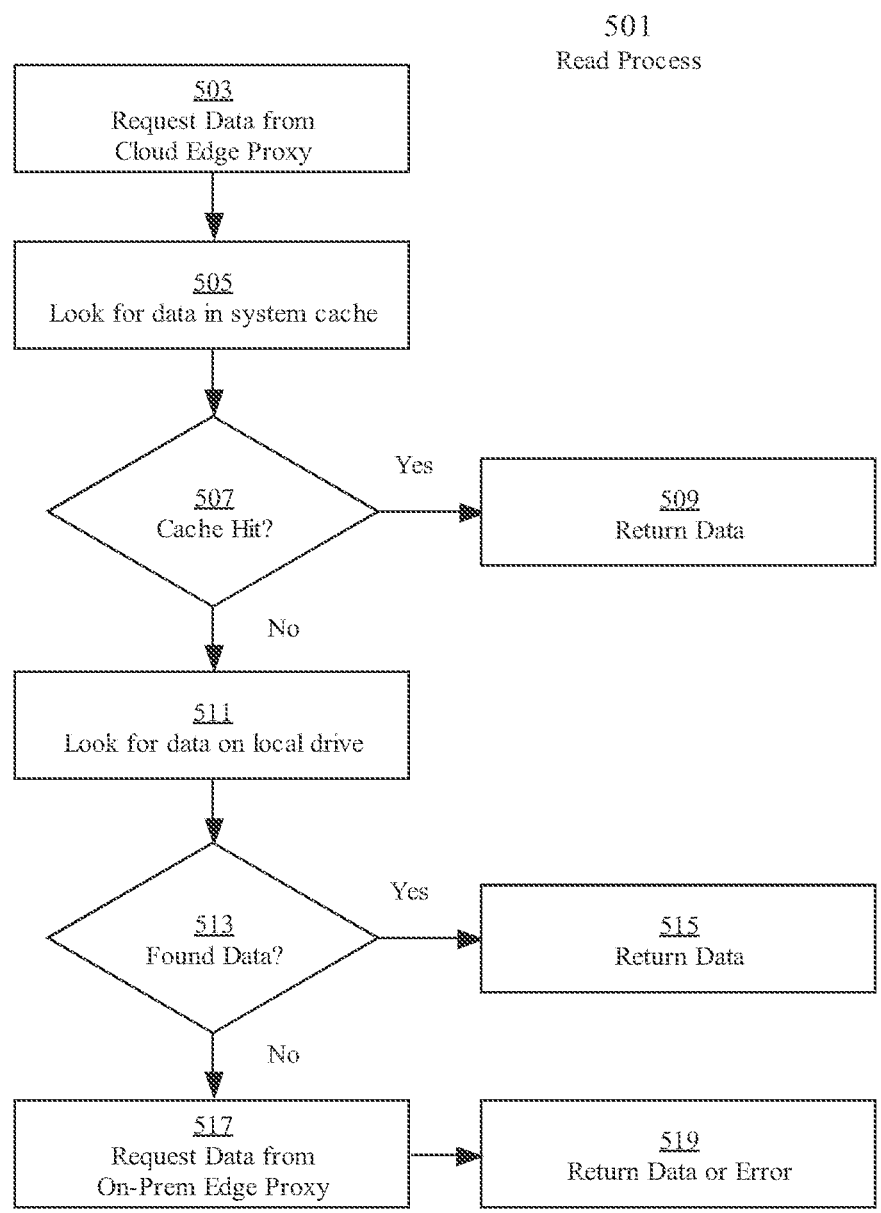
FIG. 5 is a flowchart illustrating a program flow for handling read requests.

FIG. 5 is directed to an embodiment of a process 501 whereby the cloud edge proxy determines how to handle read requests. After a read request from a computing instance in the cloud at block 503, the cloud edge proxy first searches for the data in the system cache at block 505. At block 507, if the information is found in the system cache, then the data is returned to the instance at block 509. If the information is not found in the system cache at block 507, then there is a search for data on the local drives at block 511. If the data is found on the local drives at block 513, then the data is returned to the computing instance at block 515. Alternatively, if, at block 513, the data cannot be found on the local drives, then the data is requested from the on-prem edge proxy at block 517. Data that is requested from the on-prem edge proxy is returned to the cloud edge proxy from the on-prem edge proxy at block 519. Alternatively, instead of returning the data requested, the on-prem edge proxy may also send the signature of the missing data at block 519, and the system cache, which maintains signatures of cached blocks, can check if the data already exists in the cache, in which case it resorts to "cache hit" scenario and serves the data locally. However, if the data is not found an error is logged and returned.

In some embodiments, depending on how the instance is configured, step 507 can skip directly to block 517 on a "NO" determination. For example, if there are no local drives on the cloud, then there would be no reason to search the local drives.

Several methods are used to improve the "cache hit" ratio. One method is to read ahead—read of larger blocks of data than requested by the OS or application, to improve the throughput. Another method is to anticipate what files will be needed based on locality of reference. For instance, Applications may consist of a number of files, including Dynamically Linked Libraries (DLLs). When the cloud-edge requests blocks from a certain application, the on-prem edge sends immediately blocks that comprise the DLLs, without waiting for the application do to it hence eliminating round-trip delays associated with synchronous request response operation. Yet another method includes profiling recently executed programs, stored in the operating system, and prefetching these programs ahead of time. Some embodiments, require file-level awareness. Since the system reflects a block-device, there is a need to identify what blocks comprise the files being requested. This is done by mounting the virtual disk and allowing the on-prem device to find the blocks associated with the files, creating dependency list of blocks such as if a certain block is fetched, all other blocks should be fetched.

Figure 23:
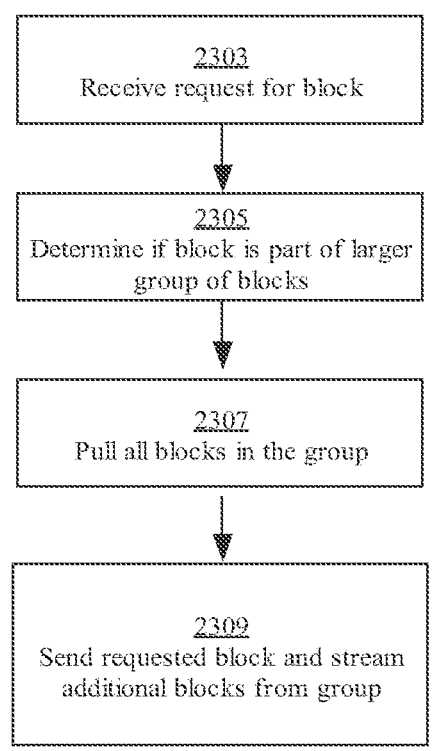
FIG. 23 is a flowchart illustrating a process for improving cache hits.

FIG. 23 is a flowchart illustrating a process for improving cache hits. The process 2301 starts at step 2303 by the on-prem edge proxy 125 (shown in FIG. 1) receiving a request for a block of data from the cloud edge proxy 133. The on-prem-edge proxy then determines if the block is part of a larger group of blocks such as a larger data set, a file, or a set of files at step 2305. At step 2307, the on-prem edge proxy 125 pulls all blocks in the group, and at step 2309, the on-prem edge proxy 125 sends the requested block and streams the additional blocks from the group back to the cloud edge proxy 133.

3.0 Cloud-On-Demand

Using one or more of the above framework elements, an embodiment may provide a Cloud-on-Demand (CoD) platform that enables a dynamic layout of components of an application so as to optimize the layout for cost, performance or capacity. In general, the platform provides configuration details to decouple and recouple the co-location between the computing resources and storage of an instance.

For example, the components of a multi-machine application, which could be either virtual machines or application containers, can be moved from on-prem to cloud (O2C) while keeping their storage on-prem. In the example embodiment in FIG. 1, instance 107 moves on cloud as virtual machine 141, but its associated local storage resource 109 remains on-prem in network storage node 129 coupled to the on-prem edge proxy 125.

In another example embodiment, the components of a multi-machine application can be moved from the cloud to on-prem (C2O). In an example embodiment using FIG. 6, an instance 141 decouples from its storage 143 and moves on-prem 602 as a computing instance 107, but its storage 653 remains on the cloud 651.

Figure 6:
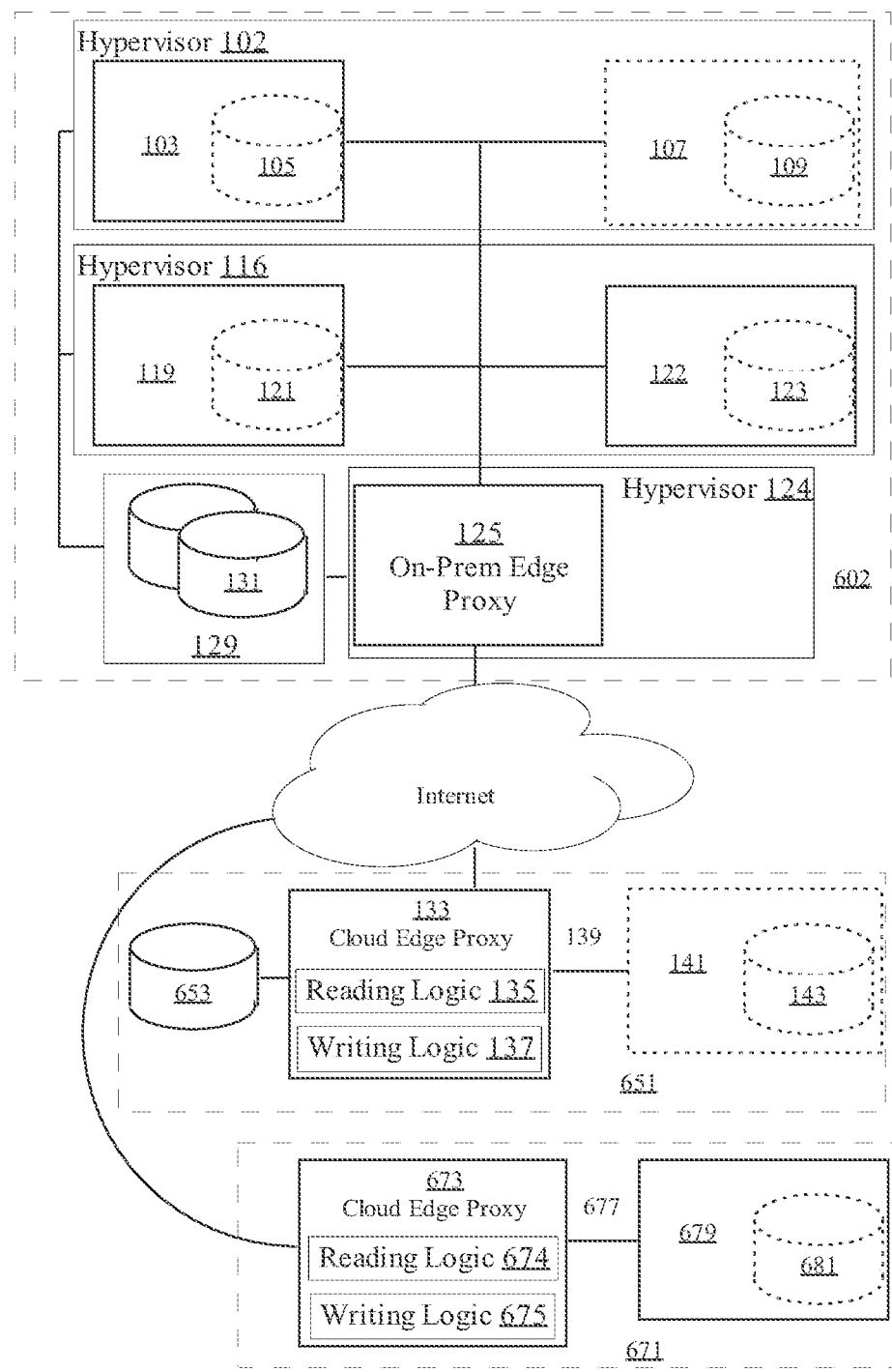
FIG. 6 is a block diagram illustrating a system architecture of a hybridized data center with two cloud hosts.

In a different example embodiment of C2O using FIG. 6, a computing instance 141 (already decoupled from its storage 131) moves on-prem 602 as a computing instance 107, and the storage 131 remains decoupled but gets associated back with instance 107, to the same situation it was before it moved to 141.

In another example embodiment, the components of a multi-machine application can be moved from one cloud to another (C2C). In an example embodiment using FIG. 6, an instance 141 decouples from its storage 143 and moves to a new cloud host 671 as computing instance 679, but the storage 653 remains on the local cloud host 651.

In a different example embodiment of C2C using FIG. 6, a computing instance 141 (already decoupled from its storage 131) moves to a remote cloud host 671 as a computing instance 679, and the storage 131 remains decoupled.

In other embodiments, at least a portion of the storage of a computing instance remains decoupled, and an instance or computing instance is transferred locally to on-prem 602 (O2O), to a cloud host 651 (C2C local), or to a different cloud host 671 (C2C local). In an example embodiment of O2O using FIG. 6, an instance 107 decouples from its storage 109, and the storage 131 remains on-prem 602.

As is further discussed herein, certain embodiments of Cloud-on-Demand also provide a platform to create new instances via cloning, and transfer them to the cloud, thereby enabling to scale-out multiple instances of the same type. These processes may be performed strictly locally or with additional steps to a remote host.

The major benefits of this system are fast movement and seamless transfer of instances to separate hosts and different clouds. The edge proxy setup allows for a change in network layout in minutes. The movement is done without laborious planning by a system administrator, meaning the task time associated with a "migration project" is replaced with streaming instances without the data, and hence reduced to a negligible factor. Furthermore, unlike migration projects where instances and their storage are transformed and replicated to target clouds, here the "transfer" can be started and reversed with ease, such that a hybridized system metrics may be tested rather than theorized before a migration project occurs. Transfers can be done automatically, based on business rules, or through a transparent manual movement where the system administrator does not need to manually configure instances for individual cloud hosts. In short, the system gives administrator flexibility in dynamically determining the layout of instances across multiple clouds.

3.1 Real-Time Instance Transfer

In one embodiment, the term instance transfer is used herein to refer to a main flow implemented to effect a real time transfer of an instance. The term instance transfer is used herein only for convenience to clearly illustrate an example, and other embodiments may implement the same flows and processes without using the term instance transfer. The real time transfer may be O2C, C2O, C2C (local), C2C or O2O as one skilled in the art will readily appreciate.

In the following descriptions, the computing instance starts on-prem and is transferred to a cloud host (O2C), but it should be understood by one in the art that the edge proxies may be used to transfer instances in any of the above described manners. A broader description involves the on-prem instance as a local instance and the on-prem edge proxy as a local edge proxy that facilitates transfer to a remote server with a remote edge proxy. The main example described herein has the instance start on-prem 602, and the on-prem edge proxy 125 decouples the instance from its storage disks. However, the same process can be initiated for an instance 141 starting on a cloud 651, wherein the cloud edge proxy 133 would decouple the instance.

Figure 7:
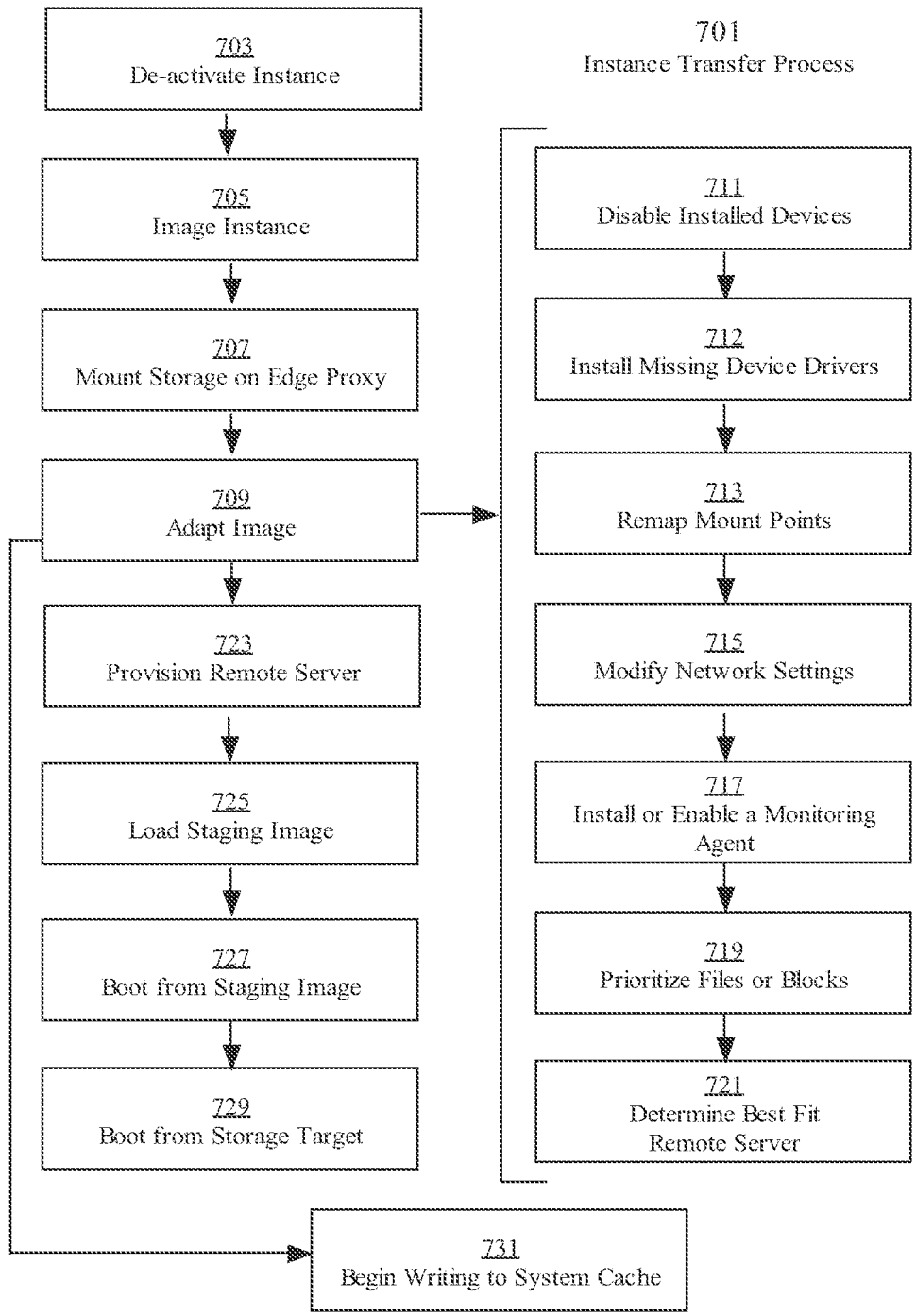
FIG. 7 is a flowchart illustrating a program flow of in an instance transfer process.

In a preferred embodiment, the instance transfer process comprises the steps as seen in FIG. 7, but one or more steps may be performed asynchronously, in parallel, or in a different order in other embodiments. The instance transfer process begins with an instance being selected either manually through the on-prem management system, or automatically following business rules programmed to the management system through its API, to be sent to a selected cloud host. The selection process is further described herein in later sections.

a. De-Activate Instance

In one embodiment, a selected instance is shut down (if powered on) and then gets disconnected from the Host OS by de-activating it at step 703. The instance has dedicated storage mounts such as virtual boot disks, file systems, and networked storage volumes that are locked for exclusive access by the local edge proxy.

The instance typically has hardware elements, software elements, and virtual hardware elements that connect the instance to a physical machine even when the instance is de-activated. These periphery elements can be removed as necessary. Optionally, any underlying connections to the network or other VMs are temporarily removed.

b. Imaging

In a second step, a local snapshot of the instance including its dedicated storage is created at step 705. This snapshot can be used for a quick roll back, reverse cloud bursting, or as point-in-time source for temporary clone-to-cloud operations.

c. Mount Storage on On-Prem Edge Proxy

In a third step, the on-prem edge proxy mounts the instance's storage to the on-prem edge proxy at step 707. In other embodiments, the storage is mounted to an additional storage device connected to the on-prem edge proxy. Under either embodiment, the on-prem edge proxy configures the storage of the instance to appear in its disk management system. The disk management system works in conjunction with the edge proxies to transparently provide storage to the computing instance.

In some embodiments, selected virtual disk or storage volumes may be migrated to a lower tier of storage for lower cost and better performance of the overall system. Simply vacating higher performance storage can increase system performance by providing more storage for the local workloads. In addition costs can be reduced. The reason why these virtual disks can be moved to lower-tiered storage is that the actual execution of applications against the data of that storage is performed in the cloud, whereas the on-prem storage is only used to handle the deferred and limited read-write activity by the cloud-edge. Hence, the IO sub system on-prem is offloaded by the cloud IO system in terms of throughput and performance.

In some embodiments, the on-prem edge proxy classifies one or more storage disks as cloud only write persistence or on-prem write persistence. In these embodiments, additional virtual storage disks are created and mounted on the cloud edge proxy when cloud only write persistence is selected.

For example in FIG. 3, virtual disk 308 is created to accommodate cloud write persistence of computing instance 303.

d. Adaptations

The on-prem edge proxy performs a quick analysis of the instance to be moved in step 709. The analysis includes determining OS type and version, assigned computing and storage resources, boot device and file-systems, data storage mount points, installed virtualization components, device drivers, namespaces and network configurations and license type. Based on the analysis, adaptations are applied to the imaged instance, including but not limited to (i) disabling installed devices, features and components which may not be compatible with target cloud at step 711; (ii) installing device drivers that match the target virtual hardware at step 712; (iii) remapping mount points to the edge appliance at step 713; (iv) modifying network settings at step 715; (v) installing or enabling a monitoring component to integrate with preferred cloud instance health reporting, if different than what is used on-prem at step 717; (vi) prioritizing potential storage to be pre-fetched at step 719; (vii) determining a best-fit remote server type, accounting for RAM, CPU, storage performance and special software license requirements (e.g. 3rd party database software) at step 721.

(i) Disable Installed Devices, Features and Components

In an embodiment, drivers and auxiliary software are removed or disabled from the instance to fully isolate the instance from the host in step 711.

Some virtual hardware is necessary for running an instance on the underlying host operating system. This virtual hardware reflects to the instance and causes associated drivers to be installed. This virtual hardware also causes associated device paths and locations to be registered in the instance. Additionally, there is usually auxiliary software installed within the instance to facilitate communication between the instance and the underlying virtualization environment. This auxiliary software may communicate with the host OS or enforce instance behaviors that are necessary for the host OS in the local network, but may be irrelevant for a host OS located remotely.

In an embodiment, this auxiliary software is removed or disabled to fully isolate the virtual machine from the host OS, and any additional drivers or virtual hardware installed on the instance are disabled.

(ii) At step 712, some virtual hardware is necessary for running an instance on the underlying host operating system. If the virtual hardware on which the instance is running on-prem is different than the target cloud hardware, then it may be the case that the relevant device drivers may not exist on the current image, in which case they need to be installed offline, prior to booting them on the target hardware.

(iii) Remap Mount Points

Another embodiment includes remapping mount points from current virtual storage devices or networked storage to their proxied addresses as reflected by the cloud edge proxy in step 713. These changes will be reflected upon booting the computing instance remotely. The cloud host OS will receive a list of available storage devices to be accessed through virtual hardware elements like a SCSI bus or a fiber channel and the virtual storage devices appear as local drives.

In one embodiment, when an instance is adapted to a remote host, its storage is remounted to appear as a standard network storage such as SAN. This standard network storage is preferably accessed through iSCSI, but in other embodiments the storage may be accessed through other software or virtual hardware mechanisms, including but not limited to, traditional parallel SCSI, Fiber Channel Protocol, Hyper-SCSI, SATA, ATA over Ethernet (AoE), InfiniBand, and DSS. In other embodiments, a modification is made to the instance by installing a custom driver to represent a local device through a custom protocol. The virtual storage devices and virtual hardware elements as they appear in the guest OS are modified depending on which mechanisms are used to reroute the data path.

In some embodiments, the on-prem edge proxy classifies one or more storage devices as cloud only write persistence or on-prem write persistence. Storage device paths may need to be split and re-routed to multiple different storage devices (some on-prem and some on cloud), in order to accommodate cloud only write persistence or other tiered storage needs.

(iv) Modify Network Settings

An aspect of an embodiment includes modifying network settings that may not be applicable to the cloud-side network, or as designated by the administrator in the task definitions at step 715. The networking elements need to updated or deleted, so the instance can be transferred. In a preferred embodiment, networking addresses and representations on the instance are modified to reflect a new location on the cloud. These modifications include updating networking services such as DNS, routing services, and other network devices such as NAS or a directory service.

In one embodiment, at least some networking configurations are deleted for later configuration on the cloud. At least some of these settings can be configured during the first stage of a cloud hosted boot sequence.

(v) Install or Enable a Monitoring Agent

An aspect of an embodiment includes installing or enabling a monitoring agent at step 717. Any instance created in the cloud preferably has an agent enabled or installed and mounted on the instance that communicates with the cloud edge proxy. The cloud edge proxy then preferably translates this monitoring information, so it can be fed via the transport layer to the management service.

Monitoring information comprises storage latency, task times, CPU usage, memory usage, available system resources, and error reporting.

(vi) Prioritize Pre-fetched Storage

Another aspect of an embodiment includes estimating and prioritizing potential candidate files and/or corresponding blocks to be pre-fetched by the cloud side cache for a correct boot or efficient execution in the cloud at 719.

To accomplish this, the on-prem edge proxy is setup to map files that are likely to be accessed in the boot sequence or run state to their corresponding logical block addresses (LBAs). In a preferred embodiment, these blocks reflect previous modifications to the network settings and virtual storage devices.

Figure 21:
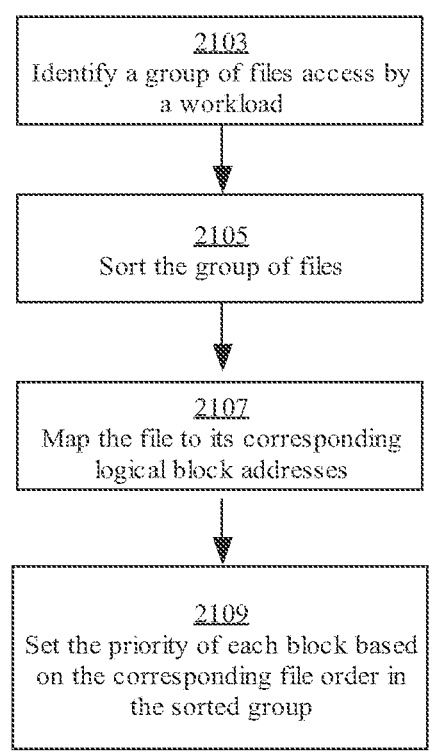
FIG. 21 is a flowchart illustrating a process for prioritization of blocks by file.

The files can be determined through a static analysis or a dynamic analysis. FIG. 21 is a flowchart illustrating a process for prioritization of blocks by profiling the files used in a workload or boot process. At block 2103, the process starts by identifying a group of files accessed by the workload. For example, if the boot loading process is the current workload, this step occurs by recording the files initially accessed by the boot sequence. For other workloads, this analysis may turn on the use of accounting services provided by the guest OS. For example, the MICROSOFT WINDOWS operating system keeps an accounting of what files are being accessed on a regular basis. At block 2105, the group of files identified are sorted based on how often or how early they are accessed. For example, in a boot loading process, the files that are sequentially accessed, giving a natural sorting order for the files. For other workloads, the sorting may be based on how often a filed is accessed over a given period. Once each file is sorted, each file may be mapped to a range of logical block addresses at block 2107. Then these logical block addresses are prioritized based on the corresponding file order in the previously sorted group at block 2109.

Figure 22:
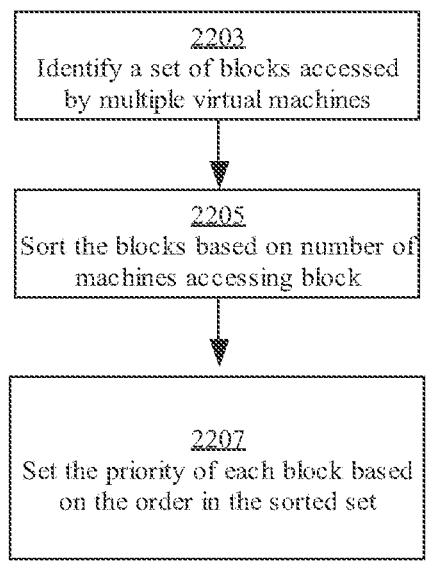
FIG. 22 is a flowchart illustrating a process for prioritization of blocks by hotspot analysis.

A dynamic analysis involves accessing an instance through the underlying virtualization environment to see what block storage is routinely accessed. FIG. 22 is a flowchart illustrating an algorithm for prioritization of blocks by hotspot. In this analysis technique 2201, the on-prem edge proxy follows how many virtual machines access similar portions of block storage. The process starts at block 2203 by identifying a set of blocks access by multiple virtual machines. The blocks are then sorted based on how many virtual machines are accessing the same block 2205. At block 2207, if many machines access the same block storage, then these blocks are considered hot, and they have a higher priority than blocks that are accessed by less machines.

In another embodiment, a hybrid algorithm is used that leverages information from a group of one or more of static and dynamic analysis techniques.

By using one or more of these static and dynamic analysis techniques, the on-prem edge proxy determines which block storage is accessed most often for an instance. The on-premises edge proxy then prioritizes the block level storage for an instance based on how often particular blocks are accessed and how early these blocks are accessed for a particular application or for the boot process or a particular workload. These blocks may be streamed in order of priority from the on-prem edge proxy to the cloud edge proxy at block 731 in FIG. 7.

(vii) Determine a Remote Server

Another aspect of an embodiment includes finding a best-fit remote server, accounting for RAM, CPU, storage performance and special software license requirements (e.g. 3rd party database software) in step 721. The on-prem edge proxy extends the data center by transferring individual components in a multi-machine application to a remote server that meets the needs of each component in terms of capacity, performance, cost, or any combination thereof. Different computing instances may be offered to maximize these needs to different degrees. The local edge proxy has a list of computing instances that are capable of provisioning. Determining the proper computing instance includes matching the resources of the on-prem instance with the resources available remotely. One way to assess this is to extract the resources that are used on-prem, and map them to a cloud instance with similar resources. This may include determining how many CPUs, how much RAM, and how many Input/Output Operations Per Second (IOPS) are required by the image.

e. Provision Remote Server

In some embodiments, a remote server may be provisioned at step 723 based on the specifications determined from step 721. In a preferred embodiment, the remote server 802 comprises a virtual remote server, where multiple instances of different types of remote servers may be created. After determining how many CPUs, how much RAM, and how many Input/Output Operations Per Second (IOPS) are required by the image, the edge proxy 133 may provision a remote server 802 of a type having these parameters.

f. Begin Writing to System Cache

In an embodiment, blocks determined in step 719 are written to the secure cache on the cloud edge proxy at step 731. This process is done asynchronously or in large chunks such that calls made from the cloud edge proxy 133 to the on-prem edge proxy 125 will not be slowed.

g. Load the Staging Image

In some embodiments, loading the staging image includes transferring the staging image from the remote edge proxy to the provisioned remote server.

Figure 8:
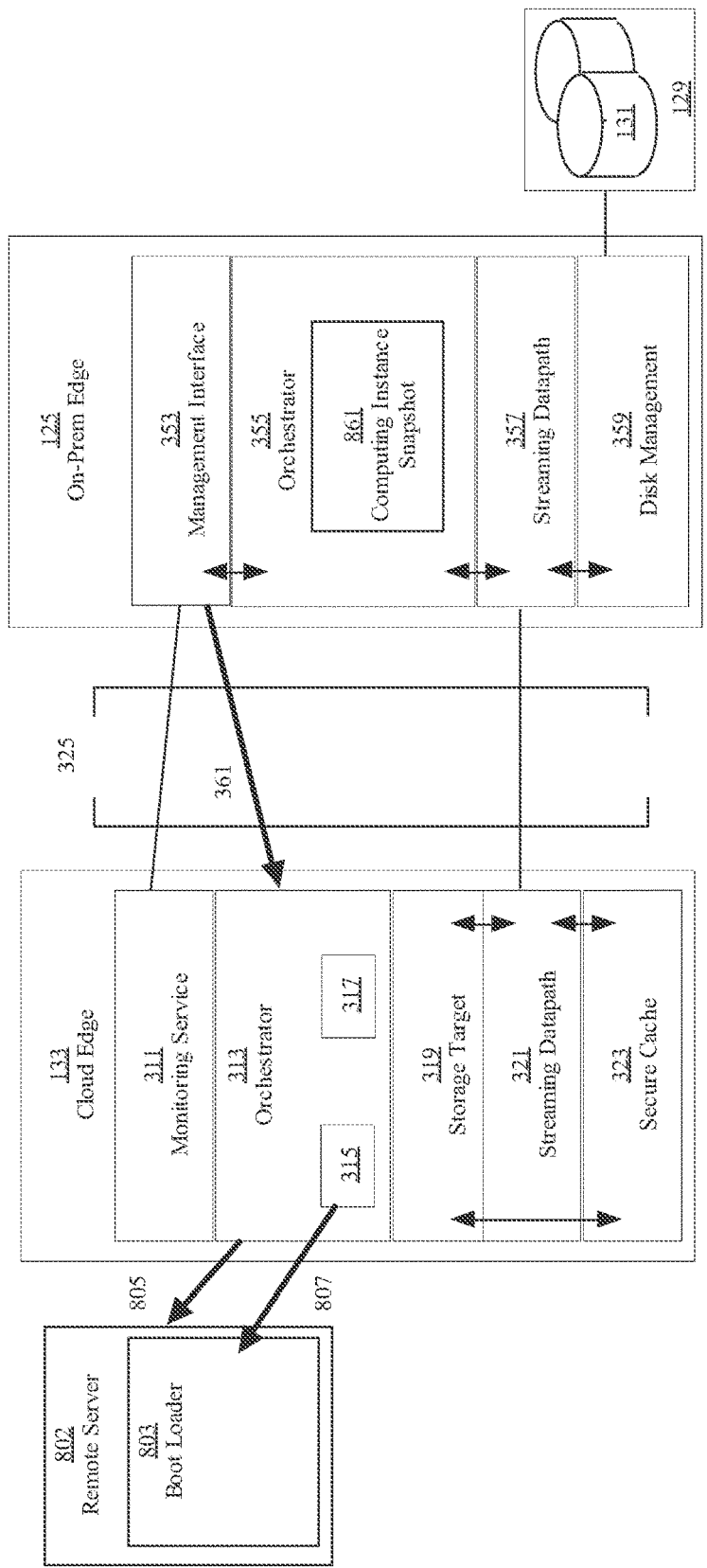
FIG. 8 is a system blueprint illustrating an edge proxy system loading a staging image.

In one embodiment, loading a pre-imaged staging image starts the boot sequence at 725. In an embodiment as seen in FIG. 8, the cloud platform provides an image or service that contains at least one boot-loader 803. A boot loader is a program that loads an operating system. Examples of boot loaders include, but are not limited to, LILO and GRUB, and also include paravirtual boot loaders such as PV-GRUB.

The boot loader 803 initiates the boot sequence of the staging image 315 determined in step 709. To accomplish this, the on-prem edge proxy 125 signals the cloud-edge proxy 133 which staging image (315 or 317) to use. The signal is preferably sent through a connection 361 from the management interface 353 to the cloud edge orchestrator 313. The cloud-edge proxy 133 then passes initial connection parameters to the boot loader 803 and initiates the boot sequence. The initial connection parameters and communication to initiate a boot sequence are preferably sent through a connection 805 of the cloud orchestrator 313 to the boot loader 803. The boot loader 803 then connects 807 to the staging image 315 on the cloud edge proxy 133 and loads the staging image specified.

In an alternative embodiment, an on-prem Orchestrator 355 may directly provision and configure the boot loader 803 through an instance management API provided by the cloud provider, hence controlling the full configuration picture and provisioning operation across the various components, without delegating higher privileges or special access rights to individual components in the cloud. This alternative embodiment may be used in deployments where the on-prem environment has higher trust or security level than the cloud environment.

During this time, boot instructions for the computing instance 861 are being streamed to the secure cache 323.

h. Booting from a Staging Image

At step 727, the staging image boot sequence contains a partial image of a boot sequence and additional software components necessary to connect the booting instance to disks outside the cloud edge proxy. The partial image is OS-specific, containing the initial boot sequence for a specified OS. The additional software components facilitate connecting the staging image to virtual disks that appear to be located on the cloud edge proxy. For example, these additional software components may be a software initiator using an iSCSI protocol.

Figure 9:
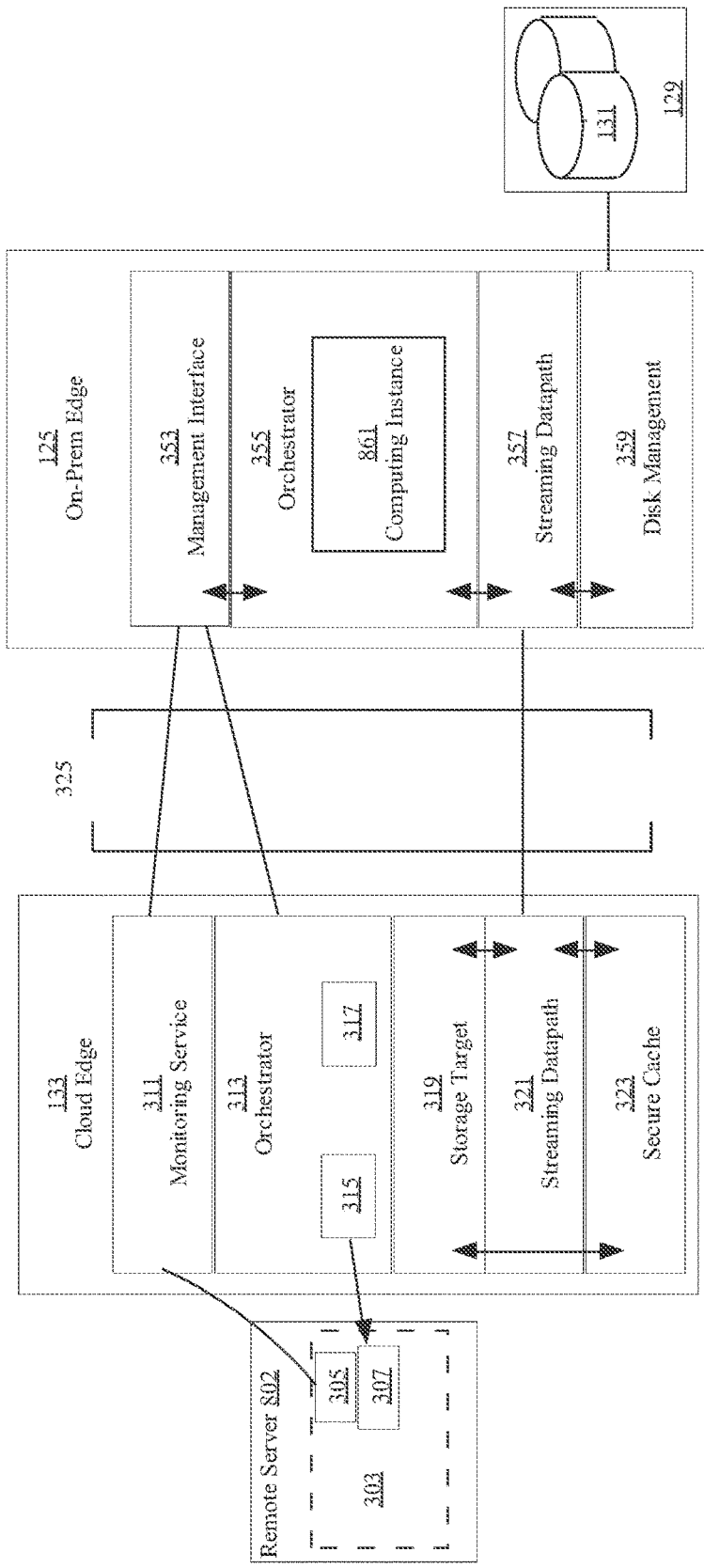
FIG. 9 is a system blueprint illustrating an edge proxy system booting a partial OS from a staging image.

In an embodiment as seen in FIG. 9, the staging image 315 begins a partial OS 307 and a monitoring agent 305. In a preferred embodiment, the monitoring agent 305 connects to the monitoring service 311, while the partial OS 307 receives boot instructions from the staging image 315. In a preferred embodiment, the staging image 315 is only a partial image and does not contain enough boot instructions to start a full computing instance 303.

i. Booting from a Storage Target

At step 729, the rest of the computing instance 303 boots through a network boot image rather than the staging image previously discussed. The boot sequence streams through the proxy system from an on-prem disk 131 mounted in step 707, but the transfer process is significantly sped up by the system caching created in step 719 and loaded in step 731. If a boot instruction is not available in the system cache, then it is pulled from on-prem.

Figure 10:
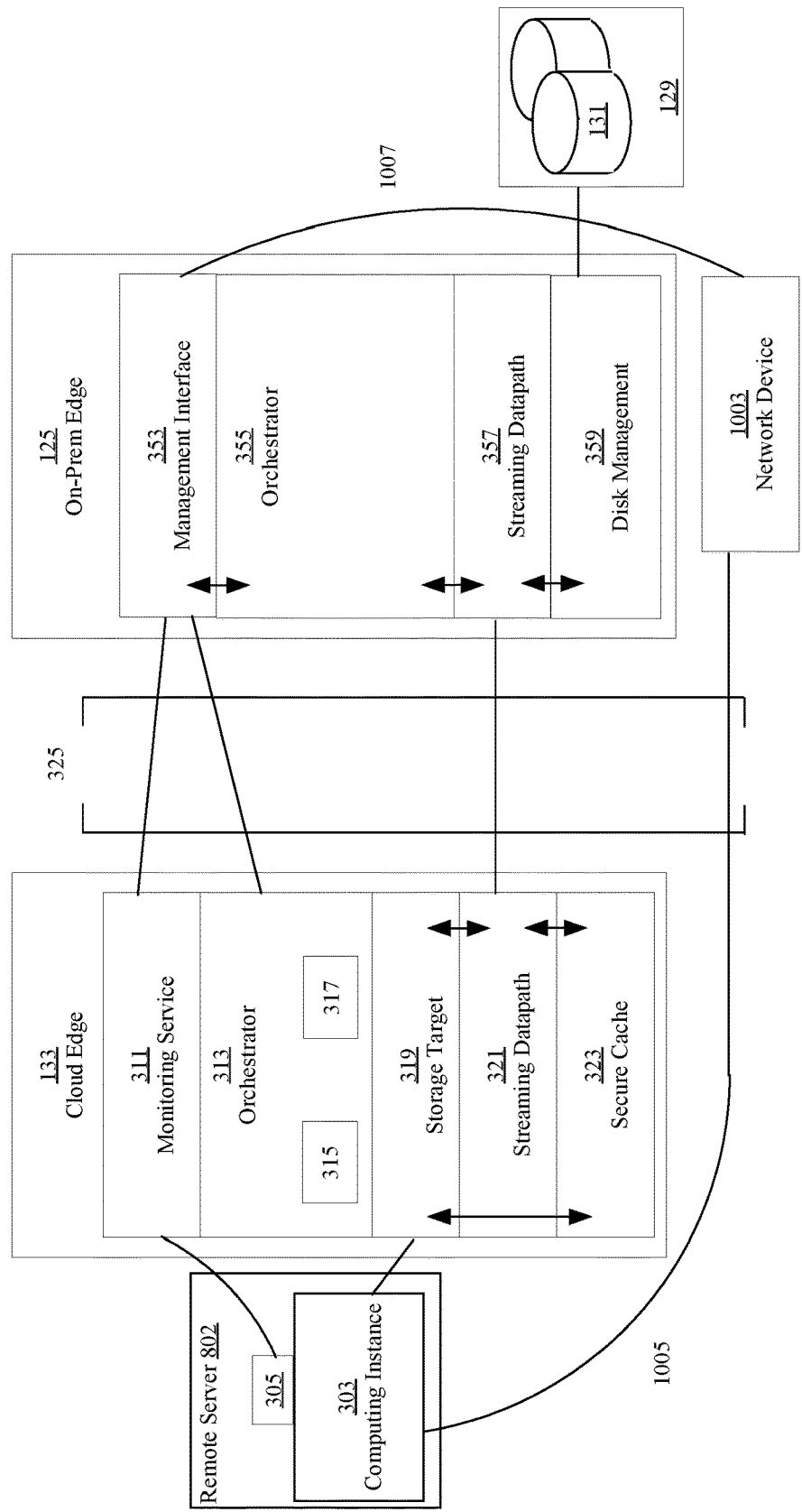
FIG. 10 is a system blueprint illustrating an edge proxy system booting a computing instance from a storage target.

FIG. 10 is a system blueprint illustrating an edge proxy system booting a computing instance from a storage target. The boot sequence is transferred from the staging image 315 to the storage target 319 within the cloud edge proxy 133. The network boot occurs through the network connection between the computing instance 303 and the storage target 319. Under this framework, the rest of the boot sequence and application information can be transferred to the computing instance 303.

Figure 11:
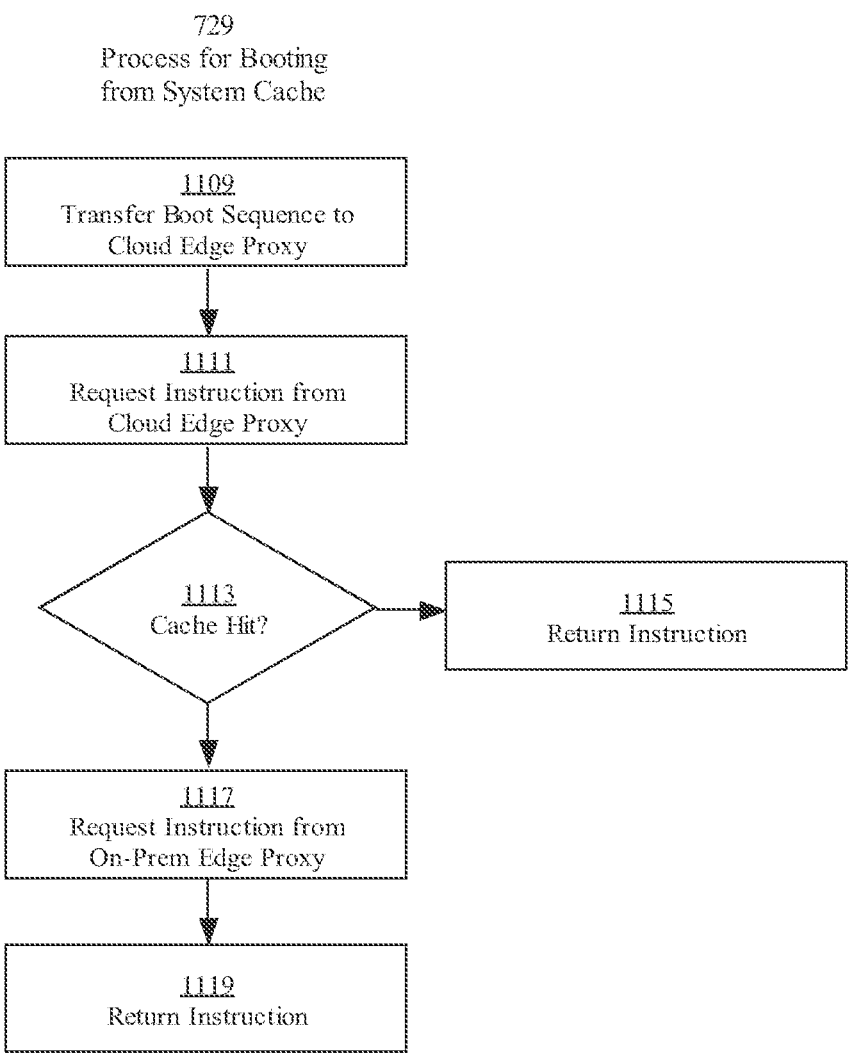
FIG. 11 is a flowchart illustrating a program flow to receive boot instructions for a computing instance boot.
Figure 12:
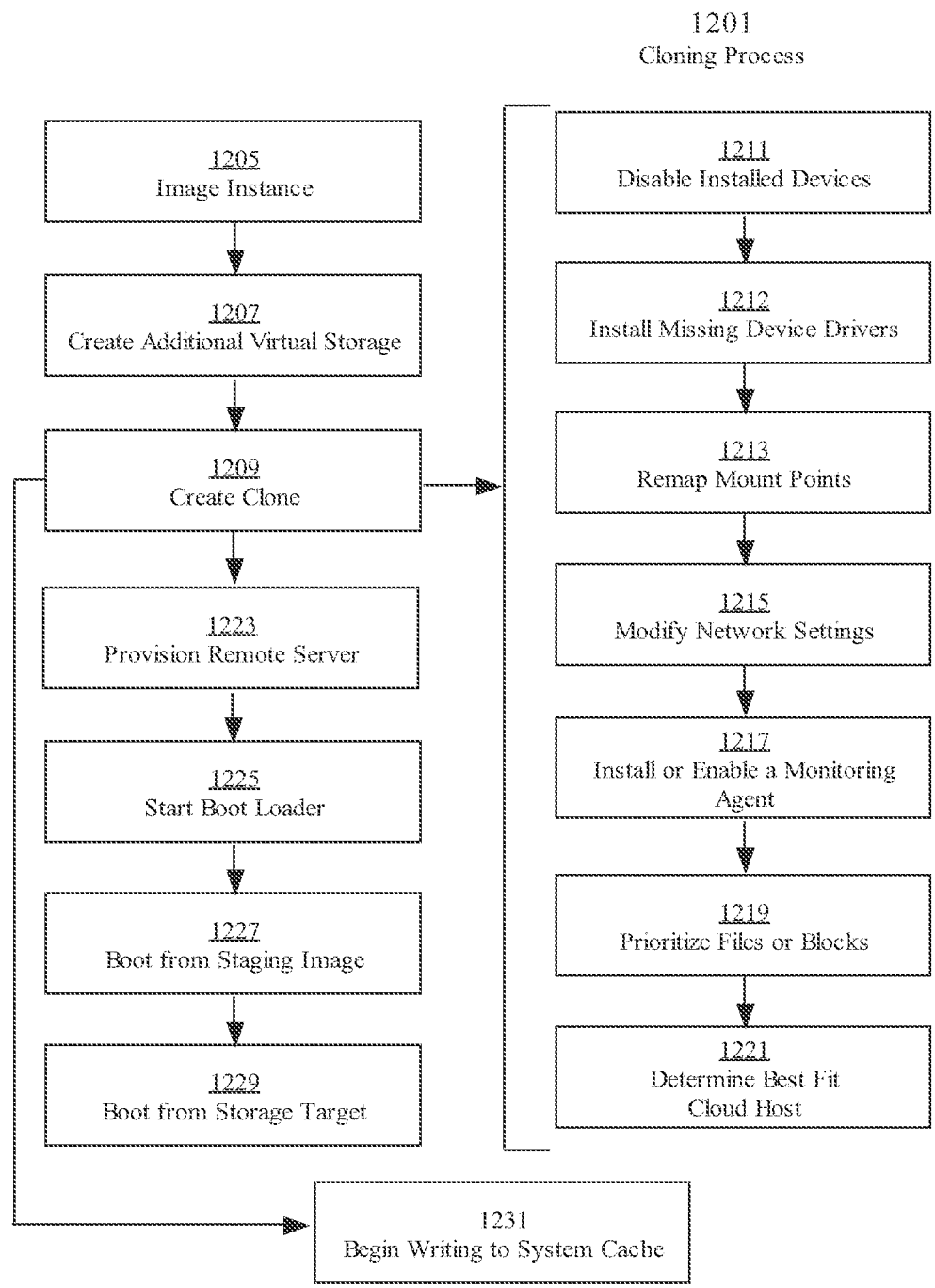
FIG. 12 is a flowchart illustrating a program flow of a cloning process.

FIG. 11 is a flowchart illustrating a program flow to receive boot instructions for a computing instance boot under the system blueprint shown in FIG. 10. The process for reading the cache for booting instructions of the computing instance 729 begins when the boot sequence is transferred from the staging image boot sequence to the computing instance boot sequence at step 1109. At this point, the cloud edge proxy 133 has at least some of the prioritized blocks from the on-premises edge proxy stored in a secure cache 323. When a specific boot instruction is needed at step 1111, the cloud edge proxy fetches block storage data first from the local secure cache. When the data is available at decision point 1113, it is returned to the booting computing instance at step 1115. When the data is unavailable from the secure cache on the local cloud network at decision point 1113, then the proxy requests additional boot instructions from the on-premises edge proxy at step 1117. Because the original image is on-prem, the instruction can be returned at step 1119. Additional error reporting may be built into this process to optimize cache hits and handle loss of instructions.

Turning back to FIG. 10, the running instance 303 will have any previously modified references set to associated virtual disks 131 in the cloud edge proxy. References that do not need to be re-routed through the proxy system are accessible directly through the transport layer 325. In some embodiments, network devices 1003 or other instances may be re-routed through the cloud edge proxy 1007 or simply directly accessed 1005 through the transport layer 325.

At this point, the computing instance 303 is running in the cloud with its dedicated storage proxied by the cloud edge proxy 133. Further optimizations for storage performance, security, data transfer efficiency and data deduplication may be employed by the cloud edge proxy for better storage and application response time. The optimizations may be applied immediately according to a feedback system using the monitoring service 311 or in accordance with workflows previously setup by a system administrator.

Many of the embodiments herein described refer to the instance starting on-prem with a local on-prem edge proxy available and a remote cloud edge proxy available. These descriptive embodiments are purely for instructive purposes. Any and all of these steps may be performed on an instance that starts in the cloud with a local cloud edge proxy available and one or more remote edge proxies available on-prem or on another cloud host.

For example, the embodiments describing an on-prem edge proxy 125 described in FIGS. 8, 9, and 10 can translate to using a cloud edge proxy instead, such as the cloud edge proxy 133 in FIG. 6. The instance transfer process of C2O would be a transfer of an instance (141 with 143) or a computing instance (141 without 143) from the cloud 651 to on-prem 602. The local edge proxy would be a cloud edge proxy 133 instead of an on-prem edge proxy 125 as described in FIGS. 8, 9 and 10. The remote edge proxy would be an on-prem edge proxy 125.

Similarly, the instance transfer process described in FIGS. 8, 9, and 10 describing an on-prem edge proxy 125 can be analogized to a cloud edge proxy 133 in FIG. 6 for a C2C. The transfer here is from the cloud 651 having a local cloud edge proxy 133 to another cloud 671 having a remote cloud edge proxy 673.

In embodiments where the local edge proxy is on the cloud, the local edge proxy preferably does not have a management interface. Instead, the communications of the management interface are independently sent from the on-prem edge proxy. In these embodiments, the local edge proxy preferably does not have a disk management service, but instead the storage target directly manages I/O.

In other embodiments, the cloud edge proxy may contain additional components such as a management interface or a disk management service. These components can be independently configured through a VPN connection.

3.2 Stateless, Stateful and Run-Time Instance Transfer

Another feature relates to transferring more or less information depending on whether the workload to be transferred is stateless, stateful, or requires run-time information to seamlessly transfer.

The form of instance transfer can be stateless, stateful, or run-time. In a stateless transfer, the persistent memory is remounted in the disk management system of the on-prem edge proxy as discussed in step (c), but no data is replicated in the volatile memory or CPU components of an instance as it is booted. In contrast, instance transfer of a stateful or run-time instance includes capturing and replicating state information or the run-time information of a machine. State information may include volatile memory and session variables associated with a particular instance. The run-time information of a machine may additionally comprise the CPU execution, the in memory CPU instruction set, the memory state and register values, as well as run-time variables.

Capturing the state or run-time information of a machine occurs as an additional step in the decoupling process. In addition to imaging the disk volumes and hardware set of an instance, the information needs to be captured. When determining a best fit staging image, these configurations are additionally taken into account.

Replicating the state or run time information of an instance occurs as an additional step in the boot process. In addition to booting the computing instance from target storage, the CPU, in memory CPU instructions set, the memory state, and register values are replicated from the target storage.

Manipulation of virtual hardware or even state information on a cloud host often presents security issues to the cloud provider. Because complete access is often considered a security issue by the cloud host provider, other embodiments exist on a spectrum between cold booting and a run-time transfer.

Other embodiments include temporarily putting an on-prem instance into standby or hibernation mode to capture at least some stateful or run-time information. In this manner, this additional information may be captured and replicated to fully enable a computing instance before commencing computational operations.

3.3 Cloning

Cloning refers to the process of sending a clone of an instance on-prem to the cloud without necessarily de-activating the instance being cloned. In addition to the benefits of having more machines working in a multicomponent application, this process can be useful in creating additional forms of storage, testing moving an instance to a cloud host, and creating storage by allotting cloud write persistence to an instance.

The cloning process has many steps similar to the instance transfer process. Rather than reproducing those steps in their entirety, the steps are presented here in a summary fashion with the difference between the steps highlighted.

Using the management interface, an administrator or automated administrator selects a local computing instance to clone and optionally identifies a remote host. If a remote host is chosen, the remote host must have an edge proxy distinct from the local edge proxy. If a clone is to be created on the local host, some additional steps herein described are added or removed to optimize performance. Some of the embodiments herein describe will focus on cloning a computing instance located locally on a cloud host to highlight the differences in performing such an action.

In a first step 1205 for cloning, a snapshot of the selected computing instance and any local storage is created. The dedicated storage of the computing instance located on-prem is optionally additionally taken. If the computing instance selected has cloud-only write persistence, the snapshot may be used later as an additional source of boot instructions and application reads.

In a second step 1207 for cloning, a new set of virtual disks or storage volumes are cloned from the snapshot. If the clone has cloud only write persistence, the cloned storage is created locally on the cloud. If the clone has on-prem write persistence, the cloned storage is created on-prem.

If the computing instance selected has cloud-only write persistence and the clone has cloud-only write persistence on the same local cloud host, the storage volume for the clone optionally does not need to be created because the clone and the computing instance may use the same source storage. In an example embodiment according to FIG. 13, the selected computing instance 1363 has cloud only write persistence stored in storage volume 1353. The cloned computing instance is also selected to have cloud-only write persistence, so a second storage volume need not be created.

In a third step 1209 for cloning, the local edge proxy performs a quick analysis of the instance to be cloned including, but not limited to, OS type and version, assigned computing and storage resources, boot device/file-system, data storage mount points, installed virtualization components, namespaces and network configurations. Based on this analysis, a clone is created preferably from the snapshot taken in the first step with the following adaptations.

(i) In a first adaptation step 1211 of the cloning process, installed devices, features, and components which may not be compatible with target cloud, are disabled. In addition, instance state that cannot be duplicated over multiple instances needs to be re-generated and configured properly. For instance, machine name/ID needs to be unique and hence recreated on the clone, and then the machine needs to join the domain. Optionally, this step is not necessary if the clone is created locally. For example, in the example embodiment disclosed in FIG. 13, the clone 1365 to be created from the selected computing instance 1363 is local, so it does not need to disable any questionably compatible devices.

(ii) In a second adaptation step 1212 of the cloning process, if the virtual hardware on which the instance is running on-prem is different than the target cloud hardware, then it may be the case that the relevant device drivers may not exist on the current image, in which case they need to be installed offline, prior to booting them on the target hardware.

(iii) In a third adaptation step 1213 of the cloning process, the mount points are remapped from current virtual storage devices or networked storage to their proxied uniform resource identifiers (URIs) or addresses as reflected by the edge proxy system. Optionally, this step may be removed or significantly paired down if the clone is created locally and the same storage source is being used. For example, in the example embodiment disclosed in FIG. 13, the clone 1365 to be created from the selected computing instance 1363 can use the same source storage either 131 or 1353.

(iv) In a fourth adaptation step 1215 of the cloning process, network settings may need to be modified.

(v) In a fifth adaptation step 1217 of the cloning process, a monitoring component is installed or enabled to integrate with the monitoring service of the local edge proxy.

(vi) In a sixth adaptation step 1219 of the cloning process, candidate files or corresponding storage LBAs are prioritized to be pre-fetched by the system-cache for an optimized boot and efficient execution of the cloned computing instance.

(vii) In a seventh adaptation step 1221 of the cloning process, a best fit remote server is determined, accounting for RAM, CPU, storage performance and special software license requirements (e.g. 3rd party database software).

In a fourth step 1223 for cloning, the type of remote server from 1221 is provisioned through the cloud edge proxy.

In a fifth step 1225 for cloning, a pre-imaged staging image is loaded by a boot loader and initial connection parameters are passed to the boot loader.

In a sixth step 1227 for cloning, the staging image boots and creates the proxy system paths necessary to transfer the boot sequence to the target storage of the edge proxy.

In a seventh step 1229 for cloning, the rest of the computing instance is booted through a network boot image rather than staging image previously discussed.

Figure 14:
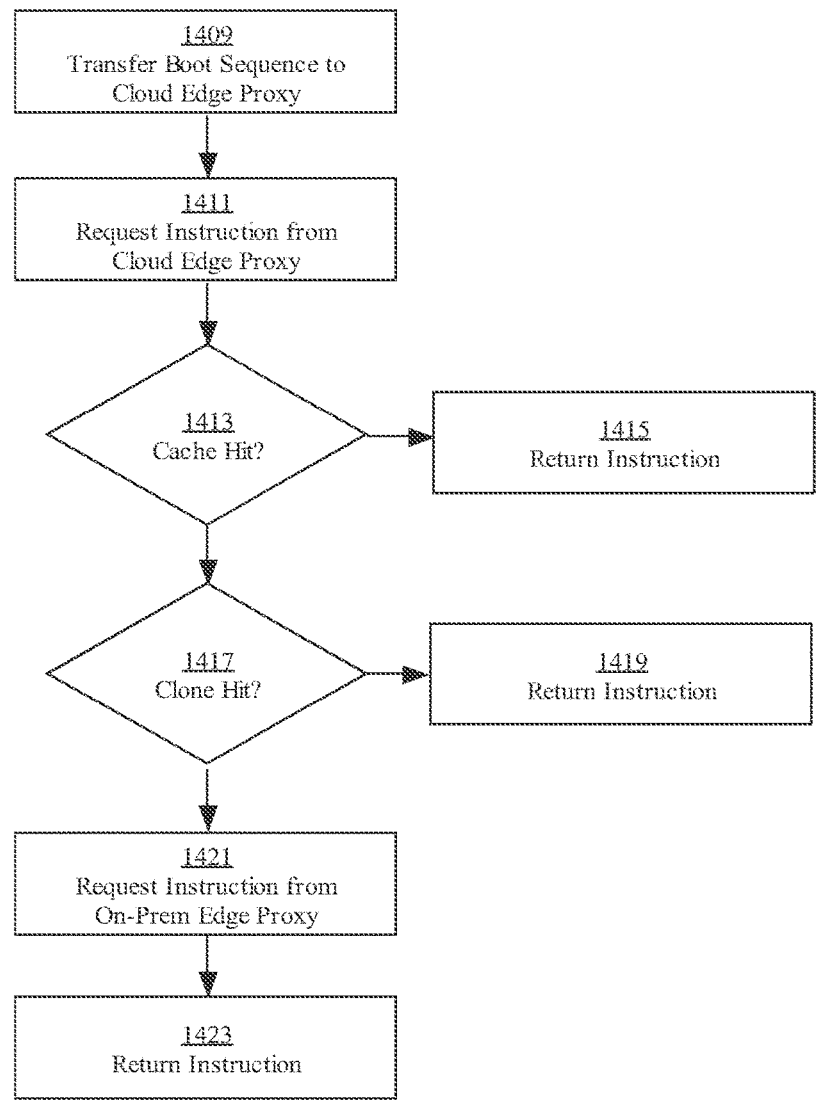
FIG. 14 is a flowchart illustrating steps to receive boot instructions for a computing instance when another computing instance is local.

As seen in FIG. 14, the booting sequence of the computing instance in step 1401 begins when the boot sequence is transferred from the staging image boot sequence to the computing instance boot sequence in step 1409. At this point, the cloud edge proxy has at least some of the prioritized blocks from the on-premises edge proxy stored in a secure cache. When a specific boot instruction is needed in step 1411, the cloud edge proxy fetches block storage data first from the local secure cache. When the data is available in step 1413, it is returned to the booting computing instance in step 1415. When the data is unavailable at the secure cache in step 1413, the cloud edge proxy will next check other instances on the local cloud system to see if the data can be cloned from one of these instances in step 1417. If the data is available in a local instance, then it is simply returned in step 1419. When the data is unavailable both from the secure cache and other instances on the local cloud network in step 1417, then the proxy requests additional boot instructions outside the firewall from the on-premises edge proxy in step 1421.

Figure 13:
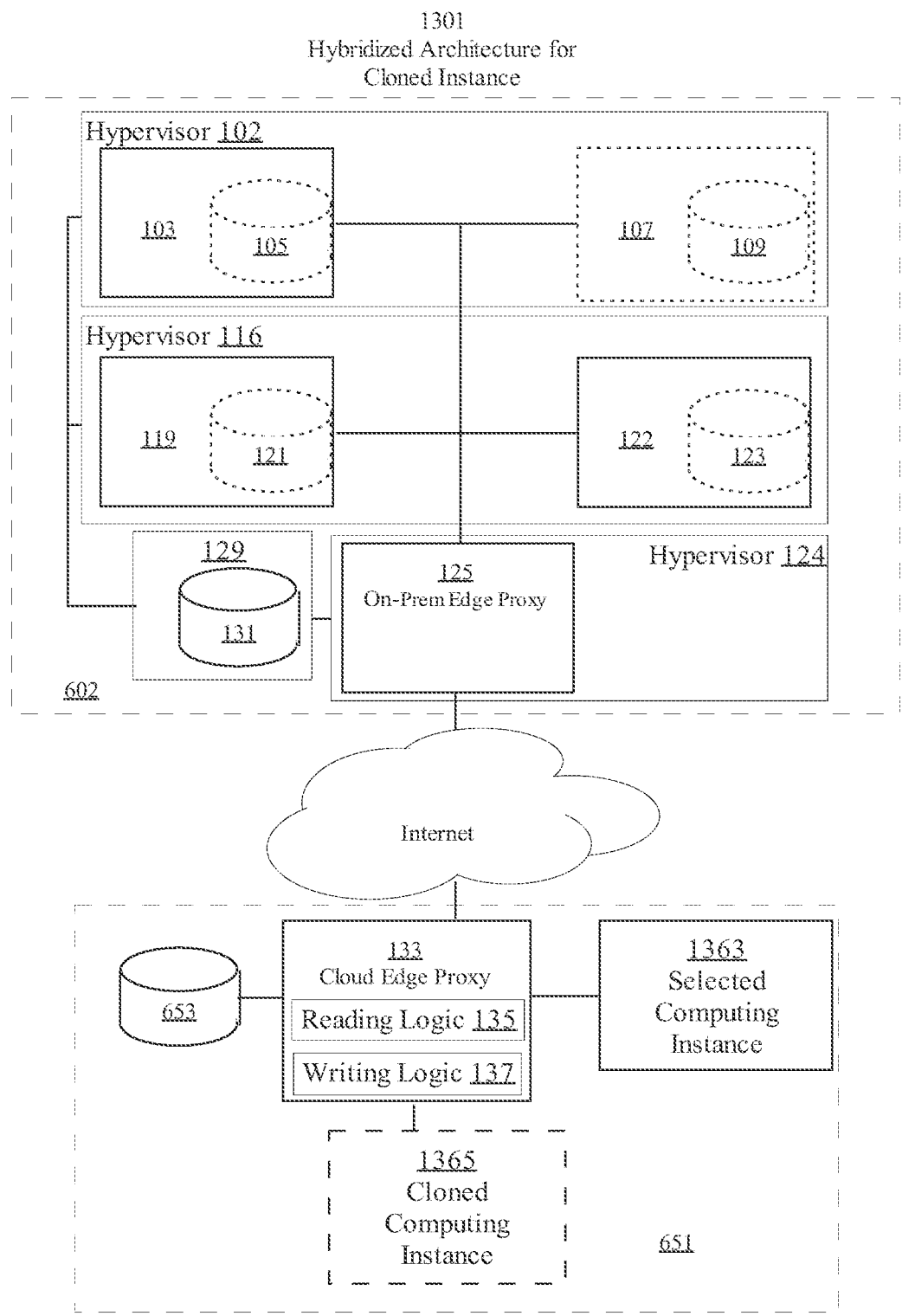
FIG. 13 is a block diagram illustrating a system architecture of a hybridized data center with a cloned computing instance.

Turning back to the example embodiment in FIG. 13, the running clone 1365 will have any previously modified references set to associated virtual disks (131 or 653).

3.3 Cloning Cut-Overs

In certain embodiments, it is desirable to clone a selected instance or computing instance and then cutover control of a workload to the clone at the same time the selected instance is disabled. In the example embodiment discussed the selected instance is on-prem and the clone is targeted to a cloud host. However, this process may be performed locally to transfer an instance from one host to another host, or this process may be performed on a cloud host to transfer an instance from one cloud host to another cloud host. The embodiment presented herein is meant for instructive purposes.

Figure 15:
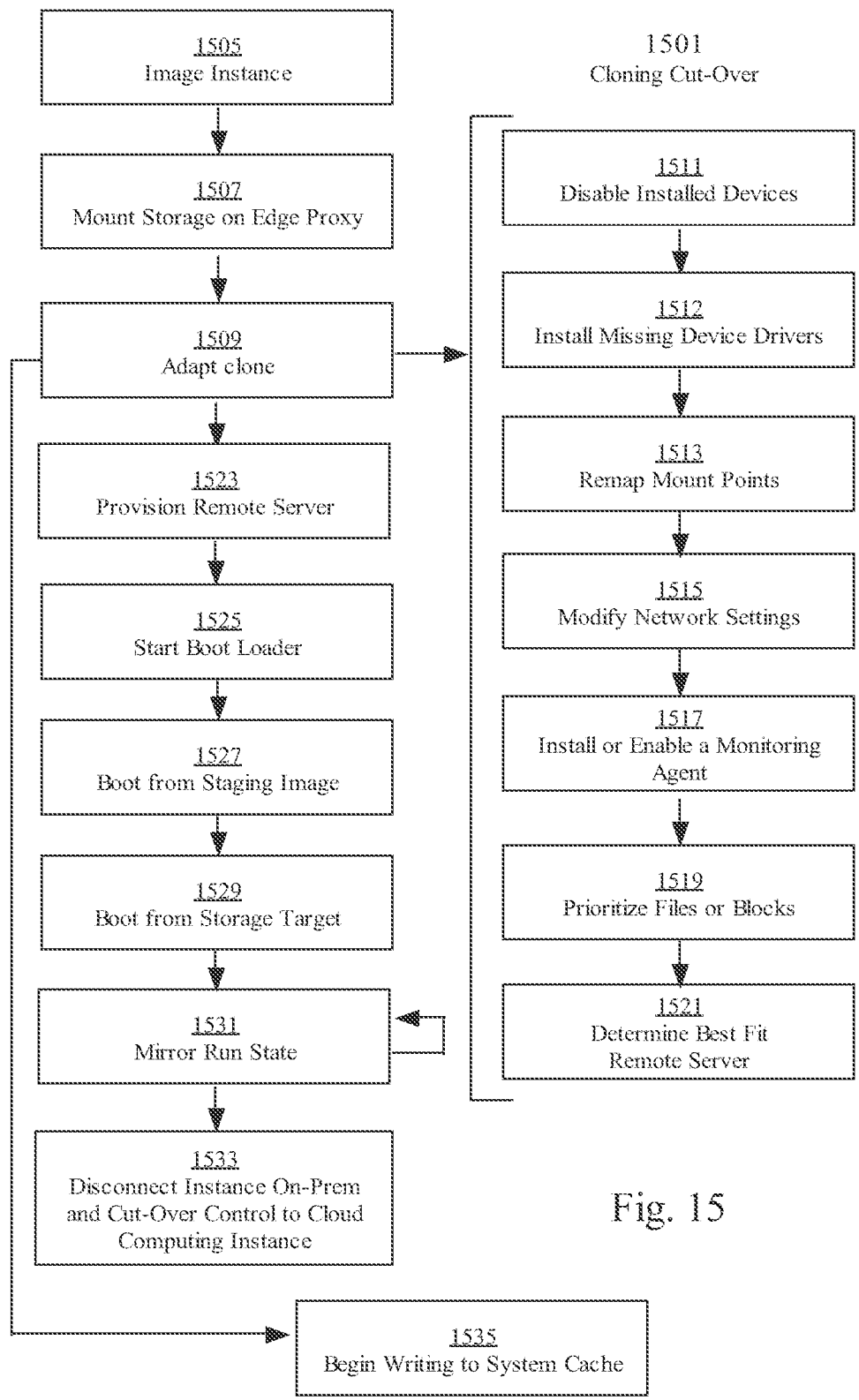
FIG. 15 is a flowchart illustrating steps in a cloning cut-over process.
Figure 16:
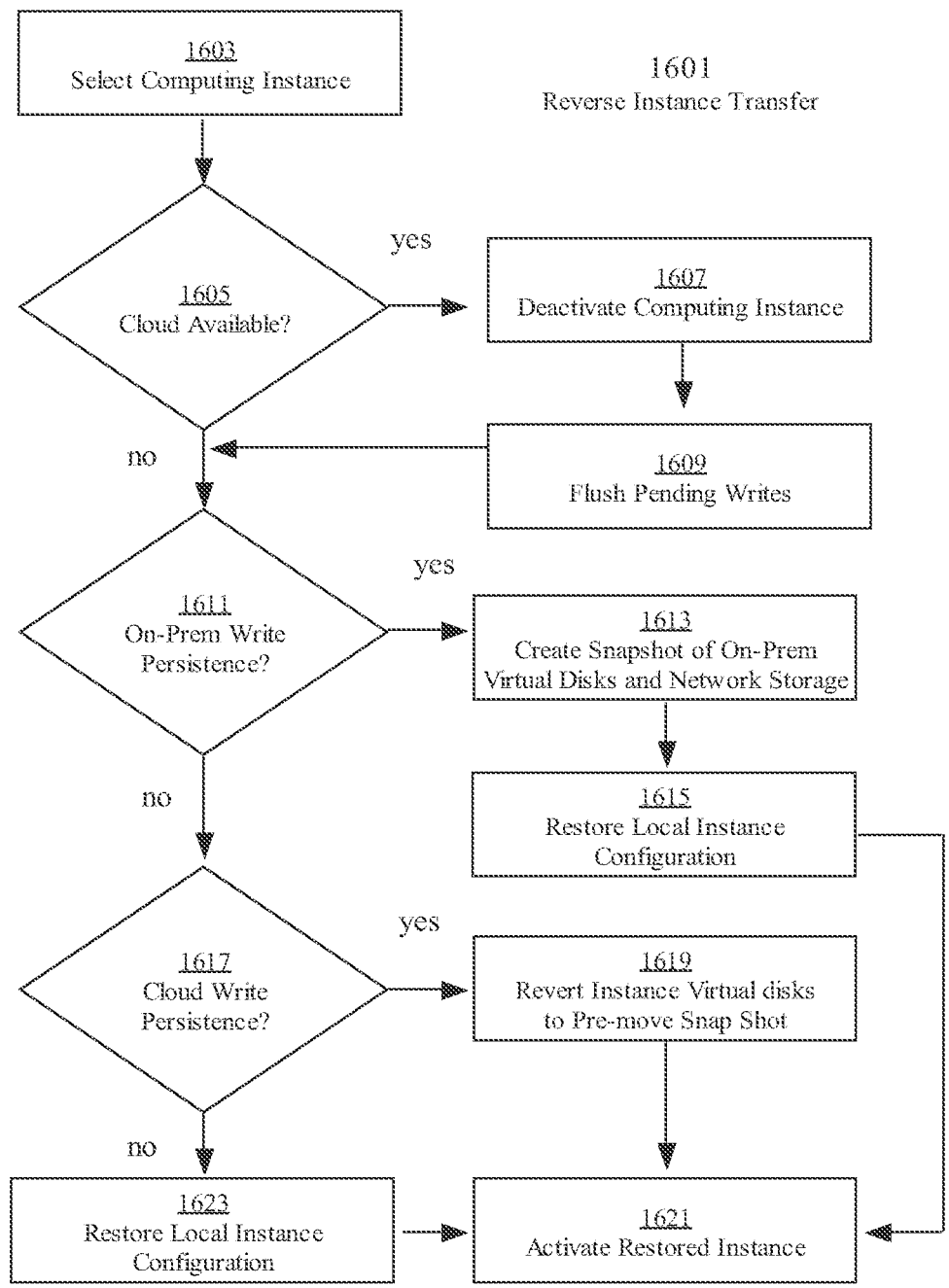
FIG. 16 is a flowchart illustrating steps to reverse an instance transfer process.

An example of the one or more cloning cut-over steps is shown in FIG. 15. The cloning cutover process has many steps similar to the instance transfer process augmented by the cloning process. Rather than reproducing those steps in their entirety, the steps are presented here in a summary fashion with the difference between the steps highlighted.

Cloning cut-overs are preferably employed when transferring instances that require capturing and replicating the run state of the machine. Capturing the run state of the machine occurs while imaging the instance 1505 in addition to imaging the disk volumes and hardware set of the instance. The run state of a machine comprises the CPU, the in memory CPU instruction set, the memory state and register values, as well as run-time variables. When determining the best fit remote server in step 1521, these configurations are additionally taken into account.

Replicating the run state starts when booting from the staging image in step 1527. The staging image must be reconfigurable to mirror the run state of the selected computing instance. In a preferred embodiment, the booting process still involves transferring the boot sequence to the storage target as seen in step 1529, but as an additional step in booting, the run state of the machine is replicated based on the image taken in step 1505.

Because additional processes occur while steps 1505-1527 are being performed, the run state of the machine must be mirrored in step 1531 before a cut-over can occur in step 1533. Mirroring the run state of the machine comprises capturing the run state of the on-prem machine and replicating the run state to the cloud machine through a proxy system. The run state of a machine comprises the system states of the lower level virtual hardware components. Once the run state is captured, the run state is replicated and mirrored, which includes replicating the CPU, the in memory CPU instruction set, the memory state and register values, and mirroring these values to the clone of the machine on the cloud host. This step may recur multiple times in order to synchronize the run states and/or state variables of the machines.

In a preferred embodiment, the last step 1533 in this process 1501 is cutting over from the on-prem instance to the mirrored cloud computing instance 1531. This step may not occur until the run state and state variables of the computing instance are adequately mirrored by the cloud computing machine. The adequacy of a mirror can be determined by successively measuring the change in states along with the change in time between capturing a mirror. Another embodiment includes providing the cut-over while both the clone and selected instance are in standby mode. In this embodiment, once the active mode instance is turned off, the standby mode instance is turned on. Thus, a user perceives a seamless transfer of a computing instance.

4.0 Hybridized Functionalities

Other attributes of embodiments may include reversing the instance transfer process, providing a migration strategy, and providing functionality to modify the edge proxies.

4.1 Reversing an Instance Transfer

Another attribute of an embodiment implements reversing the instance transfer process by leveraging data from the snapshot of an original instance, such that a minimum amount of data from the cloud needs to be reconfigured on-prem to reverse the instance transfer process.

Embodiments described herein refer to reversing the instance transfer process of an instance that was transferred from on-prem to on the cloud. However, the reversing instance transfer process can be implemented by any instance that was transferred to any host using the instance transfer process including, but not limited to, O2C, C2O, C2C, C2C (local), O2O, and the cloning processes previously described.

Reversing instance transfer refers to the process of re-coupling an instance with its local storage on-prem. The benefits of moving an instance back on-premises include, but are not limited to, optimizing performance of a data center after a peak load has completed, swapping instances between the cloud and on-premises, moving storage on-premises so the application can be re-deployed, and re-deploying a data center after on-premises infrastructure has been updated, improved, or debugged.

Using the management interface, the administrator selects the computing instance at step 1603 which was previously moved or cloned to the cloud and optionally identifies a local host as a target. The management system then triggers a flow of operations as follows:

(a) At decision point 1605, if the cloud instance is available, then the cloud instance is deactivated in step 1607. This can be shut down or simply suspended if possible. However this step 1607 is achieved, the instance is no longer running.

(b) In step 1609, all pending writes are flushed to on-prem. This step 1609 is particularly important if on-prem write persistence was selected for the computing instance. If cloud-only write persistence was selected the cloud storage for the instance may be optionally imaged and vacated.

(c) At decision point 1611, if on-prem write persistence was selected for the computing instance, then a snapshot of the on-prem virtual disks and dedicated network storage is taken at step 1613. This snapshot may be used for a quick roll back of changes.

(d) In steps 1615, 1619, and 1623 depending on the path taken, the original local instance configuration is restored. This not only includes reversing configuration changes, but also enabling devices that were disabled prior to the transfer. Specific configuration changes and device enablement can be determined using the snapshot of the instance previously taken in some embodiments of the instance transfer process.

(e) In steps 1615 and 1623, the storage is taken off the edge proxy and remounted on the restored local instance as needed. If cloud-only write persistence was selected for the computing instance, then the instance virtual disks likely need to be recreated from the pre-move snapshot in step 1619.

(f) In step 1621, the restored local instance is re-activated and unlocked for use by on-prem workloads.

4.3 Migration

Migration in this context focuses on the process of re-coupling a computing instance with at least some of its storage on the remote host. Embodiments described herein are directed to on-prem storage being transferred to a computing instance on a cloud host. Migration can happen to any storage that has been decoupled from its associated instance.

Additionally, even if an instance has not already been decoupled, migration may be employed by transferring or creating a computing instance using one of the heretofore described techniques.

Figure 17:
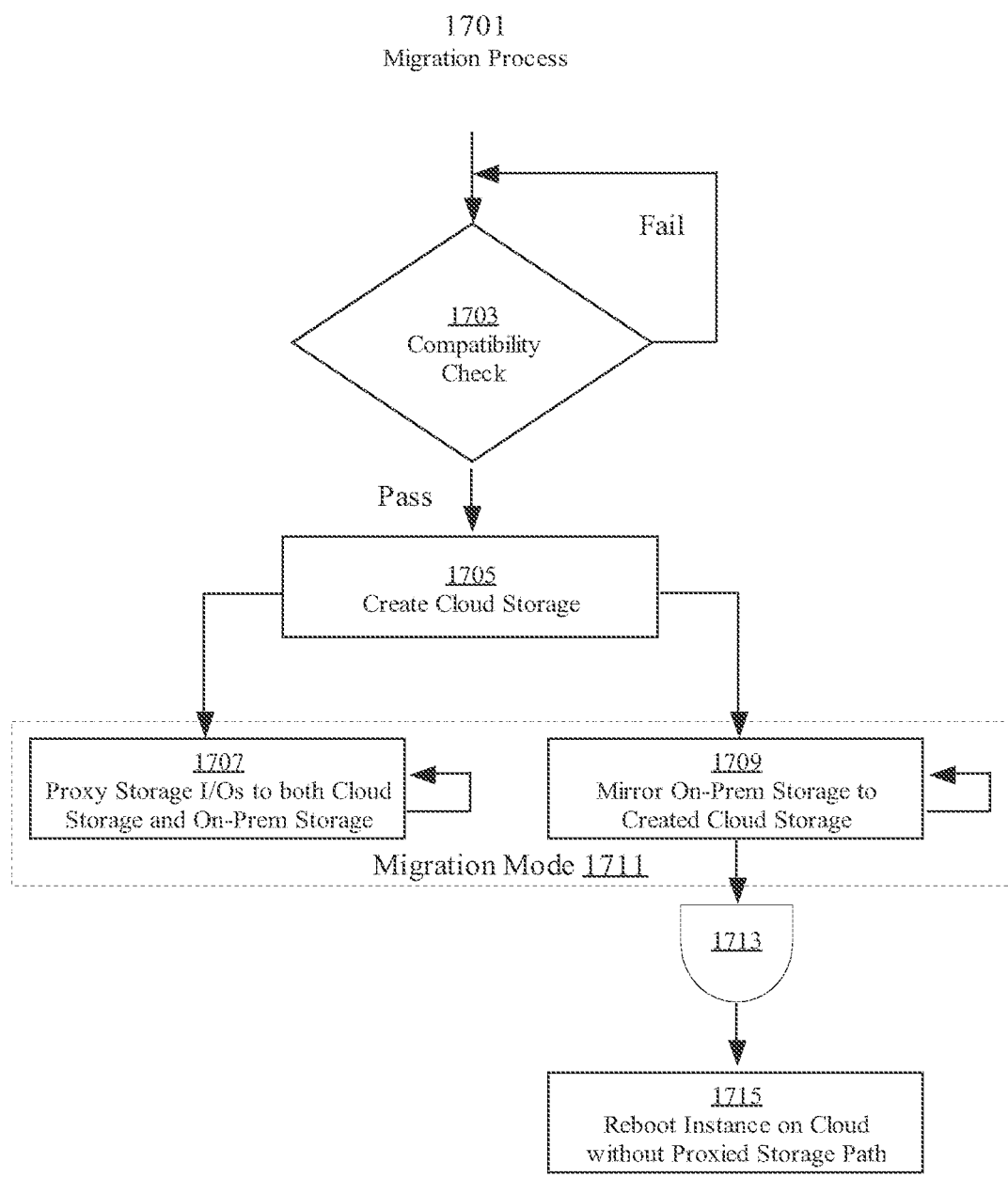
FIG. 17 is a flowchart illustrating steps of a migration process.

FIG. 17 is a flowchart illustrating steps of a migration process. The following steps preferably occur after an administrator indicates that a computing instance should permanently reside on a cloud host. However, the steps may be implemented to automatically, according workflows stored in a local edge proxy.

(a) At decision point 1703, in response to a user selecting an instance to permanently migrate, the edge proxy system performs a compatibility check as to ensure that the target cloud supports the storage device capacity and performance needs. If not compatible, another instance must be selected manually, automatically, or by suggestion. Once a compatible instance is determined, the following additional steps ensue:

(b) In step 1705, the cloud edge proxy sets up corresponding cloud storage as required by the instance. For example, referring to FIG. 18, if a computing instance 1807 has on-prem storage 131, then additional storage 653 is created on the cloud host 651.

(c) In step 1707, storage I/O requests are proxied to the cloud storage. Read requests are streamed and copied to the persistent cloud storage. For example, referring to FIG. 18, all read requests are streamed from 131 to both the computing instance 1807 and the cloud storage 653. Write requests are terminated locally on cloud storage alone. For example, referring to FIG. 18, all write requests are sent from cloud computing instance 1807 directly to the cloud storage 653.

In some embodiments, the write requests are also sent to the on-prem storage using a deferred write mode in case a user decides to reverse the migration process. For example, referring to FIG. 18, all I/O requests from computing instance 1807 would be sent to both cloud storage 653 and on-prem storage 131.

(d) In step 1709, a background process progressively synchronizes the content of the cloud storage with that of on-prem storage. The mirroring process may be performed repeatedly. If there is a delay, the mirroring process will only occur periodically until the delay is over. Once the delay is over, the mirroring process repeats at successively shorter intervals until the on-prem storage and the cloud storage are synced.

In some embodiments, steps 1707 and 1709 are part of a migration mode 1711. In the migration state, the system operates slightly differently from its normal read/write policies. In the normal read write policies, only specific requests are served to the system cache. In the migration state, all data and specific requests from the on-prem storage is streamed asynchronously to the cloud storage. Alternatively, a preference is granted to specifically requested data. In this manner, the cloud edge proxy can still serve workloads by acting as a cache while streaming on-prem storage through the cloud edge proxy to storage located on the cloud.

In the migration mode 1711, the cloud edge proxy keeps a log of what data has been transferred to the cloud and what data remains on prem. In this manner, the migration process can be delayed or stopped at any time without complete migration of all data. The cloud edge proxy will still be able to leverage benefits of the partial transfer by performing all reads and writes that it can on the cloud. The read process from FIG. 5 remains the same, but more data will be returned from step 515. The write process from FIG. 6 remains the same but with cloud only write persistence selected for the instance. This partial migration state can be leveraged in multiple stages to allow users to perform a scaled migration. A scaled migration may be desirable to systematically test costs, performance, capacity, and bandwidth of a cloud provider before completely committing to a permanent migration.

(e) In step 1713, when all storage is served from on-prem to the cloud storage, the admin is prompted to schedule a maintenance downtime to complete the transition and remove any edge proxies from the data path. After the downtime is granted, the instance is stopped and configurations are modified to mount the cloud storage volumes directly, including boot volumes.

(f) In step 1715, the instance is then rebooted, this time directly from the attached cloud storage volumes and migration is complete.

Figure 18:
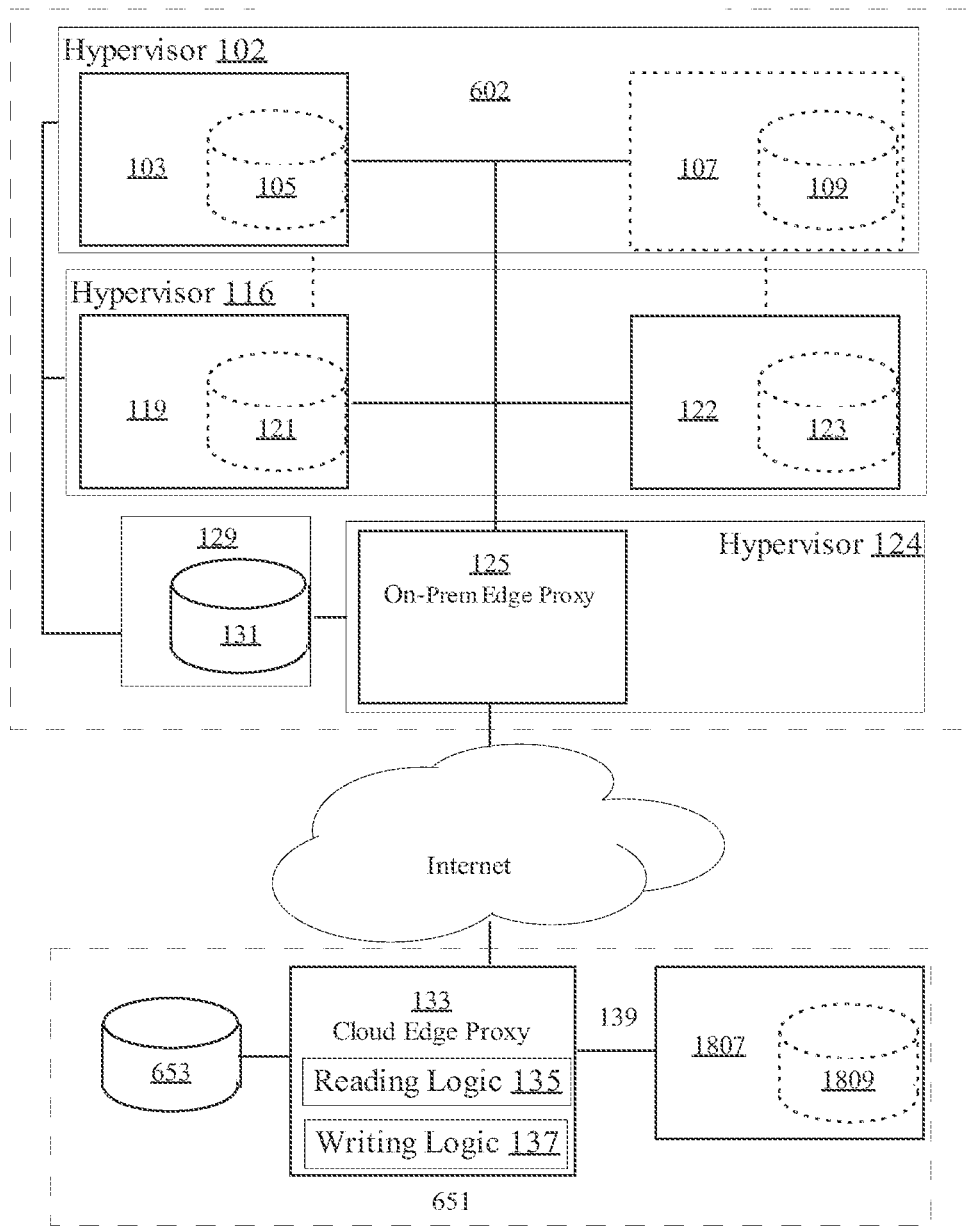
FIG. 18 is a block diagram illustrating a system architecture of a hybridized data center in a migration mode.

For example, referring to FIG. 18, once all data between 131 and 653 is mirrored, computing instance 1807 may be shut down so 653 can be mounted directly to the instance as 1809.

The use of the proxy system enables users to enjoy benefits of running instances in the cloud immediately without having to wait for the migration to complete while the bulk of the data is being transferred. The system also performs adequately even when an edge proxy is between the local storage and a computing instance. This means that switching the data path from migration mode to permanent cloud storage can occur during low workload periods.

In certain embodiments, the migration process has benefits of preventing downtime for a data center. Because the computing instance is already running, data fetching operations can be mirrored to storage on the cloud host as well as the normal operation of sending data on-prem. In a scaled manner, data calls are rerouted back to storage on the instance, which reduces reliance of an instance on the system cache and increases network latency. Once the storage of an instance is fully mirrored, storage from the on-prem cluster can be cutover to the cloud host storage. Essentially, there is no downtime in this process.

Additional benefits of moving an instance more permanently to a cloud host include, but are not limited to, optimizing performance of a data center after an initial increase in load forces a computing instance to transfer, quickly sending computing resources to the cloud host without having to migrate the storage first, backing up instances on the cloud host, and sending some storages off premises so an on-prem infrastructure can be updated, improved, or debugged.

4.4 Resizing Edge Proxies

Another hybridized functionality includes providing functionality to resize a system cache and modify the computing power or bandwidth of the edge proxies to elastically support needs of the network. This may support computing instances that require a higher load, more latency, or buffing a system for an initial boot sequence and then lessening the strain on the network as boot instructions are completed.

Resizing the system cache can be implemented by adding more elastic storage to the cloud edge proxy. This can be done automatically by leveraging a cloud host provider's API or this can be done manually by using the cloud host interface to create and mount a different amount of storage. The management service within the on-prem edge proxy then allots more storage to the system cache within the cloud edge proxy. If the Edge Proxy resize is required due to performance limitations of the Edge Proxy instance or its attached network then a resize may involve increasing the computing capacity (e.g. CPU, RAM, Network bandwidth) configured for that instance, i.e. the process of scaling-up the instance, or by adding additional instances in parallel, i.e. the process of scaling-out the proxy system.

5.0 Determining what Workloads to Cloud Burst

When extending a virtualized data center with cloud computing resources quickly and cost effectively without migrating a storage device, there are four systems to determining what workloads to move that can be used alone or in any combination.

The first system is to setup a structured system like first in first out (queue) or last in first out (stack). When a data center reaches a maximum capacity, the system does not evaluate actual computational needs of a workload to send one or more of the instances to a cloud resource.

In the second system, predictable workloads are cloud burst before experimental or volatile workloads that require variable computing resources, storage resources, networking capabilities on a project by project basis. When a customer comes to the administrator with a new project where the customer does not know the constraints of an individual workload, it may be desirable to keep the new project on-prem in a controlled environment to avoid external performance issues and service level agreements (SLAs). Thus, an on-prem workload with known constraints is moved to the cloud, in order to vacate space for the new experimental project.

The third system is to setup a policy based system such as DRS (a dynamic resource scheduler) or a load balancer. For example, if an instance under this system experiences a CPU usage higher than X, move the instance to a cloud host with available resources. An alternative example, if a computing instance's storage latency on a cloud host becomes higher than Y, move it back on-prem and move a different instance to the cloud. In certain embodiments, dynamic resource scheduler would move instances in real time based on needs of the data center, whereas the load balancer chooses high computing or low Input/Output unit (IOUs) workloads to send to the cloud.

The fourth system is to statically evaluate the data center on-prem, and based on this evaluation, to resize the proxies and move the necessary instances to leverage cloud resources. For example, a virtual appliance can take metrics of the average IOUs, peak loads, inter-instance communications, communications between instance and environment services and related metrics within each workload over the last week, month, or for a similar time period in the previous year. Based on this analysis, the management interface predicts which instances will have workloads consuming large amounts of computing resources, but small amounts of storage. Cloud bursting is preferably implemented on these instances first. For example, batch processing may require low IOUs, so instances executing these workloads are a strong candidate for cloud bursting.

Determining what workloads to cloud burst may include a combination, or weighted combination, of any or all of these systems, with or without additional systems, according to the needs of a particular data center.

Figure 19:
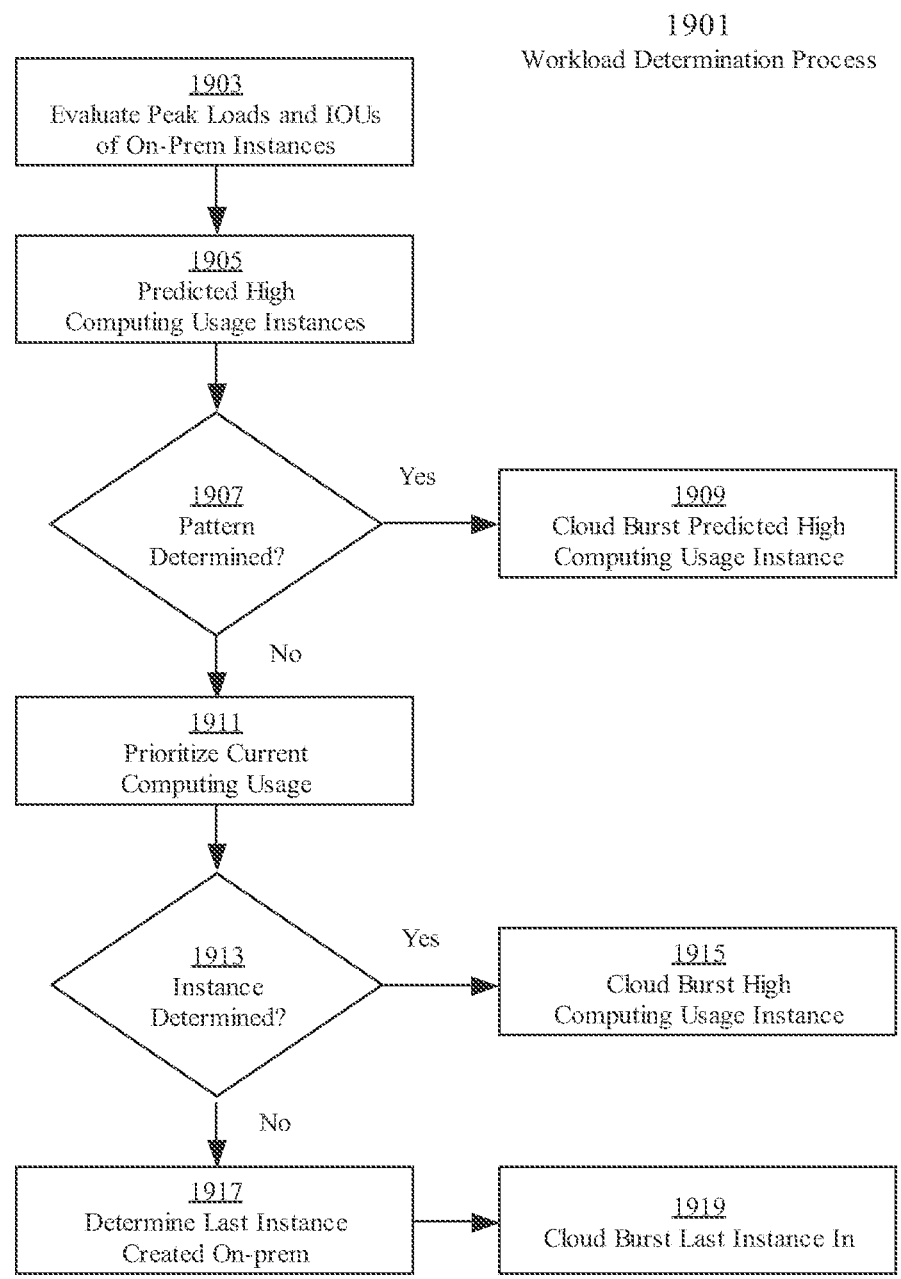
FIG. 19 is a flowchart illustrating a workload determination process.

An example embodiment of a determination system 1901 implemented by a management interface is shown in FIG. 19. To start, a management interface starts a static evaluation of the peak loads and IOUs incurred by the on-prem instances over the last week at block 1903. Using a statistical analysis technique, the high computing usage instances are predicted at block 1905. The statistical analysis technique is preferably performed on the on-prem edge proxy, but such a workload may be outsourced to another instance as needed. If a pattern is determined where certain instances are likely to have higher usage of computing resources in the coming week at decision point 1907, then cloud bursting is implemented on those instances at block 1909.

If a pattern is not determined where certain instances are likely to have higher usage of computing resources in the coming week at decision point 1907, then the system prioritizes instances based on current computing usage at block 1911. At decision point 1913, determinations are made whether one instance has a clearly a higher computing usage than the others, and whether that instance can be transferred for other reasons such as connection to necessary hardware that does not exist in the cloud.

If an instance is determined to have a higher computing usage and it is transferrable, then a cloud bursting process is implanted for that instance at block 1915. If an instance is determined to not have a higher computing usage or it is not transferrable, then the system can simply determine what was the last instance added to the data center at block 1917. From this determination, the cloud bursting process is implemented as to that last instance created at block 1919.

6.0 Determining a Preferable Cloud Host for Cloud Bursting

Determining a cloud host can be based on one or more of the following factors: (A) storage performance, (B) number of workloads already on the host, (C) similar workloads already on the host, (D) likelihood of full migration, (E) cost structure of storage, (F) compliance regulations of data, (G) compatibility between source and target storage devices, (H) management complexity, and (I) high availability service level agreements (HA SLAs). In this section, cloud host is used broadly to refer to different servers or virtual servers within a cloud cluster and to refer to different cloud service providers.

(A) Storage performance—In most workloads, the workloads need access to storage. While embodiments are designed to maximize storage access latency, some cloud hosts will empirically maximize the benefits of these embodiments better than others. By monitoring latency metrics of the system associated with different cloud hosts, a system administrator can prioritize hosts that provide the best storage latency.

(B) Number of workloads already on the host—Much bigger workloads may be better suited for hosts that do not have any other workloads currently on them. Additionally, a workload with potential clones or potential for more workloads that share local storage may be better suited for an empty cloud host, so the operation can scale. Thus, empty cloud hosts may have a higher priority.

(C) Similar workloads already on the host, much bigger workloads may be better suited for hosts that have been thoroughly tested with smaller workloads. Additionally, a host that already has clones or other workloads that share local storage may be better suited as a target cloud host. As a result, cloud hosts that have already hosted similar workloads are a higher priority target cloud host.

(D) Likelihood of migration—If storage for a specific computational instance needs to migrate to satisfy performance requirements, then having a cloud host with the potential to expand to the necessary size is important. Thus, a system administrator may prioritize cloud hosts based their ability to handle a full migration project.

(E) Cost structure of storage—cost structures for cloud hosts can be fixed, tiered, or scalable. Administrators should consider cost in terms of ratio of local storage to on-prem storage of a particular workload before choosing a cloud host. Additionally, the cost structure can greatly affect scaled operations such as adding multiple similar workloads or performing a full migration. Thus, a system administrator may consider cost generally or the cost structure of storage when prioritizing target cloud hosts.

(F) Compliance, regulations of data—In many cases there are regulatory constraints on storing data permanently in the cloud. These regulations need to be considered on a case by case basis, but they can lead to different prioritization of workloads.

(G) Compatibility between source and target storage devices—different cloud hosts offer storage devices with features, capacity, count and performance capabilities which often differ from those of the source storage on premise—whether residing in virtual disks or in networked storage systems. Administrators should prioritize hosts that require the least number of transformations to the VM or application container.

(H) Management complexity and heterogeneous computing environments—Administrators familiar with their on-prem virtualization environment need to be trained and operate in a new computing environment. Hosts that provide similar experiences for the administrators should be given a higher priority.

(I) Maintaining performance and HA SLAs—cloud providers often limit maximum reserved storage TOPS and capacity per customer account, which require the administrator not only to consider cost premiums but also to prioritize use due to fixed allocations. Computing instance high availability (HA) is another challenge—cloud providers typically require a dual-instance setup to provide any SLA guarantee, given cloud backend maintenance windows are typically scheduled per availability zone. If a given cloud host does not support a dual-instance or active-standby operation, then workloads that require this functionality should be avoided.

7.0 Workload Execution Computing Resource Costs

In an embodiment, when a virtual machine is moved from an on-prem environment to a cloud environment, the virtual machine moves from a dynamic resource subscription environment to a static, defined-resource subscription environment. In an on-prem environment, the hypervisor manages a virtual resource to physical resource ratio (such as a virtual core to physical core ratio). Such a control enables the achievement of high utilization of the underlying computing resources. On the other hand, the cloud computing resources are typically subscribed on a per logical core basis. Thus, regardless of the amount of cloud computing resources required to execute workloads, the number of subscribed logical cores always stays fixed. Such a static resource allocation framework loses the resource over-subscription consolidation benefits of the virtualization that exist in the on-prem environment. Therefore, running workloads (that may consume unpredictable or variable amount of computing resources) in a cloud environment may have a higher cost than in the on-prem environment unless workloads are allowed to freely and seamlessly move between defined-spec instances, clouds and/or clouds-to-on-premises and vice versa. The inventors, in an inventive moment, solved this problem and this disclosure presents a solution to support free movement as described.

7.1 Mobility of Workloads

In an embodiment, when a workload is selected to move from one host to another (on-prem-to-on-prem, on-prem-to-cloud, or cloud-to-cloud), the same computing environment that exists on the local host need to be reproduced on the remote host so the workload can continue executing being unaware of the move. When such move occurs, transferring the storage and current run-state is one of the most complex problems.

The mobility problem is especially acute when the local and remote hosts are geographically distant from each other and therefore cannot have any shared storage or even be on the same local area network. For geographically distant computer systems, there may be a significant delay if the data and state are copied over the Internet to the remote host as a prerequisite for moving the workload(s) that use or may use that data and state. Furthermore, the copying or synching of data and state may cause a corruption as well. Race factors among the computer systems may generate inconsistencies in the data that was modified. On the other hand, when the data is replicated first, the latency of the data replication may be such that the source data is changed by the time the data is replicated to the remote host, again increasing risk of data corruption or inconsistency. The techniques described herein address at least this problem of migrating a running workload.

The long-distance migration of workloads may be improved if the remote host environment closely matches the local host environment, thus removing one or more steps described in the section "d. Adaptations". A quicker adaptation process may lead to a more seamless transfer of the workloads between geographically distant hosts.

7.2 Workload Containerization

In an embodiment, to improve density and mobility of workloads, one or more workloads are adapted to execute in a container. A container framework is a software application hosted on a computer system which provides a run-time environment for multiple computing instances to execute workloads in isolation. Although instances execute in isolation, the instances may share the computing resources of the host computer system. In an embodiment, a container has a dedicated and isolated memory space and run-time. Workload(s) of the container execute using a memory space delineated by tagged namespace from other container(s)' memory spaces.

In an embodiment, to initiate a container, a container image is loaded from a persistent storage into the container framework. A container image is a persisted snapshot of the container that may store the run state information of the container. Run state information of a container includes the information necessary for a container that was paused/deactivated during a workload execution, to re-start or resume executing the workload. Examples of run state information has been provided above.

Container workloads may be transferred between heterogeneous computer systems using container frameworks because the frameworks abstract the underlying computer system differences. Upon a transfer, the transferred workload, as part of its resumption in execution on the remote computer system, may request access to the originating computer system's data. One approach to have the originating data available for the workload is for the data to be replicated or shared between the originating/local and transferred/remote computer systems. However, as described, above, shared storage would limit the geographic distance of the computer systems, while replicated storage may introduce corruption issues. Thus, as a further benefit to mobility of workloads, containers and container frameworks may leverage data streaming between the local and remote edge proxies using techniques described herein.

The term "system container" refers to a container that shares an operating system kernel with other system containers. Because system containers share the operating system kernel, they are operating system specific and may run multiple computer services supported by the operating system within a system container. The system container may function as a resource envelope similar to that of a virtual machine definition and is designed to run multiple processes and services. For a system container, the container framework may be the host operating system itself. Examples of system container systems or container frameworks include LXD, LXC, OpenVZ®, Linux VServers, FreeBSD® Jail and the Solaris® zone framework.

On the other hand, the term "application container" refers to a computing instance that has a dedicated run-time framework that manages the run state and memory space isolation. The dedicated run-time framework may be installed on top of the host operating system and provides an additional isolation for the application containers. An application container may have only a single computer service (also referred to as "application service") running within the application container. Example of application container systems are DOCKER or CoreOS® rkt. This disclosure presumes the reader has the skill and knowledge to obtain appropriate software and deploy or implement system containers and application containers using the foregoing example systems. Further information about this foundation technology is available from the project organizers or vendors of those systems.

7.2 System Architecture with Container Frameworks

Figure 24:
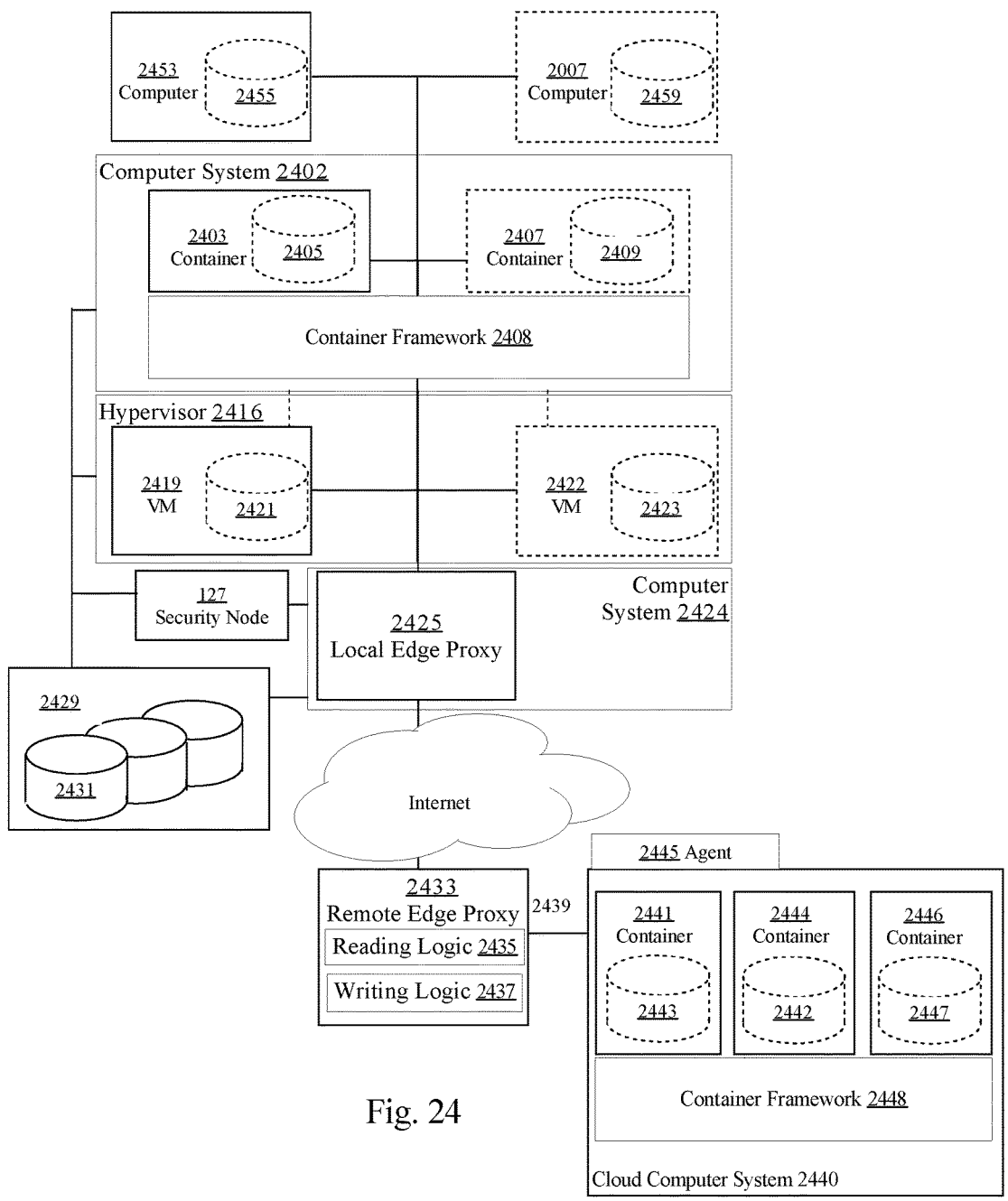
FIG. 24 is a block diagram depicting the system architecture of a hybridized data center with containers.

FIG. 24 is a block diagram depicting the system architecture of a hybridized data center 2401 comprising containers 2403, 2407, 2441 and 2444, other computing instances 2419, 2422, remote edge proxy 2433, and local edge proxy 2425, and one or more storage devices 2405, 2409, 2421, 2423, 2443, 2442, 2447 (depicted as 2431) in network storage node 2429, in an embodiment.

In an embodiment, computing instance 2441 is a container that runs using container framework 2448. Container framework 2448 may be part of the host operating system of computer system 2440 or a VM hosted on computer system 2440, or a separate service installed on computer system 2440. Container 2441 is migrated from position 2407 and monitored with a monitoring agent 2445. At the original position, container 2407 was running using container framework 2408. In an embodiment, to facilitate seamless migration of containers between local computer system 2403 and geographically remote cloud computer system 2440, container framework 2408 is of the same type as destination container framework 2448.

In an embodiment, container 2441 is configured to enable storage requests route to and from remote edge proxy 2433 by mounting edge proxy 2433 as the primary storage for computing instance 2441 through network connection 2439. Examples of protocols utilized for network connection 2439 are iSCSI, NFS, CIFS, RBD or any proprietary storage protocol. Remote edge proxy 2433 re-routes data to and from local edge proxy 2425 and to and from a computing instance 2441 with reading logic 2435 and writing logic 2437. Local edge proxy 2425 re-routes data to and from local storage disks 2431 as needed and to and from remote edge proxy 2433. Additionally or alternatively, local edge proxy 2425 may be mounted as a storage node for any local computing instances or local hosts thereof. For example, container framework 2408 may mount local edge proxy 2425 as a storage node and make the storage endpoint available in respective namespaces of containers 2405 and 2409.

Computing instance 2444 is also a container and may also run using container framework 2448. Container 2444 is migrated from position 2422 and monitored with a monitoring agent 2445. At the original position, VM 2422 was running within hypervisor 2416. In an embodiment, to facilitate seamless migration of a VM from local hypervisor 2416 to geographically remote cloud computer system 2440, VM 2422 is containerized into a container image of container 2444, either locally, for example by hypervisor 2416, or remotely, for example by remote edge proxy 2433, and then, is run using framework 2448 on remote cloud computer system 2440. The location of containerization may be selected based on the availability of remote resources as compared to the local resources.

In an embodiment, container 2444 is configured to enable storage requests route to and from remote edge proxy 2433 by mounting edge proxy 2433 as the primary storage for computing instance 2444 through network connection 2439. Remote edge proxy 2433 re-routes data to and from local edge proxy 2425 and to and from a computing instance 2444 with reading logic 2435 and writing logic 2437. Local edge proxy 2425 re-routes data to and from local storage disks 2431 as needed and to and from remote edge proxy 2433.

In some embodiments, the local computing instances 2403 and 2419 have access to the respective local storage resources 2405, 2421 in network storage node 2429 through the underlying computer system and framework, such as hypervisor 2416 and computer system 2402.

Additionally or alternatively, local computing instances or their respective hosts may mount local edge proxy 2425 as a storage node. For example, by mounting local edge proxy 2425 as a storage node for computer system 2402, container framework 2408 may store the container 2407 image on the edge proxy storage node. Local edge proxy 2425 may stream the image through remote edge proxy 2433 to container framework 2448. Similarly, the resulting container image from the containerization of VM 2433 may be stored on the locally mounted edge proxy 2425 storage node and thus, transferred (upon request or otherwise) to container framework 2448 to be executed as container 2444.

There are various methods by which storage may be accessed by migrated containers. In some embodiments, access to a local storage resource 2431 in storage node 2429 through local edge proxy 2425 is done through computer system 2424 as the storage provider. In this case the local storage resource 2409 of the remote instance 2441 is formatted for a structured data storage scheme (e.g., vmdk) and placed in a network storage node 2429, or the storage node 2429 is mapped through computer system 2424 as a raw-device and then accessed by local edge proxy 2425. In other embodiments, methods are used to directly access local storage resource 2409 located in storage node 2429, without going through computer system 2424. Examples include VDDK (Virtual Disk Development Kit) or direct access to SAN via iSCSI or Fiber Channel, or direct virtual disk file access over a networked file system such as NFS or other file server protocols.

In another embodiment, the hybridized data center consists of containers accessing directly attached physical disks. In such an embodiment, the physical disks do not need to be in a centralized repository such as node 2429. Instead the physical disks may be accessible by the containers through the respective container frameworks.

In yet another embodiment, the hybridized data center consists of physical machines accessing physical disks. For example, multiple computers 2453, 2457 with a network storage node 2419 and with local storage resources 2455 and 2459 associated with each respective computer. Multiple computers 2453 and 2457 are networked together and controlled by local edge proxy 2425 when they need to execute in the cloud.

In such an embodiment, computing instance 2446 is a container running in container framework and has a monitoring agent 2445. Container 2446 is migrated from position 2457 and monitored with a monitoring agent 2445. At the original position, a physical computer 2457 was running using direct access physical storage 2459. In an embodiment, to facilitate seamless migration of a physical computer to geographically remote cloud computer system 2440, physical computer 2007 is containerized into a container image of container 2446 and then run using framework 2448 on remote cloud computer system 2440.

The computing instance 2446 is modified such that storage requests for storage 2447 route to and from remote edge proxy 2433 through a network connection 2439. In one embodiment, remote edge proxy 2433 comprises a monitoring service, an orchestrator, a storage target, a data stream, and a secure cache. Remote edge proxy 2433 re-routes data to and from local edge proxy 2425 AND to and from a computing instance 2446, as needed.

7.3 Functional Description of Containerization

In an embodiment, before a computing instance, executing one or more workloads, can be transferred, the computing instance is transformed into a container. The term "containerization" refers to the process of transforming a computing instance to a container computing instance. Examples of computing instances that are containerized using techniques described herein include virtual machines, physical machines and containers of different formats.

In an embodiment, a virtual machine instance running a workload is transformed to a container instance image to run the workload. In one such an embodiment, a virtual machine instance is transformed to a system container, which may in turn be transformed into application container(s). A physical computer system running a workload may also be transformed to a system container. In one embodiment, the physical computer system is first converted to a virtual machine instance using techniques described herein, and then, the new virtual machine instance is transformed to a container using techniques described below.

As compared with a virtual machine instance, a container provides higher degree of abstraction for the running workload from the computing resources. For example, device drivers such as USB, Bluetooth or others are abstracted from container run workloads by the container framework. The calls to use any of those devices or to receive calls from those devices are the same on different instantiation of system container framework on different computer systems (even when geographically remote). Further decoupling hardware dependencies from the workload, such as transforming the computing instance to a system container increases portability and mobility of the workload.

Figure 25:
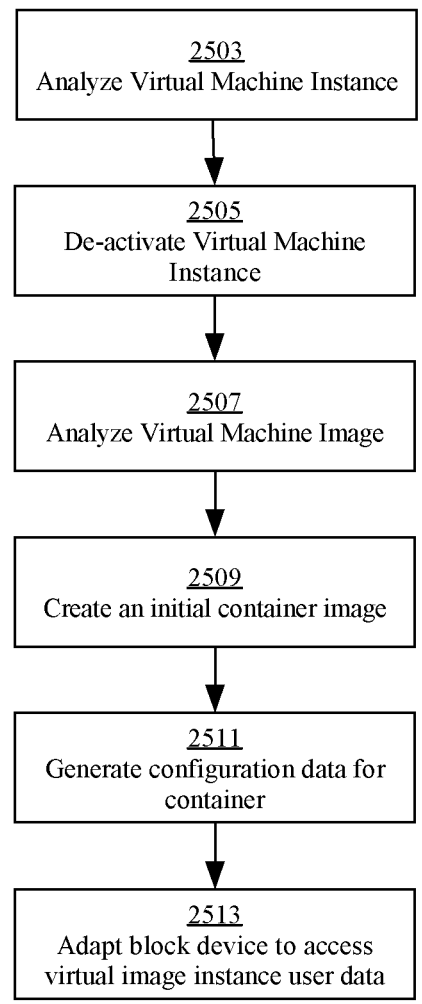
FIG. 25 is a flow diagram that depicts a process for a containerization of a virtual machine instance hosted by a hypervisor.

FIG. 25 is a flow diagram that depicts process 2501 for a containerization of a virtual machine instance hosted by a hypervisor, in an embodiment. One or more of the steps described below may be omitted, repeated, and/or performed in a different order. Accordingly, the specific arrangement of steps shown in FIG. 25 should not be construed as limiting the scope of the techniques described. Further, the steps shown below may be modified based on the data structure used to store the data.

At step 2503, the run-time statistics of a virtual machine, such as VM 2422 of FIG. 24, is collected, analyzed and assessed for the containerization. For example, run-time statistics is collected to determine RAM, CPU, storage performance of the virtual machine instance. The analysis, is then used for determining the amount of computing resources to allocate to the corresponding container. For example, the local edge proxy may use management interfaces of the hypervisor or the VM to collect the resource consumption information.

To initiate the transformation, the local edge proxy may de-active the virtual machine instance to be transformed at step 2505. A virtual machine instance may be de-activated by shutting down or suspending the virtual machine instance. The de-activating of the virtual machine instance causes the run state information for a workload executing on the virtual machine instance to be stored and persisted on a storage device coupled to the hypervisor as a virtual machine image.

In another embodiment, rather than deactivating the virtual machine instance, the hypervisor hosting the virtual machine instance may take a snapshot of the virtual machine instance. The snapshotting generates the virtual machine image for containerization without de-activating the virtual machine.

At step 2507, the virtual machine image may be analyzed for containerization. The analysis may include evaluation of the structure, the operating system, the file systems, collecting historical statistics stored within the virtual machine image, and performing relevant assessment of drivers. The analysis may further include determining operating system and version of the virtual machine instance, assigned computing and storage resources to the virtual machine instance and boot device, file-systems, data storage mount points, installed virtualization components, device drivers, namespaces and network configurations.

In an embodiment, a corresponding container image is generated based on one or more of the assessed run-time statistics, and the virtual machine instance image. The corresponding container image may be configured based on the run state information in the virtual machine image to replicate the same run state as the virtual machine instance. By replicating the same run state, the corresponding container can continue executing the workload that was interrupted by the de-activation at step 2503.

At step 2509, an edge proxy, the local edge proxy or the remote edge proxy coupled to the local computer system through the local edge proxy, may generate a corresponding container image from a template container image. For example, based on the determined operating system of the virtual machine, the edge proxy may select a corresponding system container template image and create a copy of the template image to further configure the copy to be specific to the virtual machine.

At step 2511, an edge proxy may generate a configuration data for the corresponding container image to be used when the container is initiated to run by the container framework. The configuration data is a metadata included in the container image that describes the requirement for computing resources, network configuration, storage configuration and other system configuration information. The configuration data may be used as a manifest by the container framework when initializing the container for the execution.

In an embodiment, the configuration data is generated based on the analysis performed of the virtual image instance. For example, an edge proxy may use the analysis of the network configuration of the virtual machine instance to generate network configuration data for the corresponding container in the metadata of the container. Accordingly, when the container is executed by the container framework, the network configuration of the container would match that of the virtual machine instance. Thus, external requests for the workload executing on the virtual image instance, when re-build in the container could be seamlessly accessible to the external clients in the same way.

An aspect of an embodiment includes modifying network settings that may not be applicable to the remote-side network (when a container is transferred), or as designated by the administrator in the task definitions. The networking elements need to updated or deleted, so the instance can be transferred. In an embodiment, networking addresses and representations on the instance are modified to reflect a new location on the remote host computer. These modifications include updating networking services such as DNS, routing services, and other network devices such as NAS or a directory service. In one embodiment, at least some networking configurations are deleted for later configuration on the cloud. At least some of these settings can be configured during the initialization of the container by the container framework.

In an embodiment, network services, such as those of the remote container framework and/or remote host computer system, are updated with the network configuration of the local hypervisor, and/or local computer system. The updated network configuration provides seamless routing of network packets addressed to the local instance to the remote container instance.

Additionally or alternatively, the metadata of the container image contains the run state information of the container's workload execution. For example, when the container is de-activated, the run state information is stored in the metadata such that when the container is re-activated, the container can continue to execute the workload from the same point.

At step 2513, user data of the virtual machine instance may also be containerized. In an embodiment, the virtual machine image includes an OS image and user data image. Based on the analysis of the user data image, an edge proxy may perform transformation to be performed to have the user data available to the corresponding container. The edge proxy may determine that a transformation of a file system of the user data image is necessary and perform such transformation.

Additionally or alternatively, an edge proxy may determine the suitable storage block service device for the container to access the user data in the user data image. The edge proxy may create the suitable block service for accessing the user data. When the block service is mounted by the container, the container can access the user data.

Another embodiment includes remapping mount points from current virtual storage devices or networked storage to the mount point's proxied addresses as reflected by the remote edge proxy. The host system of the container framework may receive a list of available storage devices to be accessed through virtual hardware elements like a SCSI bus or a fiber channel and the virtual storage devices appear as local drives for the container.

In one embodiment, the configuration data may include configuration of storage remounted to appear as a standard network storage such as SAN. This standard network storage is preferably accessed through iSCSI, but in other embodiments the storage may be accessed through other software or virtual hardware mechanisms. Examples include traditional parallel SCSI, Fiber Channel Protocol, HyperSCSI, SATA, ATA over Ethernet (AoE), InfiniBand, or DSS. In other embodiments, the configuration includes instructions and/or driver software to install a custom driver to represent a local device through a custom protocol. The storage devices and hardware elements of container as they appear in the container framework or container are modified depending on which mechanisms are used to reroute the data path.

In some embodiments, an edge proxy classifies one or more storage devices as remote only write persistence or local write persistence. Storage device paths may need to be split and re-routed to multiple different storage devices, some local and some on cloud, in order to accommodate cloud only write persistence or other tiered storage needs.

7.4 Migrating Workload During Containerization

In an embodiment, a workload being executed by a virtual machine instance may be real-time migrated to a geographically remote server while the virtual machine instance is itself containerized. The real time transfer may be on-prem-to-cloud (O2C), cloud-to-on-prem (C2O), cloud-to-same-cloud (local C2C), cloud-to-remote-cloud (remote C2C) or (on-prem-to-on-prem) O2O as one skilled in the art will readily appreciate.

In the following descriptions, the computer system at which the transfer starts is referred to as "local" and the geographically distant transfer destination computer system is referred to as "remote."

Figure 26:
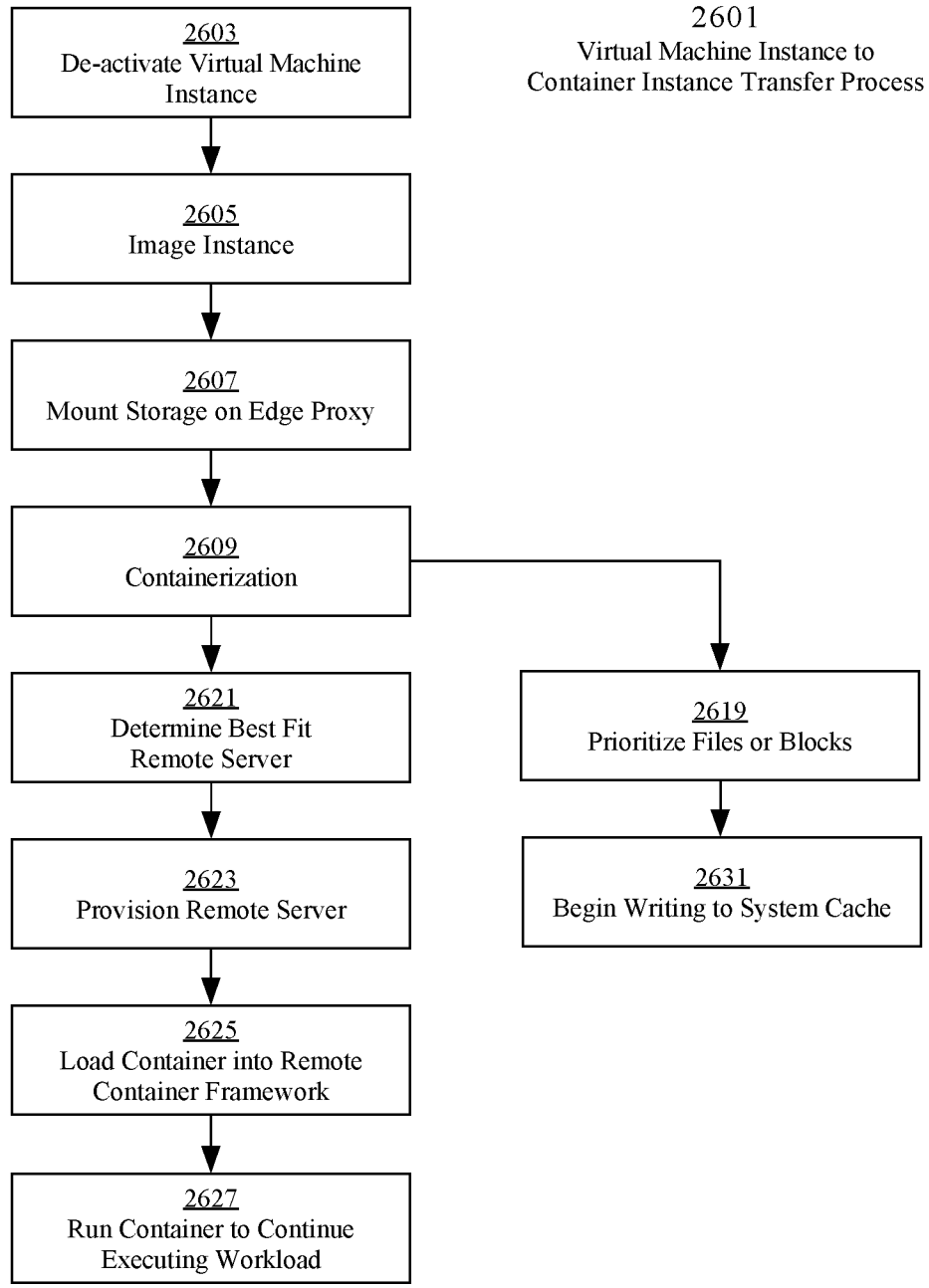
FIG. 26 is a flow diagram that depicts a process for a remote transfer of a virtual machine instance.

In an embodiment, the instance transfer process 2601 comprises the steps as seen in FIG. 26, but one or more steps may be performed asynchronously, in parallel, or in a different order in other embodiments. The instance transfer process begins with an instance being selected either manually through the local management system, or automatically following business rules programmed to the management system through its API, to be sent to a selected remote computer system.

In one embodiment, the selected virtual image instance is shut down (if powered on) and then gets disconnected from the hypervisor by de-activating it at step 2603. The instance has dedicated storage mounts such as file systems, and networked storage volumes that are locked for exclusive access by the local edge proxy.

In an embodiment, the deactivation step causes the virtual machine instance to be persisted in storage as a virtual machine image at step 2605. A local snapshot of the instance including its dedicated storage may also be created at step 2605. This snapshot can be used for a quick roll back, reverse cloud bursting, or as point-in-time source for temporary clone-to-cloud operations.

At step 2607, the local edge proxy mounts the instance's storage to the local edge proxy. In other embodiments, the storage is mounted to an additional block storage device connected to the local edge proxy. Under either embodiment, the local edge proxy configures the storage of the instance to appear in its disk management system. The disk management system works in conjunction with the edge proxies to transparently provide storage to the computing instance.

In some embodiments, selected virtual disk or storage volumes may be migrated to a lower tier of storage for lower cost and better performance of the overall system. Simply vacating higher performance storage can increase system performance by providing more storage for the local workloads. In addition costs can be reduced. The reason why these virtual disks can be moved to lower-tiered storage is that the actual execution of workload against the data of that storage may be performed on the remote system such as in the cloud, whereas the local system storage is only used to handle the deferred and limited read-write activity by the remote-edge. Hence, the local I/O sub system is offloaded by the remote I/O system in terms of throughput and performance.

In some embodiments, an edge proxy, the local edge proxy or the remote edge proxy coupled to the local computer system through the local edge proxy, classifies one or more storage disks as remote only write persistence or local write persistence. In these embodiments, additional virtual storage disks are created and mounted on the remote edge proxy when remote only write persistence is selected.

For example in FIG. 3, virtual disk 308 is created to accommodate cloud (remote) write persistence of computing instance 303.

At step 2609, the remote edge proxy initiates containerization of the virtual machine instance using techniques described above.

In an embodiment, an edge proxy estimates and prioritizes potential candidate files and/or corresponding blocks to be pre-fetched by the remote side cache for initialization of the container or efficient execution in the remote computer system at step 2619.

To accomplish this, an edge proxy is setup to map files that are likely to be accessed in the loading of the container by the remote container framework or workload run state to the files' corresponding logical block addresses (LBAs). In an embodiment, these blocks reflect previous modifications to the network settings and virtual storage devices.

The files may be determined through a static analysis or a dynamic analysis or both. The process for prioritization of blocks by profiling the files used in a workload or container load process may be performed using the process of FIG. 21 by the local edge proxy, as previously described. Additionally or alternatively, the local edge proxy may perform dynamic analysis that involves accessing an instance through the underlying virtualization environment to determine what block storage is routinely accessed. The local edge proxy, using the process of FIG. 22 as previously described, may prioritize blocks by determining hotspots.

By using one or more of these static and dynamic analysis techniques, the local edge proxy determines which block storage is accessed most often for an instance. The local edge proxy then prioritizes the block level storage for an instance based on how often particular blocks are accessed and how early these blocks are accessed for a particular application or for the container load process or a particular workload. These blocks may be streamed in order of priority from the local edge proxy to the remote edge proxy at step 2631. This process may be done asynchronously or in large chunks such that calls made from the remote edge proxy to the local edge proxy will not be slowed.

In an embodiment, a best-fit remote server, accounting for RAM, CPU, storage performance and special software license requirements for third-party database software and the like is determined at step 2621. The local edge proxy extends the data center by transferring individual components in a multi-machine application to a remote server that meets the needs of each component in terms of capacity, performance, cost, or any combination thereof. Different computing instances may be offered to maximize these needs to different degrees. The local edge proxy has a list of computing instances that are capable of provisioning. Determining the proper computing instance includes matching the resources of the local instance with the resources available remotely. One way to assess this is to extract the resources that are used local, and map them to a remote instance with similar resources. This may include determining how many CPUs, how much RAM, and how many Input/Output Operations Per Second (IOPS) are required by the image.

In an embodiment, the remote (e.g. cloud) environment includes multiple provisioned container frameworks forming, as an example a container framework cluster sharing the same remote edge proxy. In such an embodiment, each of the container frameworks may have different available capacity based on the current load. An edge proxy (remote or local) may determine the best placement for the new container instance. The edge proxy may calculate the ratio of idling containers to non-idling ones for each of the container frameworks and select the framework with the largest ratio. Additionally or alternatively, an edge proxy may relocate existing containers across container frameworks to free enough capacity on one of the container frameworks to accommodate the new container (e.g. similar to de-fragmentation). An edge proxy may also provision a new container framework to extend the capacity of the remote environment.

In some embodiments, a remote server may be provisioned at step 2623 based on the specifications determined from step 2621. In an embodiment, the remote server comprises a container framework that can load the generated container image to run the container. If the container framework is not installed, the remote edge proxy may provision a container framework on the remote server that can run the generated container image.

At step 2625, the remote edge proxy requests the container framework to load the generated container image from the mounted storage. The container framework may load and initialize the generated container image either from the cache of the remote edge proxy or streamed from the local edge proxy through the remote edge proxy.

At step 2627, the container, using the container framework on the remote server, starts running on the remote server. The container may seamlessly continuing to execute the workload that was executed by the virtual machine instance before the transfer.

7.5 Migrating Container Workload

As discussed in FIG. 7, a computing instance, such as a container, may have its workload transferred to a geographically remote host. In an embodiment, where the local host computer system and the remote host computer system have the same type of container framework, the workload transfer using container may be further simplified. The same workload transferring techniques, as discussed herein (e.g. FIG. 27), may be applied within the same location between container frameworks executing on one or more computer systems. For example, such techniques may improve efficiency of provisioned cloud computing resource consumption by workloads by evenly distributing the workloads across the computing resources.

As discussed above, containers provide a better granularity of abstraction of hardware computing resources for executing workloads than virtual machine instances. Accordingly, the adaptation techniques for containers may be further simplified to remove extraneous adaptation steps like installing device drivers for communication I/O subsystems such as USB and/or storage subsystems such as mounted disks.

Figure 27:
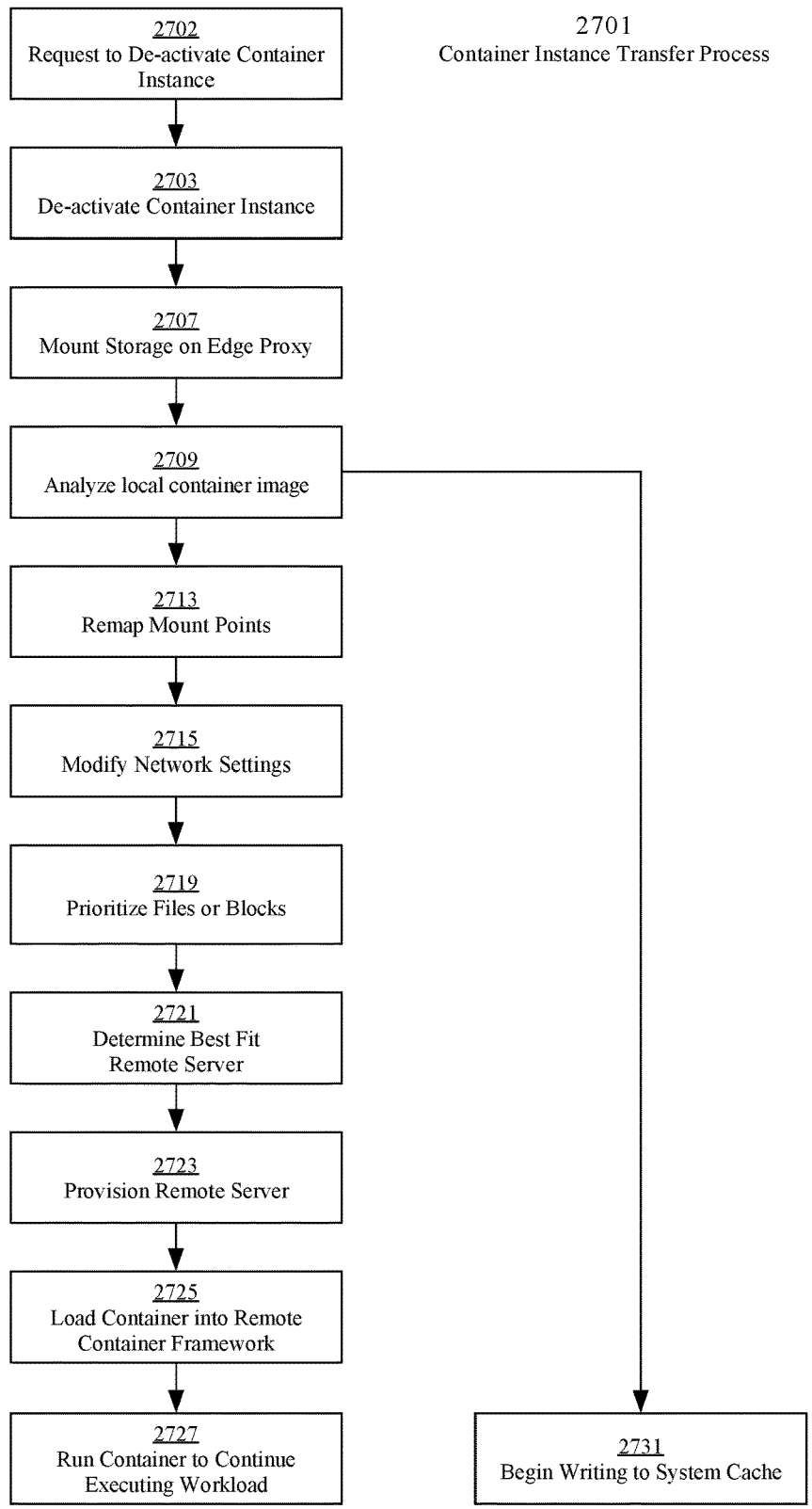
FIG. 27 is a flow diagram that depicts a process for a remote transfer of a container instance.

In an embodiment, the instance transfer process 2701 comprises the steps as seen in FIG. 27, but one or more steps may be performed asynchronously, in parallel, or in a different order in other embodiments. In an embodiment, the instance transfer process begins with a container instance being selected either manually through the local management system, or automatically following business rules programmed to the management system through its API, to be sent to a selected remote computer system.

At step 2702, the local edge proxy may request the local container framework, such as container framework 2408, to de-activate or stop the selected container instance, such as container 2407. De-activating the container instance causes the run state information including memory content to be persistently stored in a local storage as a container image at step 2703.

The de-activation/stoppage of the container instance may not affect the continuity of the workload. As described further below, the adaptation steps for migrating a container (examples of which are steps 2713 and 2715) may affect the configuration of the remote host container framework and/or remote host computer system rather than the remote container instance itself. Thus, the execution contexts within the container instance (such as executing applications and services) may not require a reset. Furthermore, the changes to the remote container framework or the remote compute system are such that can be applied without a reboot saving considerable execution time. Accordingly, transferring workloads by migrating a local container instance to a remote container instance is speedy, seamless and continuous for the executing workloads. These techniques further extend the speed and seamless execution continuity to workload migration across geographically distributed source and destination container environments, leveraging the streaming of saved run state along with streaming of data to enable on-demand, ad-hoc live migration without the need for replication in advance of the migration.

At step 2707, the local edge proxy mounts the storage of the host computer of the local container framework to the local edge proxy. In other embodiments, the storage is mounted to an additional block storage device connected to the local edge proxy. Under either embodiment, the local edge proxy configures the storage used by the container instance to appear in its disk management system. The disk management system works in conjunction with the edge proxies to transparently provide storage to the computing instance.

In some embodiments, selected virtual disk or storage volumes may be migrated to a lower tier of storage for lower cost and better performance of the overall system. Simply vacating higher performance storage can increase system performance by providing more storage for the local workloads. In addition costs can be reduced. The reason why these virtual disks can be moved to lower-tiered storage is that the actual execution of workload against the data of that storage may be performed on the remote system (e.g. in the cloud), whereas the local system storage is only used to handle the deferred and limited read-write activity by the remote-edge proxy. Hence, the local IO sub system is offloaded by the remote IO system in terms of throughput and performance.

In some embodiments, an edge proxy classifies one or more storage disks as remote only write persistence or local write persistence. In these embodiments, additional virtual storage disks are created and mounted on the remote edge proxy when remote only write persistence is selected.

For example in FIG. 3, virtual disk 308 is created to accommodate cloud (remote) write persistence of computing instance 303.

The local edge proxy performs a quick analysis of the image of the container instance to be transferred in step 2709. The analysis includes determining OS type and version, assigned computing and storage resources, file-systems, data storage mount points, namespaces and network configurations and license type. Based on the analysis, adaptations are applied to the imaged instance, including but not limited to (i) remapping mount points to the edge appliance at step 2713; (iv) modifying network settings at step 2715; (vi) prioritizing potential storage to be pre-fetched at step 2719; (vii) determining a best-fit remote server type, accounting for RAM, CPU, storage performance and special software license requirements (e.g. 3rd party database software) at step 2721.

In an embodiment, at step 2713, mount points from current virtual storage devices or networked storage are remapped to the proxied addresses as reflected by the remote edge proxy. The remote container framework and/or the remote computer may be configured with the changes so that the changes will be reflected upon starting the container instance remotely. The remote container framework or the remote compute will receive a list of available storage devices to be accessed through virtual hardware elements like a SCSI bus or a fiber channel and the virtual storage devices appear as local drives and may configure the elements to be accessible within the namespace of the remote container instance matching the configuration of the local container instance.

In one embodiment, when an instance is adapted to a remote host and a remote container framework, the remote host's storage is remounted to appear as a standard network storage such as SAN. This standard network storage is preferably accessed through iSCSI, but in other embodiments the storage may be accessed through other software or virtual hardware mechanisms. Examples include traditional parallel SCSI, Fiber Channel Protocol, HyperSCSI, SATA, ATA over Ethernet (AoE), InfiniBand, DSS, NFS, CIFS, RBD or any proprietary storage protocol. The storage devices and hardware elements of container as they appear in the container framework or container are modified depending on which mechanisms are used to reroute the data path.

In some embodiments, an edge proxy, the local edge proxy or the remote edge proxy coupled to the local computer system through the local edge proxy, classifies one or more storage devices as remote only write persistence or local write persistence. Storage device paths may need to be split and re-routed to multiple different storage devices, some local and some remote, in order to accommodate remote only write persistence or other tiered storage needs.

An aspect of an embodiment includes modifying network settings that may not be applicable to the remote-side network when a container is transferred, or as designated by the administrator in the task definitions, at step 2715. In an embodiment, networking addresses and representations are modified to reflect a new location of the remote host computer. These modifications include updating networking services such as DNS, routing services, and other network devices such as NAS or a directory service. At least some of these settings can be configured during the initialization of the container by the container framework. In an embodiment, network services, such as those of the remote container framework and/or remote host computer system, are updated with the modifications to match network configuration of the local container framework, and/or local computer system. The modification provides seamless routing of network packets addressed to the local instance to the remote instance.

In an embodiment, an edge proxy estimates and prioritizes potential candidate files and/or corresponding blocks to be pre-fetched by the remote side cache for initialization of the container or efficient execution in the remote computer system at step 2719.

To accomplish this, an edge proxy is setup to map files that are likely to be accessed in the loading of the container or container workload run state to the files' corresponding LBAs. In an embodiment, these blocks reflect previous modifications to the network settings and virtual storage devices.

The files may be determined through a static analysis or a dynamic analysis or both. The process for prioritization of blocks by profiling the files used in a workload or container load process may be performed using the process of FIG. 21 by the local edge proxy, as previously described. Additionally or alternatively, the local edge proxy may perform dynamic analysis that involves accessing an instance through the underlying container framework environment or the host operating system to determine what block storage is routinely accessed. The local edge proxy, using the process of FIG. 22 as previously described, may prioritize blocks by determining hotspots.

By using one or more of these static and dynamic analysis techniques, the local edge proxy determines which block storage is accessed most often for an instance. The local edge proxy then prioritizes the block level storage for a container instance based on how often particular blocks are accessed and how early these blocks are accessed for a particular application or for the container loading process or a particular workload. These blocks may be streamed in order of priority from the local edge proxy to the remote edge proxy at step 2731. This process may be done asynchronously or in large chunks such that calls made from the remote edge proxy to the local edge proxy will not be slowed.

In an embodiment, a best-fit remote server, accounting for RAM, CPU, storage performance and special software license requirements (e.g. 3rd party database software) is determined at step 2721. The local edge proxy extends the data center by transferring individual components in a multi-machine application to a remote server that meets the needs of each component in terms of capacity, performance, cost, or any combination thereof. Different computing instances may be offered to maximize these needs to different degrees. The local edge proxy has a list of provisionable computing instances. Determining the proper computing instance includes matching the resources of the local instance with the resources available remotely. One way to assess this is to extract the resources that are used local, and map them to a remote instance with similar resources. This may include determining how many CPUs, how much RAM, and how many Input/Output Operations Per Second (IOPS) are required by the image.

In some embodiments, a remote server may be provisioned at step 2723 based on the specifications determined from step 2721. In an embodiment, the remote server comprises a container framework that can load the adapted container image to run the container. If the container framework is not installed, the remote edge proxy may provision a container framework on the remote server that can run the adapted container image.

At step 2725, the remote edge proxy requests the container framework to load the adapted container image from the mounted storage. The container framework may load and initialize the adapted container image either from the cache of the remote edge proxy or streamed from the local edge proxy through the remote edge proxy.

At step 2727, the container, using the container framework on the remote server, starts running on the remote server. The container may seamlessly continuing to execute the workload that was executed by the virtual machine instance before the transfer.

8.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 28:
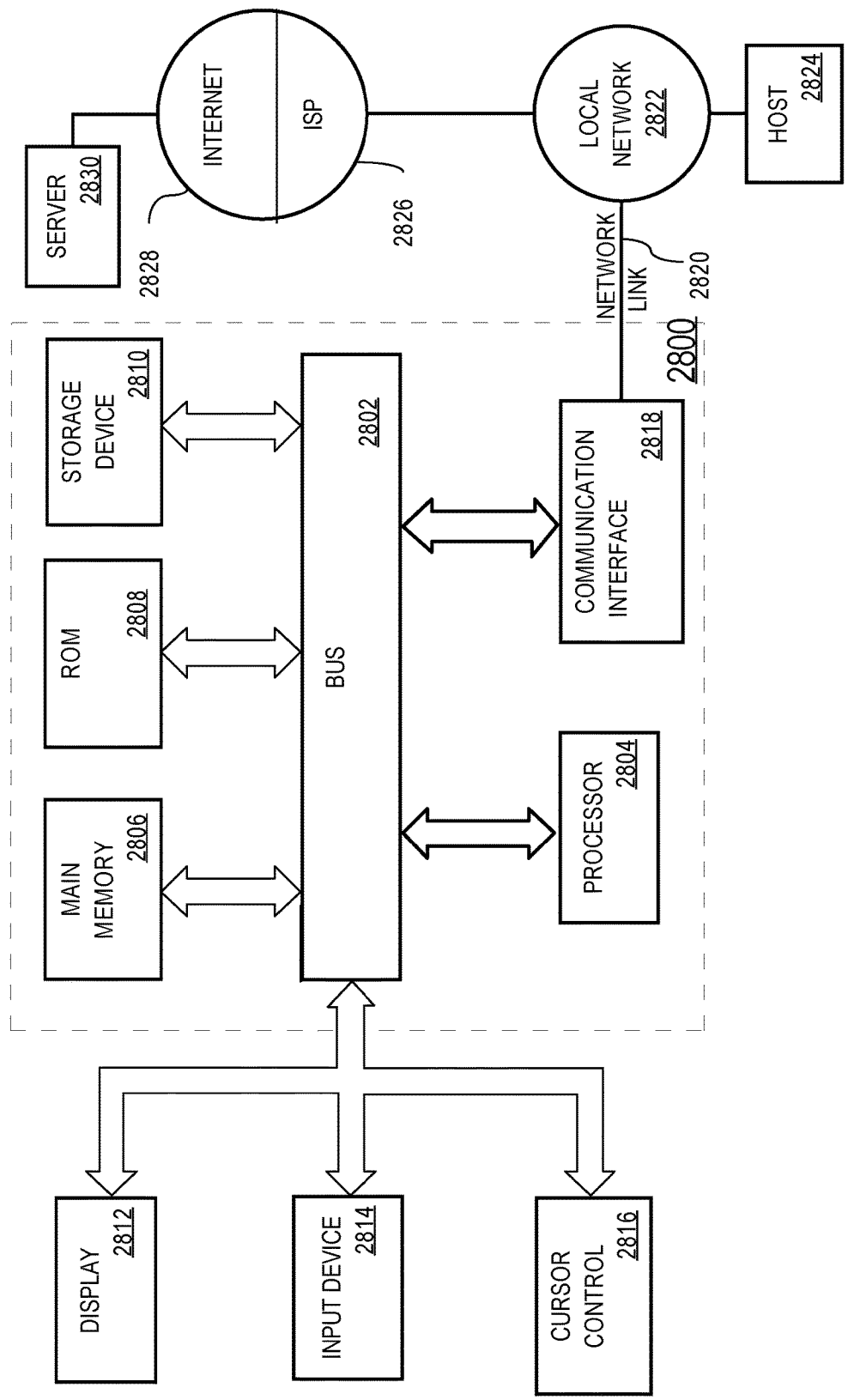
FIG. 28 is a block diagram illustrating a computer system that may be used to implement the techniques described herein.

For example, FIG. 28 is a block diagram that illustrates a computer system 2800 upon which an embodiment of the invention may be implemented. Computer system 2800 includes a bus 2802 or other communication mechanism for communicating information, and a hardware processor 2804 coupled with bus 2802 for processing information. Hardware processor 2804 may be, for example, a general purpose microprocessor.

Computer system 2800 also includes a main memory 2806, such as a random access memory (RAM) or other dynamic storage device, coupled to bus 2802 for storing information and instructions to be executed by processor 2804. Main memory 2806 also may be used for storing temporary variables or other intermediate information during execution of instructions to be executed by processor 2804. Such instructions, when stored in non-transitory storage media accessible to processor 2804, render computer system 2800 into a special-purpose machine that is customized to perform the operations specified in the instructions.

Computer system 2800 further includes a read only memory (ROM) 2808 or other static storage device coupled to bus 2802 for storing static information and instructions for processor 2804. A storage device 2810, such as a magnetic disk, optical disk, or solid-state drive is provided and coupled to bus 2802 for storing information and instructions.

Computer system 2800 may be coupled via bus 2802 to a display 2812, such as a cathode ray tube (CRT), for displaying information to a computer user. An input device 2814, including alphanumeric and other keys, is coupled to bus 2802 for communicating information and command selections to processor 2804. Another type of user input device is cursor control 2816, such as a mouse, a trackball, or cursor direction keys for communicating direction information and command selections to processor 2804 and for controlling cursor movement on display 2812. This input device typically has two degrees of freedom in two axes, a first axis (e.g., x) and a second axis (e.g., y), that allows the device to specify positions in a plane.

Computer system 2800 may implement the techniques described herein using customized hard-wired logic, one or more ASICs or FPGAs, firmware and/or program logic which in combination with the computer system causes or programs computer system 2800 to be a special-purpose machine. According to one embodiment, the techniques herein are performed by computer system 2800 in response to processor 2804 executing one or more sequences of one or more instructions contained in main memory 2806. Such instructions may be read into main memory 2806 from another storage medium, such as storage device 2810. Execution of the sequences of instructions contained in main memory 2806 causes processor 2804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 2810. Volatile media includes dynamic memory, such as main memory 2806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2802. Transmission media can also take the form of acoustic or light waves, such as those generated during radio-wave and infra-red data communications.

Various forms of media may be involved in carrying one or more sequences of one or more instructions to processor 2804 for execution. For example, the instructions may initially be carried on a magnetic disk or solid-state drive of a remote computer. The remote computer can load the instructions into its dynamic memory and send the instructions over a telephone line using a modem. A modem local to computer system 2800 can receive the data on the telephone line and use an infra-red transmitter to convert the data to an infra-red signal. An infra-red detector can receive the data carried in the infra-red signal and appropriate circuitry can place the data on bus 2802. Bus 2802 carries the data to main memory 2806, from which processor 2804 retrieves and executes the instructions. The instructions received by main memory 2806 may optionally be stored on storage device 2810 either before or after execution by processor 2804.

Computer system 2800 also includes a communication interface 2818 coupled to bus 2802. Communication interface 2818 provides a two-way data communication coupling to a network link 2820 that is connected to local network 2822. For example, communication interface 2818 may be an integrated services digital network (ISDN) card, cable modem, satellite modem, or a modem to provide a data communication connection to a corresponding type of telephone line. As another example, communication interface 2818 may be a local area network (LAN) card to provide a data communication connection to a compatible LAN. Wireless links may also be implemented. In any such implementation, communication interface 2818 sends and receives electrical, electromagnetic or optical signals that carry digital data streams representing various types of information.

Network link 2820 typically provides data communication through one or more networks to other data devices. For example, network link 2820 may provide a connection through local network 2822, to a host computer 2824 or to data equipment operated by an Internet Service Provider (ISP) 2826. ISP 2826 in turn provides data communication services through the world wide packet data communication network now commonly referred to as the "Internet" 2828. Local network and Internet both use electrical, electromagnetic or optical signals that carry digital data streams. The signals through the various networks and the signals on network link 2820 and through communication interface 2818, which carry the digital data to and from computer system 2800, are example forms of transmission media.

Computer system 2800 can send messages and receive data, including program code, through the network(s), network link 2820 and communication interface 2818. In the Internet example, a server 2830 might transmit a requested code for an application program through Internet 2828, ISP 2826, local network 2822 and communication interface 2818.

The received code may be executed by processor 2804 as it is received, and/or stored in storage device 2810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   executing a workload on a first computer;
   transferring the workload from the first computer to a second computer, the second computer being geographically distant from the first computer, the transferring comprising:
   coupling a first edge appliance to the first computer;
   remotely coupling a second edge appliance to the first edge appliance, wherein the second edge appliance is coupled to the second computer;
   streaming run state information for the workload from the first computer to the second computer through the first edge appliance and the second edge appliance;
   using the run state information, executing the workload on the second computer including streaming data from the first computer through the first edge appliance to store in a cache in the second edge appliance.

2. The method of claim 1, further comprising:
   capturing the run state information of the first computer;
   loading a workload run state of the second computer for the workload based on the run state information from the first computer.

3. The method of claim 1, further comprising:
   causing the first computer that executes the workload to enter into a standby or hibernation mode in which the first computer stops executing the workload;
   capturing the run state information of the first computer in the standby or hibernation mode;
   configuring a workload run state of the second computer for the workload based on the run state information from the first computer;
   continuing executing the same workload that had stopped on the first computer, using the second computer.

4. The method of claim 1, wherein the run state information includes one or more of: state of CPU, in-memory CPU instructions, a memory state, and register values that are replicated from a target storage, or lower level virtual hardware components of the first computer.

5. The method of claim 1 further comprising determining a success of the transferring the workload from the first computer to the second computer by measuring a difference between a first current state of the first computer and a second current state of the second computer after the transferring.

6. The method of claim 1, wherein the first edge appliance is a block storage device for the first computer.

7. The method of claim 1, wherein the second edge appliance is a block storage device for the second computer.

8. A computer-implemented method comprising:
   executing a workload by a first computing instance using a first software framework of a first computer;
   coupling a first edge appliance to the first computer;
   remotely coupling a second edge appliance to the first edge appliance, wherein the second edge appliance is coupled to a second computer;
   transferring the workload from the first computer to the second computer, the second computer being geographically distant from the first computer, the transferring comprising:
   deactivating the first computing instance thereby causing:
      stop in an execution of the workload by the first computing instance using the first software framework of the first computer, and
      storing a run state information for the workload on a storage accessible by the first edge appliance;
   streaming the run state information from the first computer through the first edge appliance to store in a cache in the second edge appliance;
   using the run state information, continuing the execution of the workload using a second software framework on the second computer.

9. The method of claim 8,
   wherein the first computing instance is a first container, the first software framework is a first container framework of the first computer, and the second software framework is a second container framework;
   wherein continuing the execution of the workload using the second software framework on the second computer includes continuing the execution of the workload by a second container initiated by the second container framework of the second computer.

10. The method of claim 8,
   wherein the first computing instance is a first container and the first software framework is a first container framework of computer;
   wherein storing run state information for the workload on the first edge appliance includes:
   generating a first container image of the first container that includes the run state information for the workload,
   streaming the first container image from the first computer through the first edge appliance to store in the cache in the second edge appliance thereby generating a second container image, corresponding to the first container image, on the second edge appliance.

11. The method of claim 8,
wherein the second software framework is a second container framework;
wherein continuing the execution of the workload using the second software framework on the second computer includes continuing the execution of the workload by a second container initiated by the second container framework of the second computer and includes:
receiving a second container image from the first edge appliance through the second edge appliance, the second container image containing at least the run state information of the workload,
loading the second container image into the second container framework causing running of the second container using the second container framework, the running of the second container thereby causing the continuing of the execution of the workload on the second computer.

12. The method of claim 8, wherein the first computing instance is a first virtual computer system, and the first software framework is a first hypervisor operating system that runs on the first computer;
using a configuration of the first virtual computer system, configuring a first container image of the first container framework that runs on the first computer;
loading the first container image by the first container framework, thereby initiating an execution of a first container by the first container framework, the first container continuing an execution of the workload using the first container framework that runs on the first computer.

13. The method of claim 12, further comprising:
stopping the first virtual computer system which is executing the workload thereby causing the run state information for the workload to be stored on the first computer;
retrieving the run state information for the workload and configuring the first container image with the run state information for the workload.

14. The method of claim 12, further comprising:
retrieving a network configuration information of the first virtual computer system;
using the network configuration information of the first virtual computer system, to configure a network configuration for the first container.

15. The method of claim 12, further comprising:
configuring the first container to identify the first edge appliance as a storage target.

16. The method of claim 12, further comprising:
retrieving the configuration of the first virtual computer system by scanning one or more virtual system images for the first virtual computer system.

17. A system comprising:
one or more processors;
one or more storage media storing one or more computer programs for execution by the one or more processors, the one or more computer programs comprising program instructions for:
executing a workload on a first computer;
transferring the workload from the first computer to a second computer, the second computer being geographically distant from the first computer, the transferring comprising:
coupling a first edge appliance to the first computer;
remotely coupling a second edge appliance to the first edge appliance, wherein the second edge appliance is coupled to the second computer;
streaming run state information for the workload from the first computer to the second computer through the first edge appliance and the second edge appliance;
using the run state information, executing the workload on the second computer including streaming data from the first computer through the first edge appliance to store in a cache in the second edge appliance.

18. The system of claim 17, the program instructions further configured for:
capturing the run state information of the first computer;
loading a workload run state of the second computer for the workload based on the run state information from the first computer.

19. The system of claim 17, the program instructions further configured for:
causing the first computer that executes the workload to enter into a standby or hibernation mode in which the first computer stops executing the workload;
capturing the run state information of the first computer in the standby or hibernation mode;
configuring a workload run state of the second computer for the workload based on the run state information from the first computer;
continuing executing the same workload that had stopped on the first computer, using the second computer.

20. The system of claim 17, wherein the run state information includes one or more of: state of CPU, in-memory CPU instructions, a memory state, and register values that are replicated from a target storage, or lower level virtual hardware components of the first computer.

* * * * *